(12) United States Patent
Takaishi

(10) Patent No.: US 7,193,808 B2
(45) Date of Patent: Mar. 20, 2007

(54) CORRECTION TABLE CREATION METHOD FOR HEAD POSITION CONTROL, HEAD POSITION CONTROL METHOD AND DISK DEVICE

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/023,182

(22) Filed: Dec. 27, 2004

(65) Prior Publication Data

US 2006/0056100 A1 Mar. 16, 2006

(30) Foreign Application Priority Data

Sep. 10, 2004 (JP) ............... 2004-263631

(51) Int. Cl.
*G11B 5/596* (2006.01)
*G11B 5/55* (2006.01)

(52) U.S. Cl. ................. 360/77.04; 360/78.09

(58) Field of Classification Search ............ None
See application file for complete search history.

(56) References Cited

U.S. PATENT DOCUMENTS

| 6,437,936 B1 | 8/2002 | Chen et al. |
| 6,654,198 B2 | 11/2003 | Liu et al. |
| 2003/0184909 A1* | 10/2003 | Zhang et al. ............ 360/77.04 |

FOREIGN PATENT DOCUMENTS

| JP | 9-330571 | 12/1997 |
| JP | 11-126444 | 5/1999 |
| JP | 2000-021104 | 1/2000 |

* cited by examiner

*Primary Examiner*—Andrea Wellington
*Assistant Examiner*—Jason Olson
(74) *Attorney, Agent, or Firm*—Greer, Burns & Crain, Ltd.

(57) ABSTRACT

A head position control system control the position of the head by correcting the components synchronizing rotation of the disk from the head control amount, in which an adjusted gain to minimize the components synchronizing rotation after correction is theoretically acquired. An adjusted gain based on the ratio of the magnitude between the components synchronizing rotation of a disk and the components not synchronizing rotation of the disk in the position signals is used. And a gain to minimize RRO after correction can be theoretically determined using an expression to determine RRO after correction. The gain can be determined without depending on experiment, and the value of RRO after correction can be guaranteed, therefore the manufacturing time and the device specifications can be determined.

28 Claims, 41 Drawing Sheets

Servo Mark
Gray Code
Index

PosA PosB PosC PosD

FIG. 32

| CONDITION | CONSTANT GAIN AT EACH FREQUENCY | | | OPTIMUM ADDITIONAL GAIN | | |
|---|---|---|---|---|---|---|
| | RPE | RRO | RPE +RRO | RPE | RRO | RPE +RRO |
| 1 CYCLE×1 TIME | 0.570 | 0.734 | 0.488 | 0.471 | 0.511 | 0.427 |
| 2 CYCLE×1 TIME | 0.439 | 0.595 | 0.366 | 0.362 | 0.438 | 0.325 |
| 3 CYCLE×1 TIME | 0.366 | 0.536 | 0.303 | 0.314 | 0.405 | 0.281 |
| 4 CYCLE×1 TIME | 0.330 | 0.506 | 0.274 | 0.277 | 0.380 | 0.250 |
| 6 CYCLE×1 TIME | 0.278 | 0.441 | 0.230 | 0.240 | 0.354 | 0.221 |
| 8 CYCLE×1 TIME | 0.247 | 0.392 | 0.208 | 0.223 | 0.344 | 0.207 |

FIG. 37

| Track NO. | RRO (R) | RRO (W) | RroZone |
|---|---|---|---|
| 1000 | XX | YY | AAA |
| ⋮ | | | |
| 1999 | XY | YX | |
| 2000 | | | BBB |
| ⋮ | | | |
| 2999 | | | |
| ⋮ | | | |

CORRECTION TABLE CREATION METHOD FOR HEAD POSITION CONTROL, HEAD POSITION CONTROL METHOD AND DISK DEVICE

CROSS-REFERENCE TO RELATED APPLICATIONS

This application is based upon and claims the benefit of priority from the prior Japanese Patent Application No. 2004-263631, filed on Sep. 10, 2004, the entire contents of which are incorporated herein by reference.

BACKGROUND OF THE INVENTION

1. Field of the Invention

The present invention relates to a correction table creation method for head position control for a disk device which controls the position of a head to a rotating disk for one or both of reading and writing information from/to the disk, and head position control method and the disk device thereof, and more particularly to a correction table creation method for head position control for correcting the rotation synchronization component of the position signals, and the head position control method and disk device thereof.

2. Description of the Related Art

Disk storage devices for recording to and regenerating from a rotating disk medium are widely used as the storages of data and other information. A disk device is comprised of a disk for storing data, a spindle motor for rotating the disk, a head for recording/regenerating information to/from the disk, and an actuator for moving the head to a target position. Typical examples are magnetic disk devices (HDD: hard disk drive) and magneto-optical disk devices (DVD-ROM, MO).

In a magnetic disk device, a plurality of position signals for detecting the position of the head are recorded in an arc with respect to the rotation center and form a track. A position signal is comprised of a servo mark, track number (gray code) and offset information. The current position of the head can be known by the track number and offset information.

The difference between this position information and target position is determined, calculation is performed according to the displacement amount, and drive signals for driving the actuator, such as current for a VCM (Voice Coil Motor) and voltage for a piezo actuator, are supplied.

The position signal (servo signal) on the disk is either recorded by the disk device itself with use of the STW (Servo Track Writing) method, or recorded by an external STW device. The STW method for recording the position signals by the disk device itself includes pushpin STW, self-servo writing and rewrite STW. The method for recording by an external STW device includes a method for recording on a single disk, magnetic transfer and discrete medium.

In order to accurately record and regenerate data, it is necessary to accurately position the head to the position demodulated from the position signals. But the position signals include noise, which deteriorates the positioning accuracy. This noise has a component synchronizing with the rotation of the spindle motor, and a component not synchronizing with the rotation. The component synchronizing with the rotation can be measured and corrected, and can be suppressed to zero if the measurement is allowed. For the component not synchronizing with rotation, on the other hand, measurement and correction are difficult. Various methods have been proposed to measure and correct the component synchronizing the rotation.

There are two causes that generate the component synchronizing with the rotation of the spindle motor in the position signals in a status where vibration is not received from the outside. The first cause is that the servo signals are not accurately recorded concentrically during STW. As long as the servo signals are mechanically recorded, mechanical, electrical and magnetic noises during recording are unavoidable. Therefore accurately recording the servo signals concentrically during STW is extremely difficult.

The second cause is that distortion occurs to the disk and spindle motor after STW. Microscopically, the position signals are not aligned concentrically with respect to the center of rotation of the spindle motor. The track width of current disk devices is around 200 nano meter, so the influence even of a slight distortion on positioning accuracy is extremely large.

The component of fluctuation of the position signals that synchronize the rotation is called "eccentricity" or "RRO (Repeatable Run Out)", and the component of a one time rotation frequency is called "primary", and two times thereof is called "secondary". If RRO occurs, the positioning accuracy of the head deteriorates, which causes problems in recording and regenerating data. For example, if the positioning accuracy is poor, when data is recorded on a track, a part of previously recorded data on the adjacent tracks is overwritten. To prevent such a status, RRO must be controlled in positioning control.

Conventionally available methods of controlling RRO are a method of controlling the actuator not to follow-up RRO but to ignore it, as shown in FIG. 42, and a control method of controlling the actuator to follow-up RRO, as shown in FIG. 43.

FIG. 42 and FIG. 43 show block diagrams of the head position control system, where as a disturbance is applied to the control system, the components synchronizing the rotation of the spindle motor and the components not synchronizing the rotation thereof are indicated as RRO, NRRO, RPE and NRPE. RRO (Repeatable Run Out) is a component of positional disturbance synchronizing rotation. NRRO (Non-Repeatable Run Out) is a component of positional disturbance not synchronizing rotation. RPE (Repeatable Position Error) is a component synchronizing rotation included in the position error 'e' when the positioning control is performed. And NRPE (Non-Repeatable Position Error) is a component not synchronizing rotation included in the position error 'e' when the positioning control is performed. The RRO and RPE, which are components synchronizing rotation, indicate different values depending on the sample of the servo.

To perform positioning control, it is necessary to know RRO, RPE and RPE+RRO, and to minimize all these three values. RRO indicates the distortion of the track on the disk. Here the difference from RRO of the adjacent track is critical. This difference value indicates the fluctuation of the track width. As the fluctuation width of the difference values becomes wider, the fluctuation of the track space increases, in other words, areas where the track width is narrower are generated. When vibration is applied from the outside and the positioning accuracy deteriorates, this RRO determines the width where an over-write on the recording area of the data of the adjacent track occurs. In other words, suppressing RRO contributes to improving resistance to external vibration.

RPE indicates the displacement from the positioning target. If control is being performed only to follow-up RRO, RPE indicates a deviation from RRO. In ordinary positioning control, RPE is the management target. For example, if RPE is contained in a plus/minus 15% range from the track width, or if this status continues for a predetermined number of samples, data recording is enabled, or it is judged whether seek control completed (stabilization completed). In other words, suppressing RPE contributes to improving the seek response time.

RPE+RRO indicates a locus of an actuator in a status where no vibration is applied from the outside. That is, this indicates a data recording position when vibration from the outside is zero. As this shows, suppressing RPE+RRO contributes to improving the positioning accuracy and error rate of recording/regenerating data in ordinary operating status where external vibration is low.

In FIG. 42 and FIG. 43 the actual position 'y' and the position error 'e' can be expressed by the following relational expression (1), using the target position 'r', RRO, NRRO, the transfer function of the control system C (z), and the transfer function of the plant (actuator in the case of a magnetic disk device) P (z).

$$y = \frac{C(z) \cdot P(z)}{1 + C(z) \cdot P(z)} r + \frac{1}{1 + C(z) \cdot P(z)} RRO + \frac{1}{1 + C(z) \cdot P(z)} NRRO \quad (1)$$

$$e = y - r$$

Now the status during track follow-up, when the target position 'r' is always the same and no vibration is applied from the outside, will be considered. The term of the target position 'r' at the right hand side in the expression for 'y', shown in expression (1), is a constant value, and is equal to the input (target position) 'r'. Therefore expression (2) of the position error 'e' in the track follow-up status is obtained.

$$e = \frac{1}{1 + C(z) \cdot P(z)} RRO + \frac{1}{1 + C(z) \cdot P(z)} NRRO \quad (2)$$

Note that 'e' in this status is also the sum of RPE and NRPE. Therefore RRO and NRRO and RPE and NRPE are expressed in the following relational expressions (3). In these expressions, $1/(1+C(z) \cdot P(z))$ is generally called the "sensitivity function".

$$RPE = \frac{1}{1 + C(z) \cdot P(z)} RRO \quad (3)$$

$$NRPE = \frac{1}{1 + C(z) \cdot P(z)} NRRO$$

In this way, there is a characteristic difference for the amount of the sensitivity function between RPE and RRO. In other words, there is a difference depending on the frequency. This means that even if RRO can be suppressed, the same suppression rate cannot always be implemented for RPE. And even if RRO can be suppressed 50%, RPE may be suppressed only 20%. The difference in frequency characteristics must be considered.

There are two types of methods to suppress RRO, that is, a method for the actuator not to follow-up RRO, as shown in FIG. 42, and a method for the actuator to follow-up RRO, as shown in FIG. 43. Both of these methods have actually been applied to disk devices. A method of using both of these methods is also in use. For example, the actuator follows up the low frequency area and does not follow-up in the high frequency area.

FIG. 42 shows the method for the actuator not to follow up RRO. A correction table 100 for storing values, called a "RroTable" is created in advance. And when the positioning control of the disk device is performed, the RroTable of the correction table 100 is subtracted from the position error 'e', and the result is used for the controller C(z). In other words, the controller C(z) calculates the control amount from the position error from which RRO is removed. These RroTable values may be different depending on the head, track, read position or write position, or may be the same for each head or each zone formed by a plurality of tracks.

One of the RroTable generation methods that has been proposed is a method of determining RRO by computing the observing position. An example of this computation method is using a discrete Fourier transform (DFT) (e.g. Japanese Patent Application Laid-Open No. H 11-126444). As FIG. 42 shows, the positional locus, that is RroTable of the correction table 100, is generated from the position error 'e', and RPE included in 'e' is removed. The position error 'e' at this time is expressed by the following expression (4). According to this expression (4), the actuator operates not to follow-up RRO.

$$e = \frac{1}{1 + C(z) \cdot P(z)} (RRO + NRRO - RroTable) \quad (4)$$

$$= RPE + NRPE - \frac{1}{1 + C(z) \cdot P(z)} RroTable$$

Therefore to remove RPE from the position error 'e', a RroTable is generated so as to satisfy the following expression (5).

$$RroTable = (1 + C(z) \cdot P(z)) RPE \quad (5)$$

In other words, as FIG. 42 shows, RPE is acquired from the position error 'e' by the acquisition block 110, and the RroTable value is determined from the acquired RPE through the reverse characteristics of the sensitivity function by the RRO calculation block 112. To determine average values of a plurality of cycles of the disk, the addition block 114 adds the RroTable value of each cycle of the disk.

In the case of the method for the actuator to follow-up RRO, on the other hand, a correction table 118 for storing a value of URroTable is created in advance. And during the positioning control of the disk device, the URroTable value of the correction table 118 is added when a drive signal is supplied from the control system C(z) to the plant P(z). This URroTable value as well may be different depending on the head, track and read position/write position, or may have a value for each head and for each zone which is comprised of a plurality of tracks. Each head may have a URroTable value regardless the track.

For this URroTable generation method as well, some methods have been proposed, such as a method of computing the position error 'e' and determining a signal that follows up RRO. Examples of this computation method are a method using repeat control and a method of using a discrete Fourier transform (e.g. see Japanese Patent Application Laid-Open No. H 11-126444).

As FIG. 43 shows, the URroTable value is generated from the position error 'e', and RPE included in 'e' is removed. As mentioned above, the actuator operates so as to follow-up RRO and the position error 'e' satisfies the following relational expression (6) in a track following status where external vibration is not applied.

$$e = \frac{1}{1+C(z) \cdot P(z)}(RRO + NRRO) + \frac{P(z)}{1+C(z) \cdot P(z)} URroTable \quad (6)$$
$$= RPE + NRPE + \frac{P(z)}{1+C(z) \cdot P(z)} URroTable$$

Therefore in order to remove RPE from the position error 'e', a URroTable value is generated so as to satisfy the following expression (7). Expression (7) indicates that the URroTable value is determined from RPE through the transfer function that has a reverse characteristic of the sensitivity function and the reverse characteristic of the plant.

$$URroTable = -\frac{1+C(z) \cdot P(z)}{P(z)} RPE \quad (7)$$

In other words, as FIG. 43 shows, RPE is acquired from the position error 'e' by the acquisition block 110, and the URroTable value is determined from the acquired RPE through the reverse characteristic of the sensitivity function and the reverse characteristic of the plant by the RRO calculation block 112. If an average value of a plurality of cycles of the disk is determined, the URroTable value of each cycle of the disk is added by the addition block 114.

As described above, a method of determining the correction table RroTable or URroTable from the observed RPE is to convert through such a transfer function as $(1+C(z) \cdot P(z))$ or $-(1+C(z) \cdot P(z))/P(z)$. For this conversion method, a method of determining the frequency characteristic between RPE and Rro or URro in advance and using a discrete Fourier transform (DFT) is best to determine waveforms most accurately.

A problem of generating the waveform of RroTable and URroTable is noise, particularly the asynchronous component in the position disturbance: NRRO. The NRRO is observed as NRPE during positioning control. A waveform is determined using position signals regardless whether the actuator follows up the RRO or not, but the problem occurs when NRPE is most obviously large compared with RPE.

When the NRPE is "0", RPE can be determined simply by observing one cycle of position signals. Therefore it is easy to generate a RroTable or URroTable for the actuator to follow-up RRO completely, or not to follow-up with RRO completely. However in reality the magnitude of RPE and NRPE are about the same, and a method of considering the error of NRPE during RPE measurement is required.

A method of decreasing the influence of NRPE is a method of averaging the position error 'e'. Position signals are measured continuously for a plurality of times of rotation cycles (e.g. 100 cycles), and an average value of the measured values is determined for each servo sector. This average value is regarded as the RPE, and a correction signal for not following up with RRO or for following up with RRO: a Rro or URroTable value, is calculated. This Rro or URroTable value is calculated assuming that no noise is included in the observed waveforms. And this value is substituted for each servo sector in the correction tables 100 and 108 of the RroTable and URroTable.

A method of simply averaging can decrease the influence of NRPE, but cannot suppress it to "0". Also the standards of magnitude of NRPE with respect to RPE and the number of rotation cycles to be measured are vague. So it has been proposed to multiply the averaged position error signals by a gain smaller than 1: Krro or Kurro, and substitute the result in table 100 or 118 (e.g. U.S. Pat. No. 6,437,936 B1).

According to this method, when NRPE is large, or when the number of rotation cycles for measurement is small, Krro or Kurro is adjusted by experiment so that RPE after correction becomes small. The gain becomes closer to "0" when NRPE is large with respect to RPE, and becomes closer to "1" if small. To solve this uncertainty of gain, the measurement and correction of RPE are further repeated (e.g. see U.S. Pat. No. 6,437,936, B1). The case when the measurement and correction are repeated twice for example, will be considered. By using Rro [1] or URro [1] determined by the first measurement and calculation, a correction table is generated using the following expression (8).

RroTable[1]=Krro[1]·Rro[1]

URro Table[1]=Kurro[1]·URro[1] (8)

RPE is measured a second time in the status after positioning control is performed using the generated correction table RroTable [1] or URroTable [1]. Then Rro [2] or URro [2] is calculated again and added to the previous correction table according to the following expression (9).

RroTable[2]=Krro[2]·Rro[2]+RroTable[1]

URroTable[2]=Kurro[2]·URro[2]+URroTable [1] (9)

Today track density is increasing along with demands for increased storage capacity. FIG. 44 shows the fluctuation of three adjacent tracks, where the locus of the track center differs depending on the track. FIG. 45 shows the locus of the top and bottom tracks viewed from the center track in FIG. 44, and indicates the track width of the center track. In this way, a highly accurate RRO correction is demanded because of the high density of the tracks.

In the conventional method of generating an RRO correction table: RroTable or URroTable of a disk device, a method to theoretically determine an optimum value of the gain: Krro or Kurro, when Rro and URro, that is a correction value, is added to the correction table, has not been established. Therefore it is unavoidable that an optimum value must be determined by experiment based on experience.

Therefore the suppression rate of RPE after correction cannot be estimated and must be confirmed by experiment. This is a problem when the suppression rate is adjusted for each disk device, making it impossible to estimate the positioning accuracy value when a new device is designed.

Also when the correction value is measured in the manufacturing steps of the disk device, it is difficult to set a standard for the RPE measurement time, that is the manufacturing time, required for satisfying the specifications of the positioning accuracy. For example, according to a prior art, a more accurate RRO correction table can be created as the measurement time becomes longer (e.g. several hours), to satisfy the specifications of the positioning accuracy, but as the measurement time becomes longer, the ratio of the correction table creation time in the manufacturing steps becomes longer, which is inappropriate for manufacturing large quantities of disk devices.

Also when gain is determined by experiment, the frequency characteristic of the position error is not considered, so it is difficult to effectively suppress RPE after correction, which may drop the follow-up accuracy of the disk device.

SUMMARY OF THE INVENTION

With the foregoing in view, it is an object of the present invention to provide a method of determining the gain when one of the correction values, Rro or URro, is added to the correction table not based on experiment but theoretically so as to create a correction table that satisfies the specifications of the positioning accuracy in a shorter time, and a head positioning control method and a disk device thereof.

It is another object of the present invention to provide a method of optimizing the gain when one of the correction values, Rro or URro, is added to the correction table, so as to create a correction table that satisfies the specifications of the positioning accuracy in a short time, and a head positioning control method and a disk device thereof.

It is still another object of the present invention to provide a correction table creation method of setting the gain, when one of the correction values Rro or URro is added to the correction table, at an optimum level for each frequency, so as to effectively suppress RPE after correction, and a head positioning control method and a disk device thereof.

To achieve the above objects, the correction table creation method according to the present invention is a correction table creation method for head position control for creating correction values for correcting the components synchronizing rotation of a disk of a disk device for controlling a position of a head for at least reading information of the disk using the position signals of the disk. The method has steps of: measuring the position error components synchronizing the rotation of the disk from an average waveform of the position signals; correcting the measured position error components using an adjusted gain based on a ratio of the magnitude between components synchronizing the rotation of the disk and components not synchronizing the rotation of the disk in the position signals; and storing the corrected position error components in the correction table.

The head position control method according to the present invention is a head position control method for controlling the position of a head for at least reading information of a disk using signals acquired by correcting the position signals of the disk by components synchronizing rotation of the disk. The method has steps of: calculating the error between a target position and a current position based on the position signal from the head; reading correction signals from a correction table for storing the correction signals acquired by measuring position error components synchronizing the rotation of the disk from an average waveform of the position signals and correcting the measured position error components using an adjusted gain based on the ratio of the magnitude between components synchronizing rotation of the disk and components not synchronizing rotation of the disk in the position signals; and controlling the head position based on the position error and the correction signals.

The disk device according to the present invention is a disk device has: a head for at least reading information of a disk; an actuator for moving the head to a desired position on the disk; a correction table for storing correction signals acquired by measuring position error components synchronizing the rotation of the disk from an average waveform of the position signals from the head and correcting the measured position error components using an adjusted gain based on a ratio of the magnitude between components synchronizing the rotation of the disk and components not synchronizing the rotation of the disk in the position signals; and a control unit for calculating an error between a target position and a current position based on the position signals from the head, and controlling the head position based on the position error and the correction signals.

In the present invention, it is preferable that the correction step further has a step of correcting the measured position error components using an adjusted gain based on the number of measurement rotations for averaging the position signals, the number of repeats of the correction, and the ratio of the magnitude between components synchronizing rotation of the disk and components not synchronizing rotation of the disk in the position signals.

It is preferable that the present invention further has a step of measuring the normal distribution of components synchronizing rotation of the disk and the normal distribution of components not synchronizing rotation of the disk in the position signals, and a step of calculating the adjusted gain based on the ratio between the normal distribution of the components synchronizing and the normal distribution of the components not synchronizing.

In the present invention, it is preferable that the correction step further has a step of correcting the measured position error components for each repeat using a gain for each repeat, that is adjusted based on the number of measurement rotations for averaging the position signals, the number of repeats of the correction, and the ratio of the magnitude between the components synchronizing rotation of the disk and the components not synchronizing rotation of the disk in the position signals.

In the present invention, it is preferable that the correction step further has a step of correcting the measured position error components for each frequency, that is a multiple of the rotation frequency of the disk, using the adjusted gain acquired by determining the ratio of the magnitude between the components synchronizing rotation of the disk and the components not synchronizing rotation of the disk in the position signals.

In the present invention, it is preferable that in the storage step, the residual RRO $\sigma$, that is a normal distribution of components synchronizing the rotation of a disk corrected by the correction value stored in the correction table, follows the following expression (18), where the normal distribution of components synchronizing rotation of the disk is $\sigma RRO$, the normal distribution of components not synchronizing rotation of the disk is $\sigma NRRO$, the number of measurement rotations is 'N', the number of repeats is 'M', and the gain is 'K'.

$$(\text{residual } RRO\ \sigma)^2 = (1-K)^{2M}\sigma^2_{RRO} + K^2/N \sum_{i=1}^{M}(1-K)^{2(i-1)}\sigma^2_{NRRO} \quad (18)$$

According to the present invention, an adjusted gain based on the ratio of the magnitude between the components synchronizing rotation of the disk and the components not synchronizing rotation of the disk in the position signals is used, so the gain to minimize RRO after correction can be theoretically determined using an expression for determining RRO after correction. Therefore the gain can be determined without depending on experiment. Also the value of RRO after correction can be guaranteed, and the manufacturing time and device specifications can be determined.

BRIEF DESCRIPTION OF THE DRAWINGS

FIG. 32 is a table showing an example of the addition gain for each RRO degree in FIG. 25;

FIG. 37 is a table showing the RroTable in FIG. 35;

DESCRIPTION OF THE PREFERRED EMBODIMENTS

Embodiments of the present invention will now be described in the sequence of disk device, optimum gain determination method for creating an RRO correction table, an RRO correction table creation method, another RRO correction table creation method, a URRO creation table creation method, another RRO correction table creation method considering the frequency characteristics, another RRO correction table creation method considering correlation, a servo track writing method using a RRO correction table, and other embodiments. The present invention, however, is not limited to the following embodiments.

Disk Device

Figure 1:
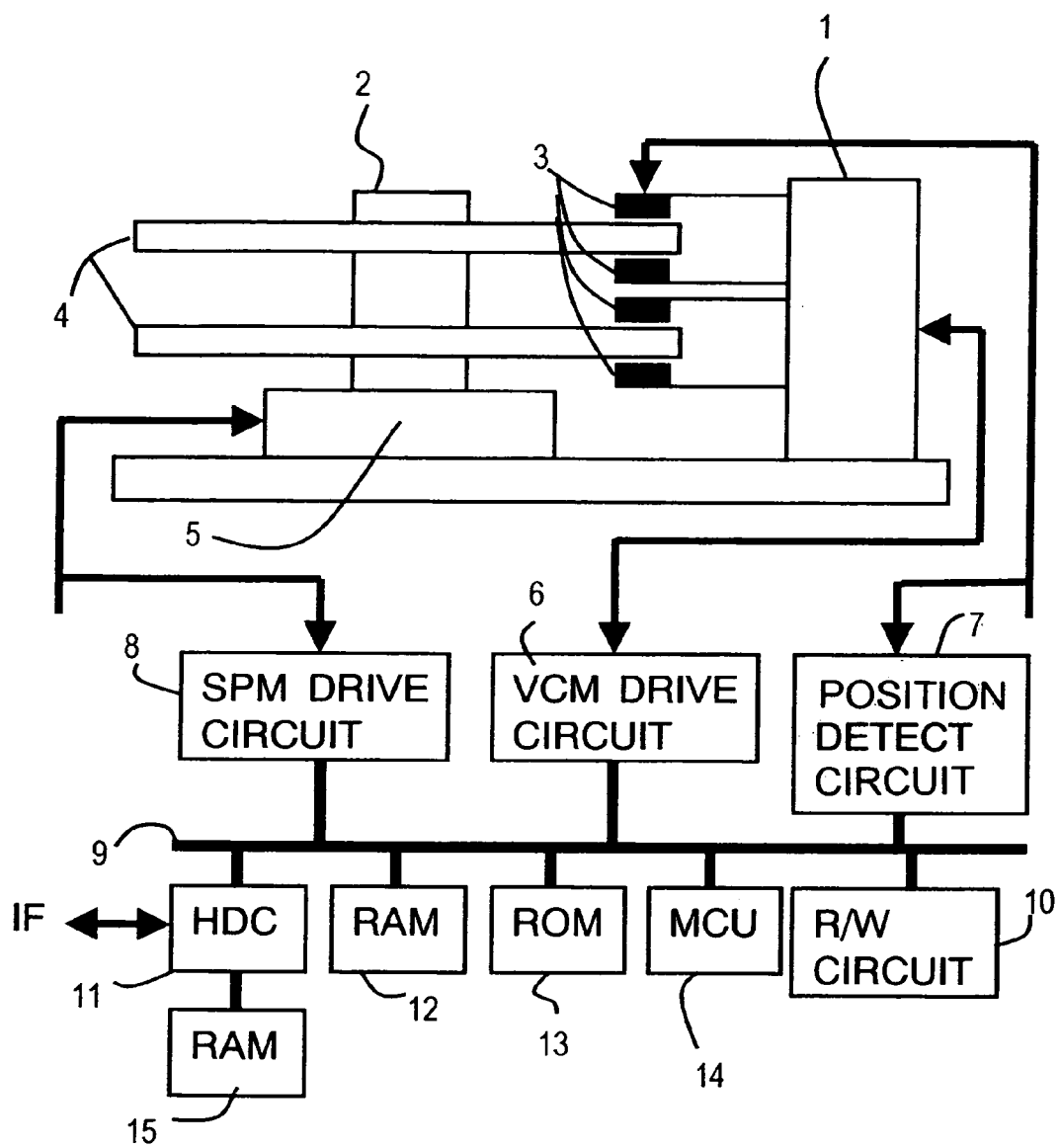
FIG. 1 is a diagram depicting a configuration of an embodiment of the disk device according to the present invention.
Figure 2:
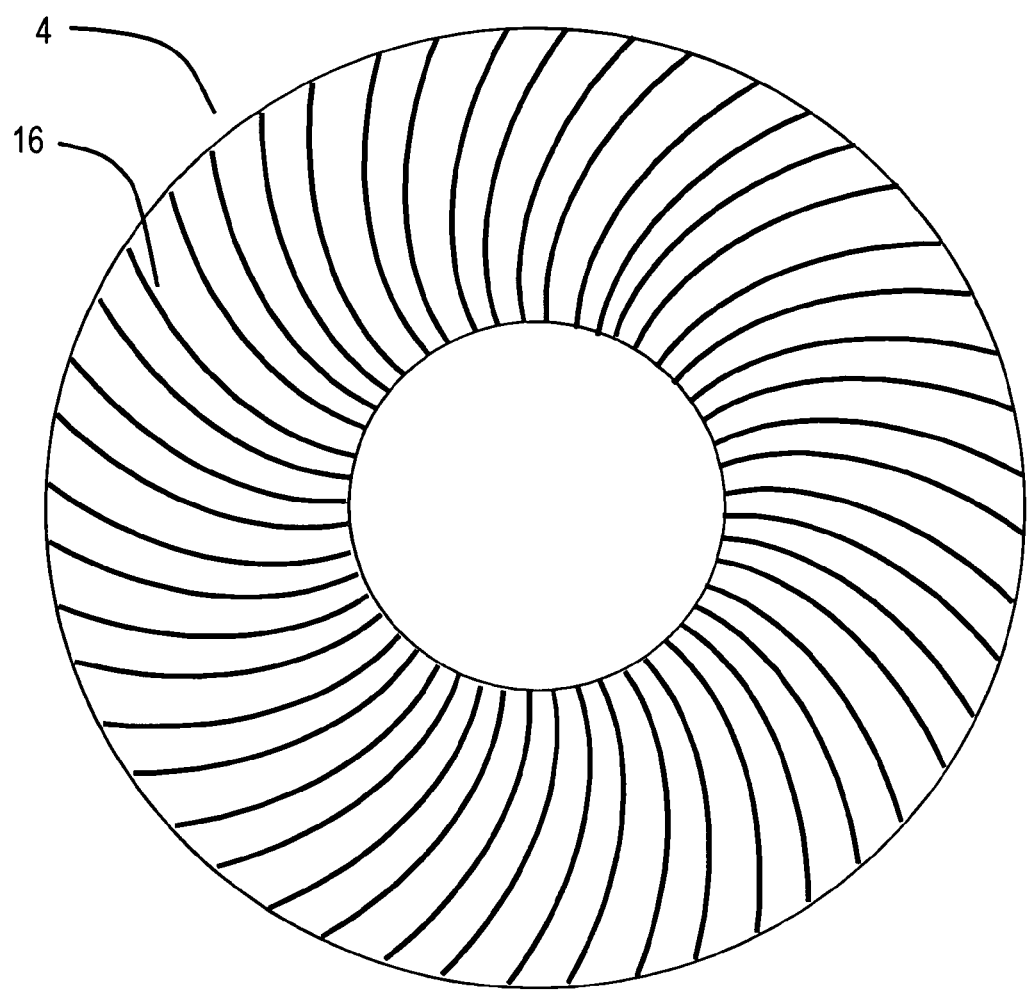
FIG. 2 is a diagram depicting the arrangement of servo signals of the disk in FIG. 1.
Figure 3:
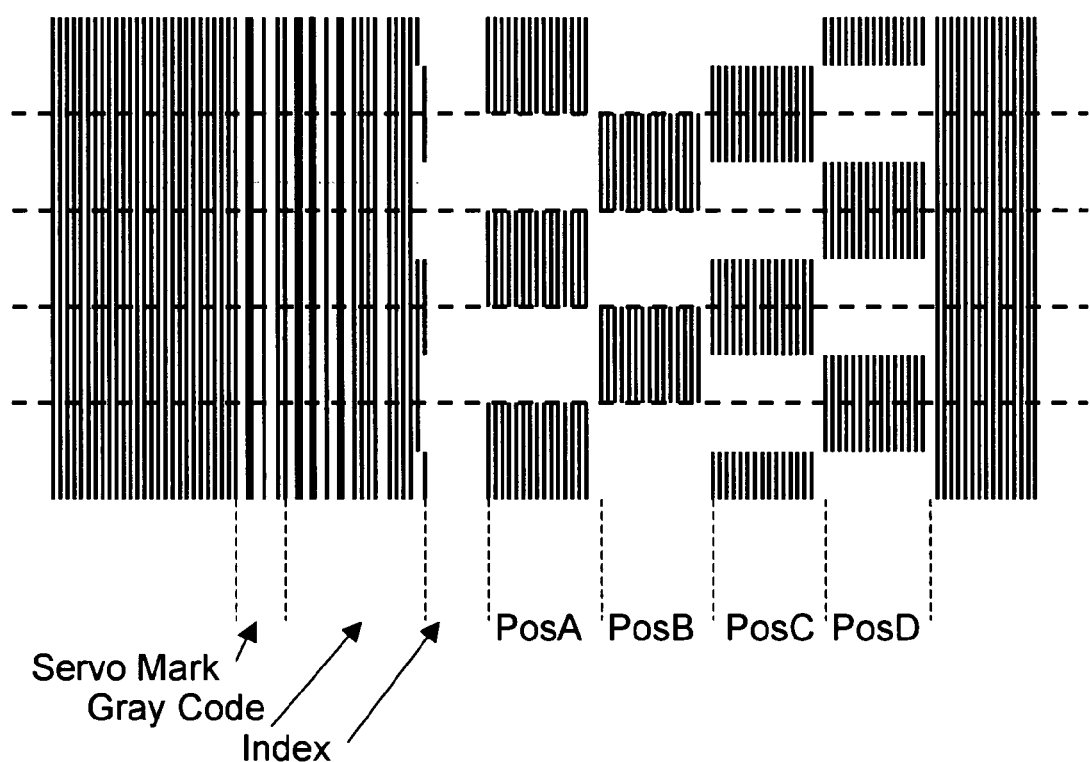
FIG. 3 is a diagram depicting the configuration of the servo signal in FIG. 2.
Figure 4:
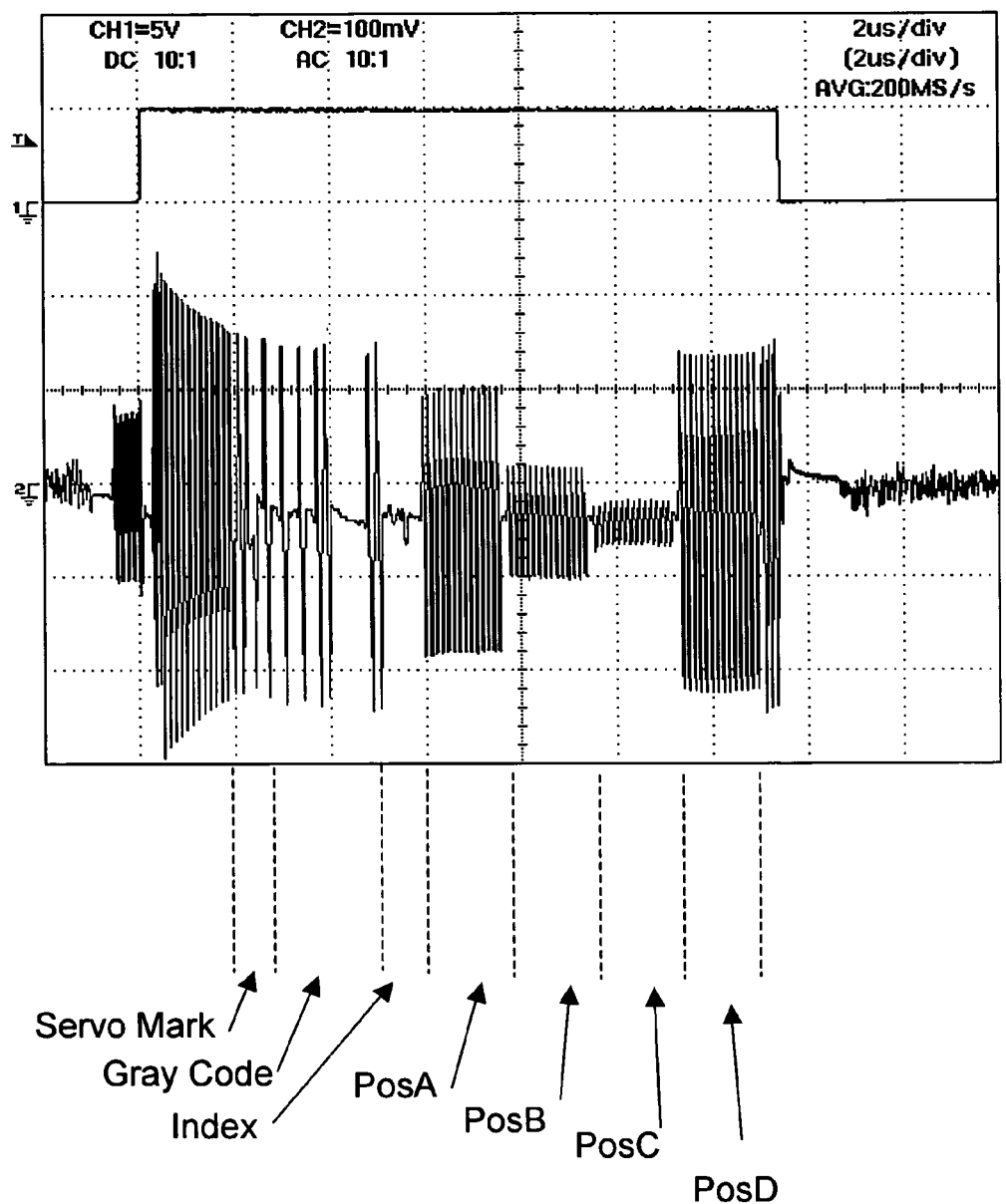
FIG. 4 is a waveform diagram of reading the servo signal in FIG. 3.
Figure 5:
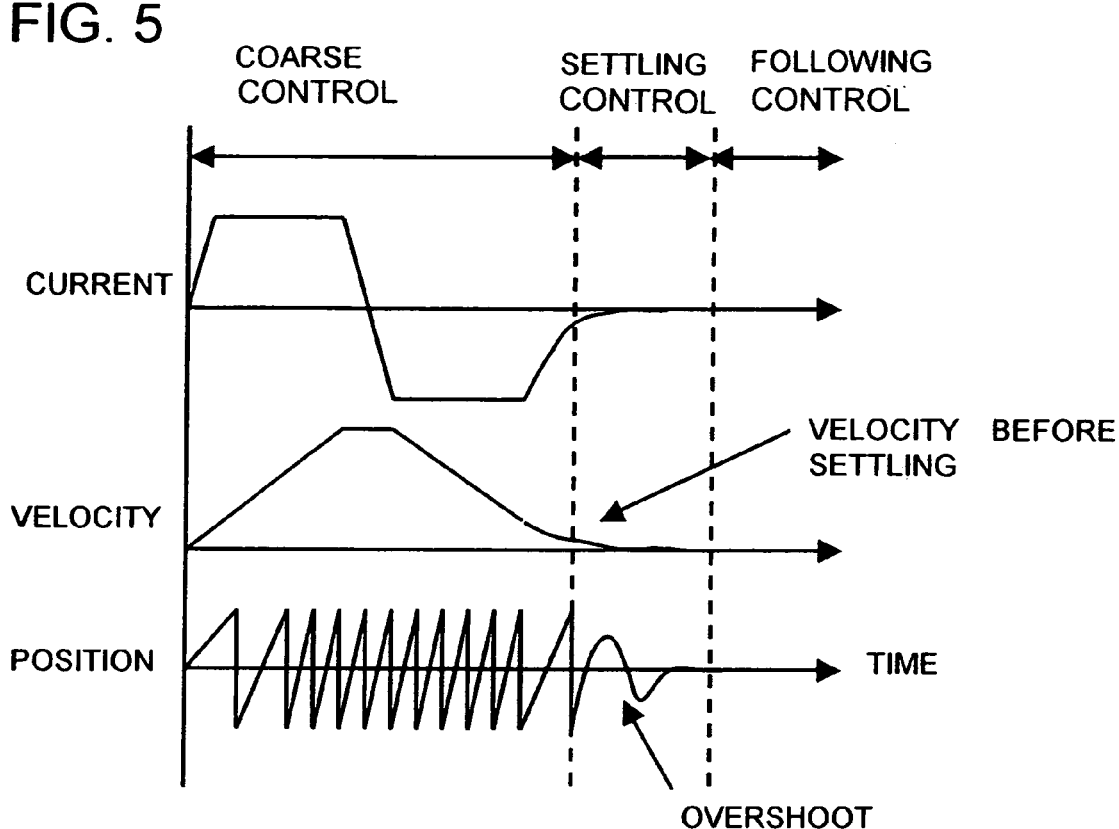
FIG. 5 is a diagram depicting the head control sequence in FIG. 1.
Figure 6:
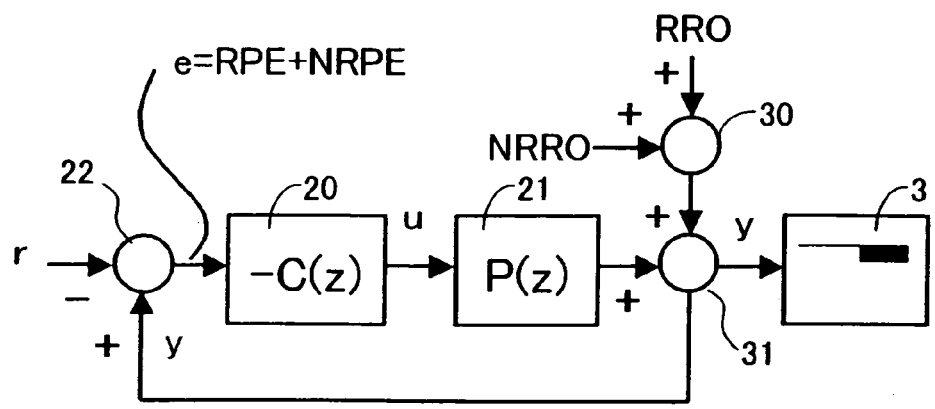
FIG. 6 is a block diagram depicting the servo control system in FIG. 1.

FIG. 1 is a diagram depicting a configuration of a disk storage device according to an embodiment of the present invention, FIG. 2 is a diagram depicting the arrangement of the position signals of the magnetic disk in FIG. 1, FIG. 3 is a diagram depicting the configuration of the position signals of the magnetic disk in FIG. 1 and FIG. 2, FIG. 4 is a waveform diagram depicting the reading of the position signal in FIG. 3, FIG. 5 is a diagram depicting the head position control in FIG. 1, and FIG. 6 is a block diagram depicting the servo control system with the configuration in FIG. 1.

FIG. 1 to FIG. 6 show a magnetic disk device as the disk storage device. As FIG. 1 shows, the magnetic disk 4, which is a magnetic storage medium, is installed at the rotation axis 2 of the spindle motor 5. The spindle motor 5 rotates the magnetic disk 4. The actuator (VCM: Voice Coil Motor) 1 comprises a magnetic head 3 at the top, and moves the magnetic head 3 in the radius direction of the magnetic disk 4.

The actuator 1 is comprised of a voice coil motor (VCM) that rotates around the rotation axis. In FIG. 1, two magnetic disks 4 are installed in the magnetic disk device, and four magnetic heads 3 are simultaneously driven by the same actuator 1. The magnetic head 3 is comprised of a read element and a write element. The magnetic head 3 is constructed by layering read elements, including a magneto-resistance (MR) element, on a slider, and layering write elements, including a write coil, thereon.

The position detection circuit 7 converts the position signals (analog signals) read by the magnetic head 3 into digital signals. The read/write (R/W) circuit 10 controls the reading and writing of the magnetic head 3. The spindle motor (SPM) drive circuit 8 drives the spindle motor 5. The voice coil motor (VCM) drive circuit 6 supplies drive current to the voice coil motor (VCM) 1, and drives the VCM 1.

The microcontroller (MCU) 14 detects (demodulates) the current position using the digital position signal from the position detection circuit 7, and calculates the VCM drive instruction value according to the error between the detected current position and the target position. In other words, position demodulation and servo control are performed. The read only memory (ROM) 13 stores the control programs of the MCU 14. The random access memory (RAM) 12 stores data required for the processing of the MCU 14.

The hard disk controller (HDC) 11 judges the position of the head on a track based on the sector number of the servo signal, and records/regenerates data. The random access memory (RAM) 15 is used as a buffer memory, and temporarily stores read data and write data. The HDC 11 communicates with the host via such an interface IF as ATA and SCSI. The bus 9 connects them.

As FIG. 2 shows, the servo signals (position signals) are arranged on each track in the circumference direction at an equal interval, from the outer track to the inner track. Each track is comprised of a plurality of sectors, and the solid line 16 in FIG. 2 shows the recorded positions of the servo signals. As FIG. 3 shows, a position signal is comprised of a servo mark ServoMark, track number GrayCode, index Index, and offset information (servo burst) PosA, PosB, PosC and PosD. The dotted line in FIG. 3 shows the track center.

FIG. 4 is a signal waveform diagram when the position signal in FIG. 3 is read by the head 3. The position of the magnetic head 3 in the radius direction is detected by using the track number GrayCode and offset information PosA, PosB, PosC and PosD of the signal waveform shown in FIG. 4. Also based on the index signal Index, the position of the magnetic head 3 in the circumference direction is known.

For example, the sector number when the index signal is detected is set to No. 0, and this number is incremented each time the servo signal is detected, and the sector number of each sector of a track is acquired. The sector number of the servo signal becomes a reference when data is recorded and regenerated. There is one index signal on a track. The sector number may be set instead of or along with the index signal.

FIG. 5 is an example of seek control of the actuator performed by the MCU 14 in FIG. 1. Through the position detection circuit 7 in FIG. 1, the MCU 14 confirms the position of the actuator 1, performs servo computation, and supplies an appropriate current to the VCM 1. FIG. 5 shows the transition of control from the start of seeking, when the head 3 is moved from a track position to the target track position, the current of the actuator 1, the speed of the actuator 1 (head 3), and the position of the actuator 1 (head 3).

In other words, in seek control, the head can be moved to the target position by coarse control, settlement control and following control. Coarse control is basically speed control, and settlement control and following control are basically position control, where the current position of the head must be detected for both. Transition from settlement control to following control, that is the completion of seek control, is judged based on RPE. Whether data can be recorded and regenerated during following control can also be judged based on RPE.

To confirm these positions, servo signals are recorded on the magnetic disk in advance, as shown in FIG. 2 to FIG. 4. In other words, as FIG. 3 shows, a servo mark to indicate the start position of the servo signal, a gray code to indicate the track number, an index signal, and signals PosA–PosD to indicate offset, are recorded. This servo signal is read by the magnetic head 3, and the position detection circuit 7 converts this servo signal into a digital value.

The MCU 14 performs computation of the digital servo control system shown in FIG. 6. In other words, the error 'e' between the target position 'r' and the current position 'y' is determined by the computation block 22, and the controller 20 performs control computation, calculates the control amount and drives the VCM 1, that is the plant 21. For the position of the plant 21, the current position 'y' is acquired by demodulating the servo signal from the magnetic head 3. The difference between the current position 'y' and the target position 'r' becomes the position error 'e'.

In FIG. 6, the components synchronizing rotation of the spindle motor 5 and the components not synchronizing are denoted as RRO, NRRO, RPE and NRPE as the disturbance applied to the control system. RRO (Repeatable Run Out) are the components of positional disturbance synchronizing rotation. NRRO (Non-Repeatable Run Out) are components of positional disturbance not synchronizing rotation. In the present invention, all disturbances are considered in position units. For example, the wind disturbance applied to the actuator 1 is expressed in acceleration units, but this is converted into position units here. RPE (Repeatable Position Error) are components synchronizing rotation included in the position error 'e' when positioning control is performed. NRPE (Non-Repeatable Position Error) are components not synchronizing rotation included in the position error 'e' when positioning control is performed. RRO and RPE show different values depending on the servo sector.

If this RPE can be observed without errors, the RroTable or URroTable can be generated correctly. But in practical terms, RPE must be determined from the observing position 'y', and the observing position 'y' includes not only RPE but NRPE as well. This NRPE becomes an error when REP is observed. Therefore in order to minimize the influence of NRPE, a method of increasing the number of times of measurement is generally used.

In other words, the average value of the observing positions 'y' measured when using a plurality of times of sampling is determined in order to determine RPE, but measurement time is limited, and the influence of NRPE therefore cannot be completely suppressed to zero. In particular, when RPE is measured in an extremely short measurement time, such as one rotation or two rotations, a method for decreasing the influence of NRPE included as an error has been demanded. Now a method for decreasing the influence of error required for generating RroTable will be generated.

Optimum Gain Determination Method for Creating RRO Correction Table

Figure 7:
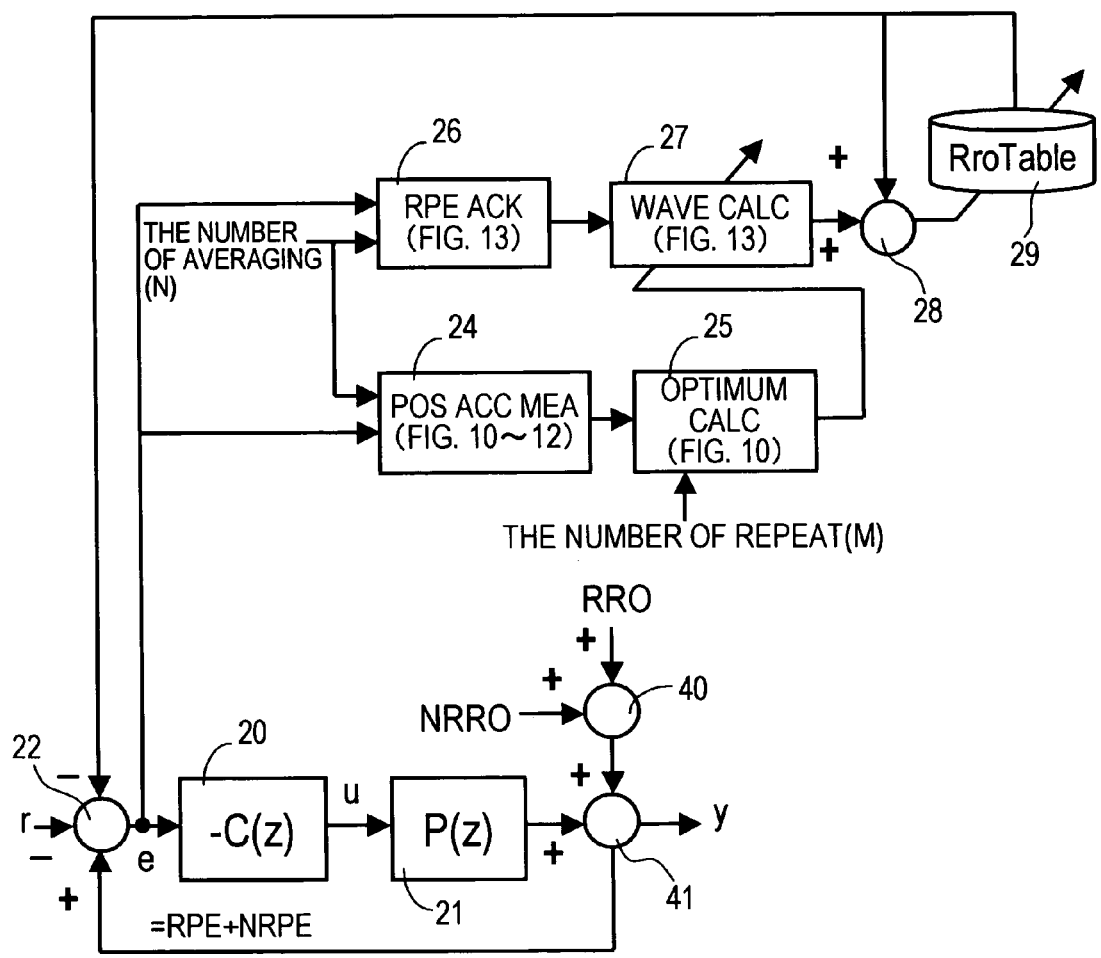
FIG. 7 is a block diagram depicting a servo control system having the RRO correction function according to an embodiment of the present invention.
Figure 8:
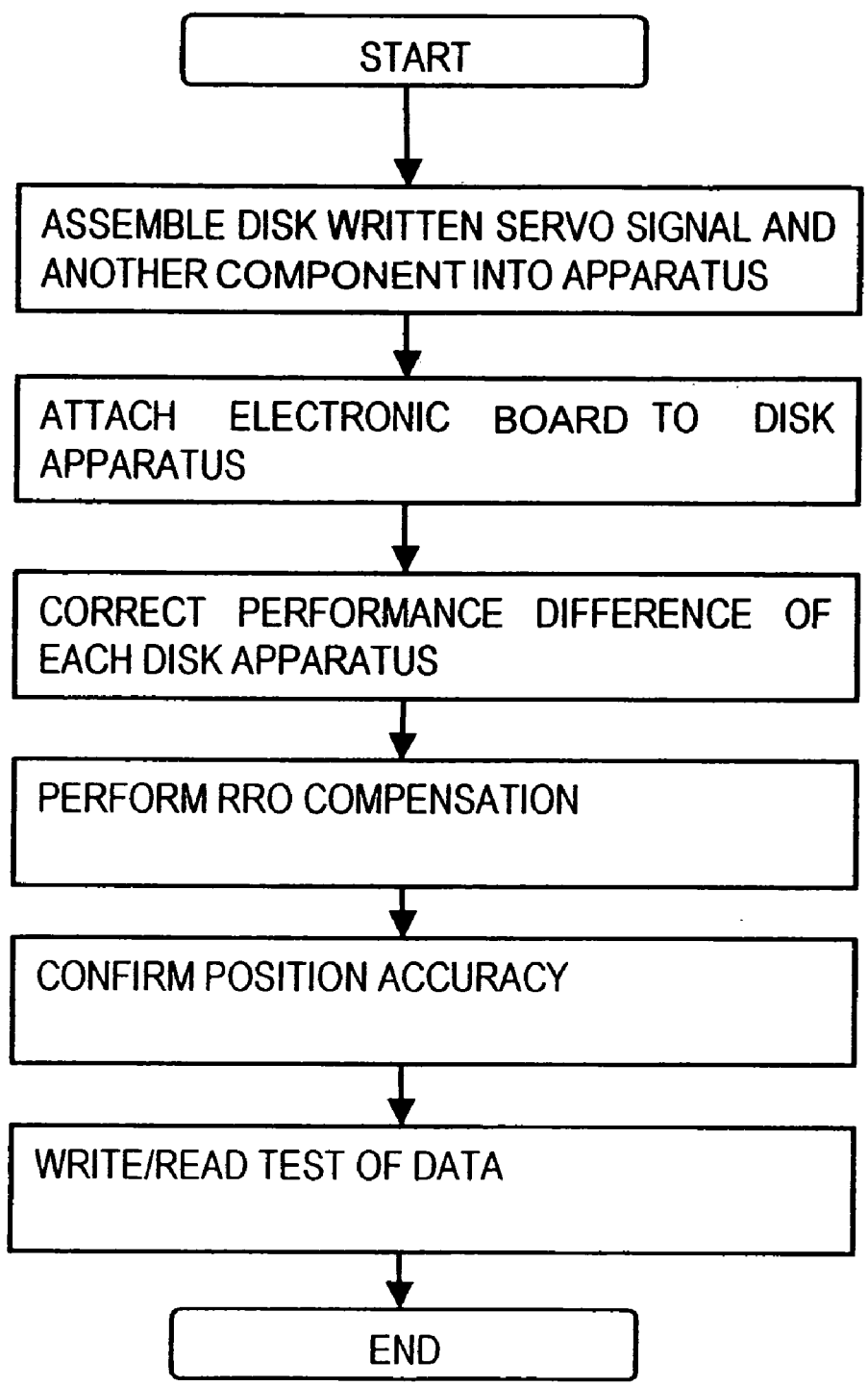
FIG. 8 is a flow chart depicting the manufacturing steps of the disk device in FIG. 1.
Figure 9:
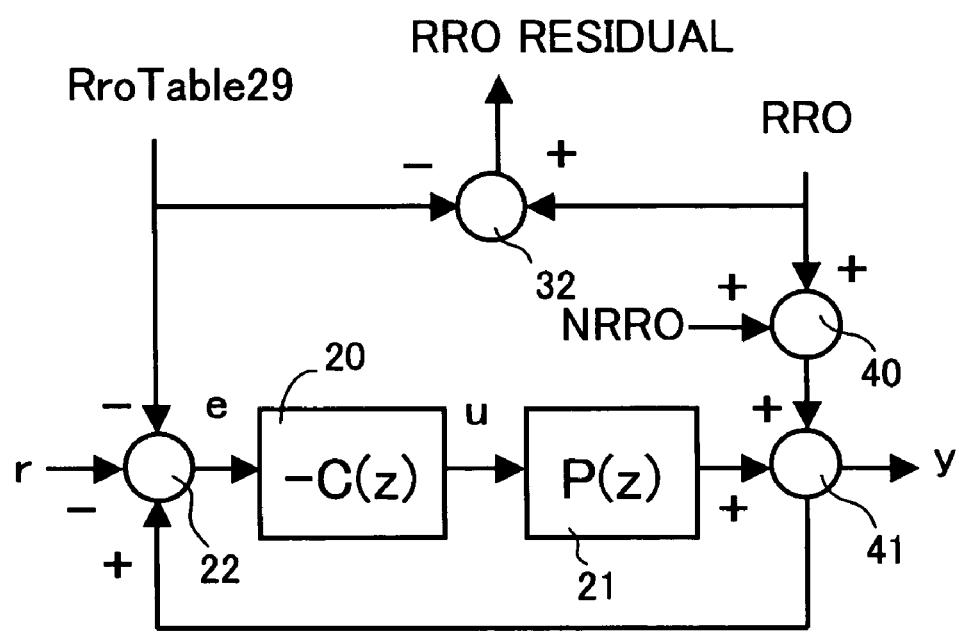
FIG. 9 is a diagram depicting the evaluation function in FIG. 7.
Figure 10:
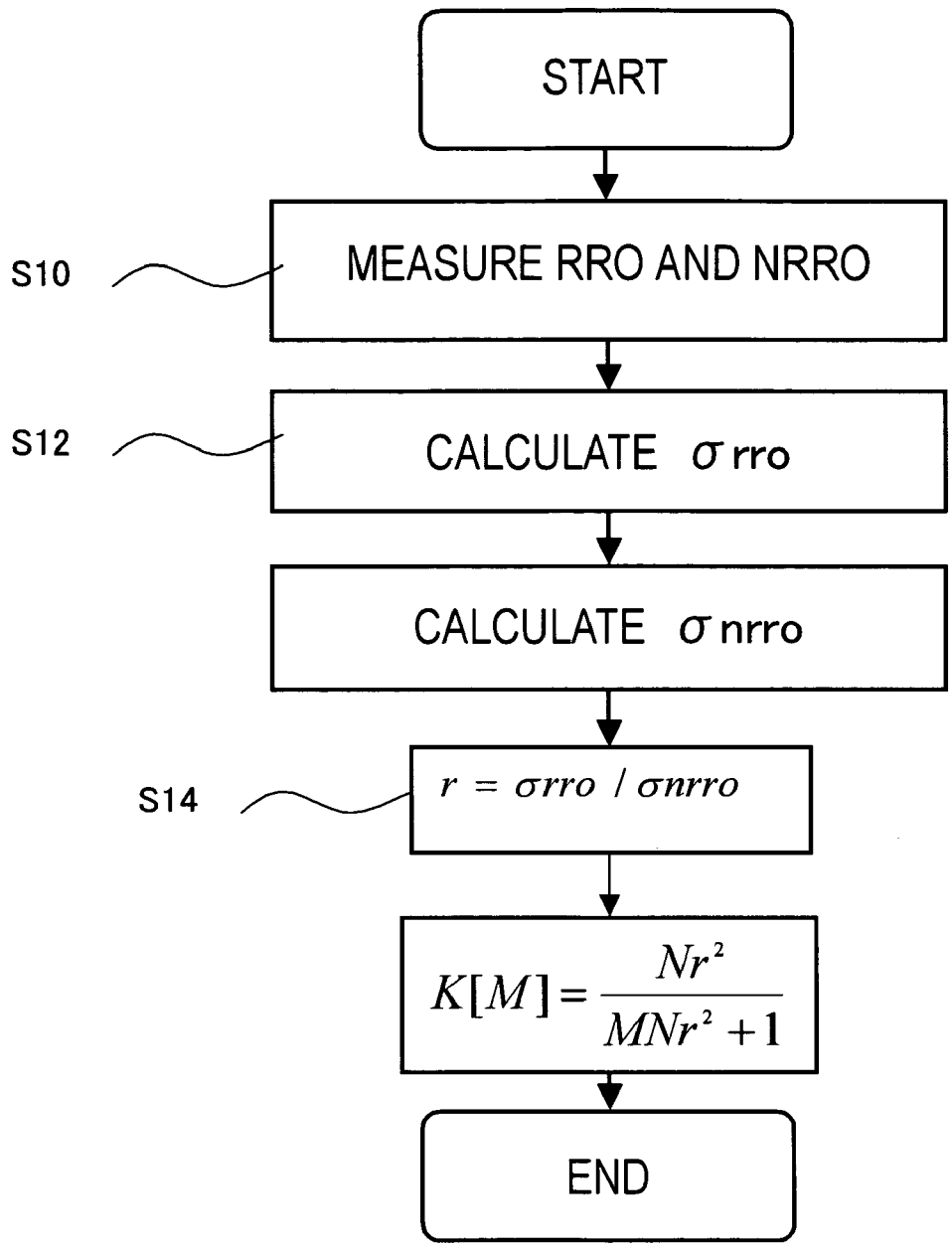
FIG. 10 is a flow chart depicting the addition gain measurement processing in FIG. 7.
Figure 11:
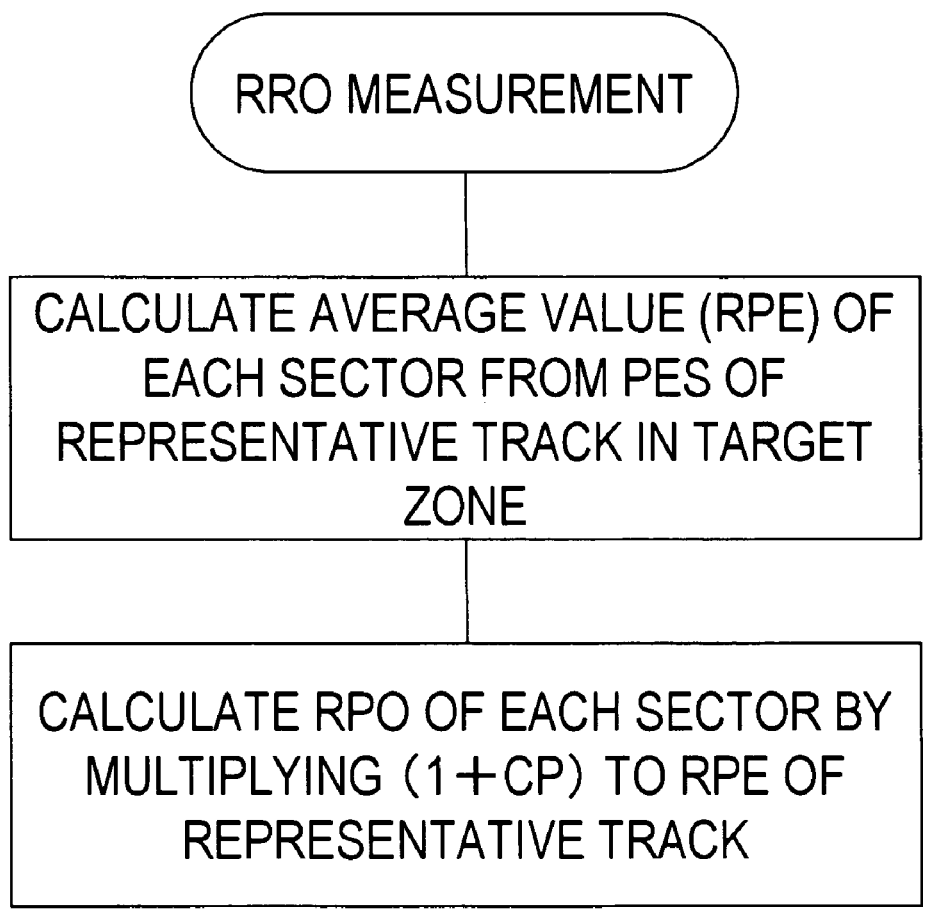
FIG. 11 is a flow chart depicting the RRO measurement processing in FIG. 10.
Figure 12:
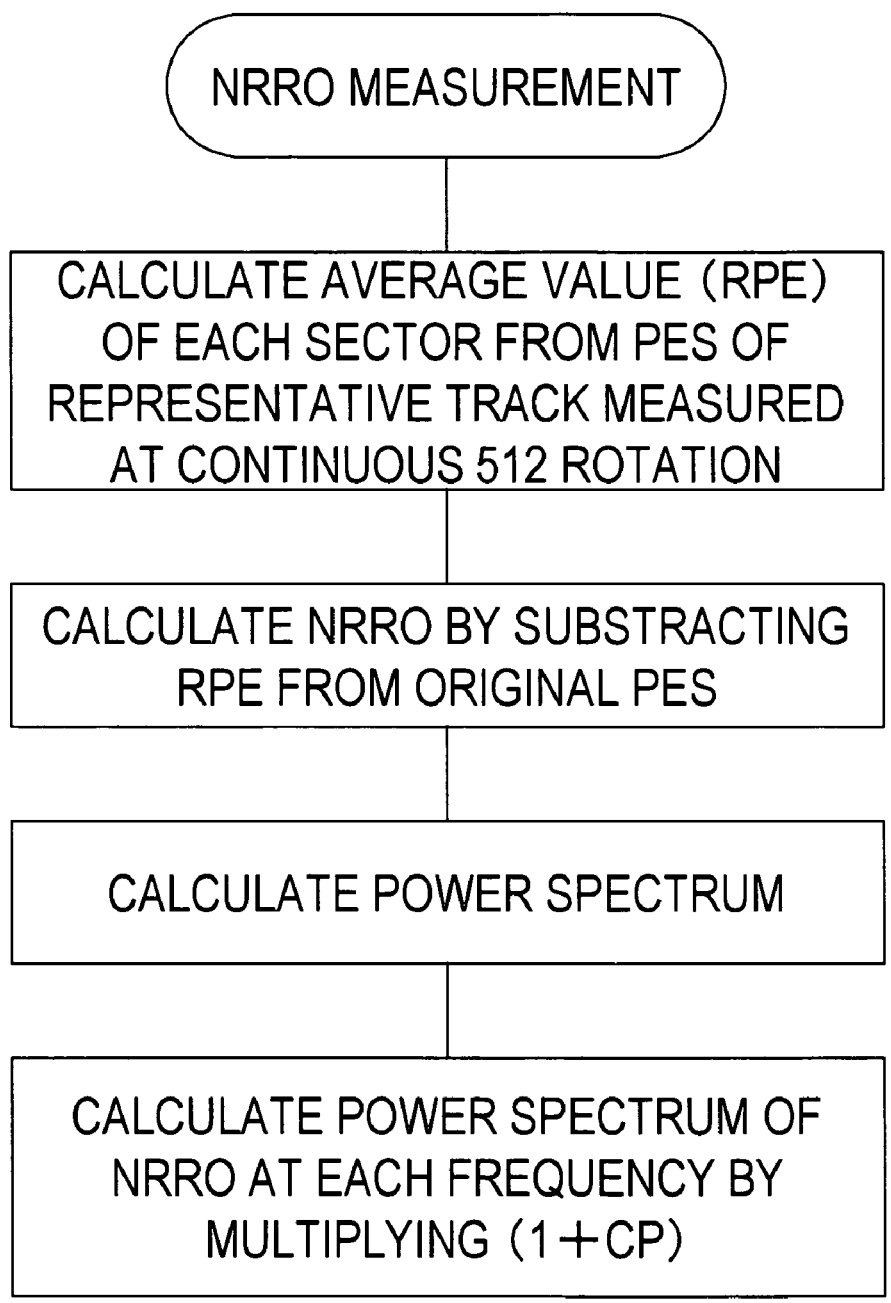
FIG. 12 is a flow chart depicting the NRRO measurement processing in FIG. 10.

FIG. 7 is a block diagram depicting the first embodiment of the head positioning control system of the present invention, FIG. 8 is a flow chart depicting the manufacturing steps of the disk device of the present invention, FIG. 9 is a diagram depicting the residual RRO for creating RroTable, FIG. 10 is a flow chart depicting the RRO gain optimum value calculation processing using the residual RRO in FIG. 9, FIG. 11 is a flow chart depicting the RRO measurement processing, and FIG. 12 is a flow chart depicting the NRRO measurement processing in FIG. 10.

FIG. 7 is a block diagram for the case when the optimum value calculation and the correction table creation are performed on a single disk device unit, and composing elements the same as those in FIG. 6 are denoted with the same reference numerals. In other words, the error 'e' between the target position 'r' and the current (observing) position 'y' is determined by the computation block 22, the controller 20 performs control computation, calculates control amount and drives the VCM 1, that is the plant 21. For the position of the plant 21, servo signals are demodulated from the magnetic head 3, and the current position 'y' is acquired. The difference between the current position 'y' and the target position 'r' becomes the position error 'e'. As disturbances to be applied to this control system, components synchronizing rotation of the spindle motor 5 and components not synchronizing are shown as RRO, NRRO, RPE and NRPE.

Figure 13:
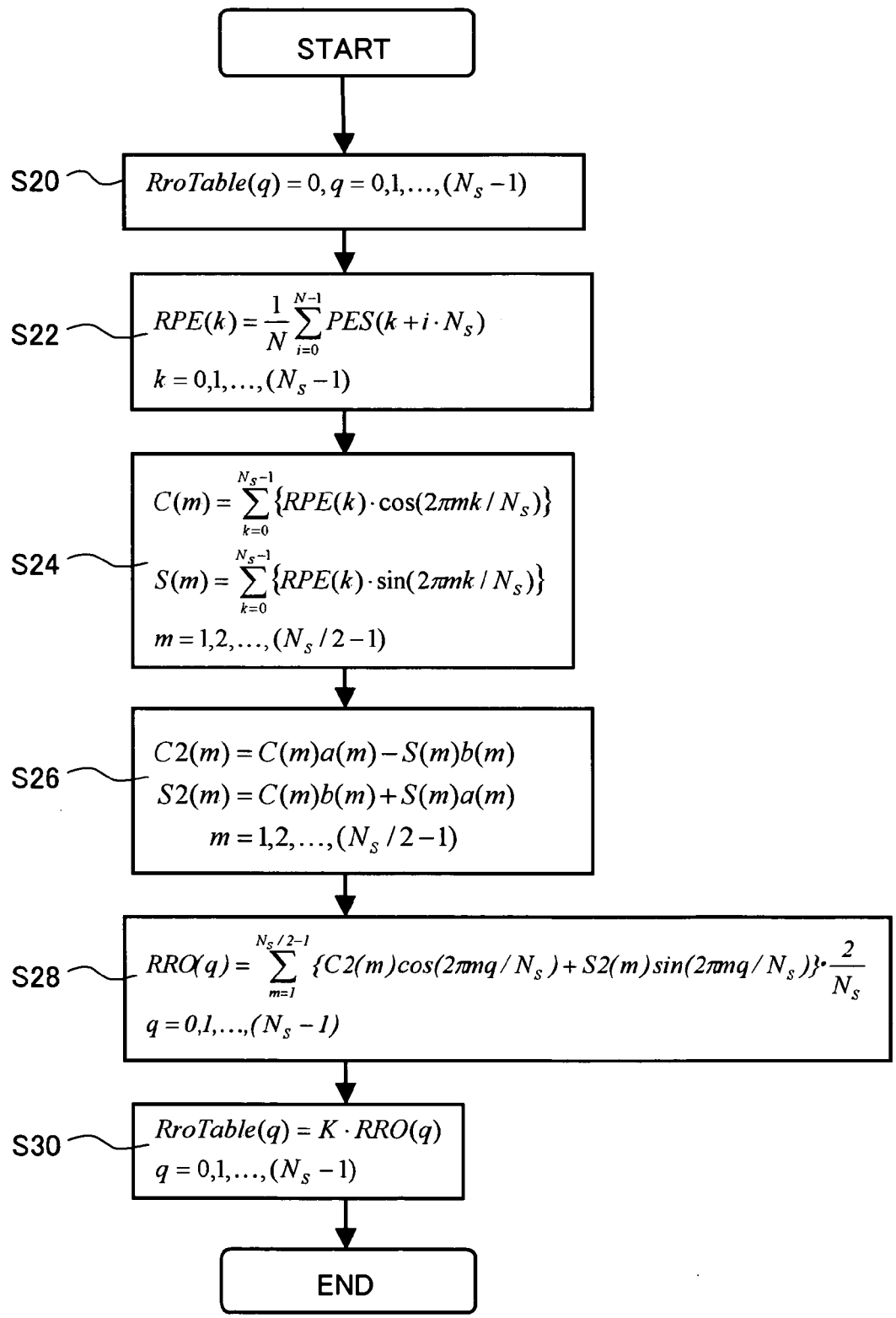
FIG. 13 is a flow chart depicting the RroTable creation processing in FIG. 7.

The RPE acquisition block 26 acquires RPE from the position error 'e' for each sector, as described in FIG. 13. The positioning accuracy measurement block 24 measures the positioning accuracy from the position error 'e', as described later in FIG. 10 to FIG. 12. The optimization calculation block 25 calculates the optimum gain when the number of repeats is M, as described in FIG. 10. The waveform calculation block 27 calculates the RRO waveform by multiplying RPE acquired by the RPE acquisition block 26 by the optimum gain as described later in FIG. 13. The RRO table 29 stores the RRO waveform. The addition block 28 adds the RRO waveform for the number of repeats, and updates the table 29, as described later in FIG. 13.

After creating the RRO table 29, the target position 'r' and the Rro table value of the correction table 29 are subtracted from the observing position 'y', and the position error 'e' is generated by the computation block 22 in magnetic disk device operating status (particularly in the following status). By this, RRO correction is performed for the input 'e' to the controller 20.

Before describing the optimum value (gain) calculation and the correction table calculation, the manufacturing steps of the magnetic disk device will be described with reference to FIG. 8. First a disk on which servo signals have been recorded and other mechanical components (e.g. VCM, magnetic head and spindle motor in FIG. 1) are assembled. Then an electronic board on which various circuits (e.g. MCU, HDC in FIG. 1) are mounted is installed on the disk device. Then the respective difference of the disk device, regarding the output of the magnetic head and the current value of VCM, is calculated.

Then the above-mentioned RRO correction table is created using the magnetic disk device after calibration. Then using the RRO correction table, VCM 1 is driven and the positioning accuracy of the magnetic head is measured and confirmed for each track. A track for which a desired positioning accuracy cannot be acquired is not used, and an alternative track is set. Also the data recording/regeneration test is performed to check if a desired recording/regeneration is possible. And the confirmed magnetic disk device is shipped out to the market.

Now the evaluation function for calculating the optimum value of the gain will be described. First RroTable (correction table) is generated, and a specific sector is considered, for residual RRO after RRO correction is executed, for positioning control. In other words, as FIG. 9 shows, the residual RRO is the result of subtracting the RRO correction value of RroTable 29 from the actual RRO.

Here it is assumed that the value of the sum of RRO+NRRO can be observed by applying a discrete Fourier transform (DFT) to the observing position 'y'. This waveform of RRO+NRRO is observed continuously for N rotations, and the average value of each sector is measured. It is assumed that RRO of this sector is R0. It is also assumed that the value of NRRO at each measurement changes as n11, n12, . . . , n1N. At this time, the waveform of RRO+NRRO after averaging for N rotations, that is the RRO estimated value, is given by the following expression (10).

$$R_0 + 1/N \sum_{i=1}^{N} n_{1i} \quad (10)$$

This value is multiplied by the gain K, and the result is substituted in the RRO correction table RroTable 29. (The RRO correction table is "0" because this is the first measurement.) Then positioning control is performed using the RRO correction table, and the residual RRO is given by the expression (11).

$$R_1 = R_0 - K\left\{R_0 + 1/N \sum_{i=1}^{N} n_{1i}\right\} = (1-K)R_0 - K/N \sum_{i=1}^{N} n_{1i} \quad (11)$$

In the same way, the second measurement is performed where the value is multiplied by the addition gain K, and the result is added to the RRO correction table 29, and positioning control is performed using the RRO correction table, then the residual RRO: R2, is given by the expression (12).

$$R_2 = R_1 - K\left\{R_1 + 1/N \sum_{i=1}^{M} n_{2i}\right\} \quad (12)$$

$$= (1-K)^2 R_0 - K/N\left\{(1-K)\sum_{i=1}^{N} n_{1i} + \sum_{i=1}^{N} n_{2i}\right\}$$

If this is repeated sequentially, then the residual RRO: RM, after M times of correction is given by the following expression (13). In the following expression however, the suffix of NRRO "i" is replaced with "j".

$$R_M = (1-K)^M R_0 - K/N \sum_{i=1}^{M}\left\{(1-K)^{i-1}\sum_{j=1}^{N} n_{ij}\right\} \quad (13)$$

R0, which is the original RRO of each sector, is assumed to present normal distribution if it is observed at many tracks. It is generally known that NRRO also presents normal distribution. And RRO and NRRO are not correlated. Therefore RRO and NRRO can be considered independently.

In other words, the components created by RRO in the first term at the right hand side in expression (13), and the components caused by NRRO in the second term, can be handled separately. For variance when the residual RRO is determined at many points, the standard deviations corresponding to the first term of expression (13) and the standard deviation corresponding to the second term thereof are determined independently, the sum of the squares of the respective results becomes the variance.

First for the RRO of the first term, Nm number of RROs at each sector are measured at many tracks, and if the values are R1, R2, . . . , RNm, the standard deviation σRRO of the RRO is determined by the following expression (14).

$$\sigma_{RRO}^2 = \sum_{i=1}^{Nm} Ri^2/(Nm-1) \tag{14}$$

The components created by RRO in the residual RRO after correction follow the first term at the right hand side of expression (13), so RRO at many points is regarded as R1, R2, . . . , RNm instead of RO in the first term at the right hand side, and this is substituted in expression (14), then the variance of the components created by RRO in the residual RRO: RM (square of standard deviation σRRO) can be expressed by the following expression (15).

$$\sum_{i=1}^{Nm} \{(1-K)^M Ri\}^2/(Nm-1) = (1-K)^{2M} \sum_{i=1}^{Nm} Ri^2/(Nm-1) \tag{15}$$
$$= (1-K)^{2M} \sigma_{RRO}^2$$

Then for NRRO, the standard deviation caused by NRRO is assumed to be σNRRO. The distribution of nij in the second term at the right hand side in expression (13) follows this standard deviation σNRRO. In other words, if the sum of NRRO for N samples is expressed by the standard deviation σNRRO, that is an expected value of the sum, then the result becomes the following expression (16).

$$\sum_{i=1}^{N} n_{ij} = \left(\sum_{i=1}^{N} \sigma_{NRRO}^2\right)^{0.5} = \sqrt{N} \, \sigma_{NRRO} \tag{16}$$

Therefore if the variance of the components caused by NRRO in the second term at the right hand side in expression (13) is expressed using σNRRO, expression (16) is substituted in the second term at the right hand side of expression (13), and the result is squared, then this result can be expressed by the following expression (17).

$$K^2/N^2 \sum_{i=1}^{M} \{(1-K)^{2(i-1)} (\sqrt{N} \, \sigma_{NRRO})^2\} = \tag{17}$$

$$K^2/N \sum_{i=1}^{M} (1-K)^{2(i-1)} \sigma_{NRRO}^2$$

Therefore the variance of residual RRO after correction (square of σ) can be expressed by expression (18), using expression (15) and expression (17). This becomes an evaluation expression for calculating the effect of RRO correction. Under given conditions, the variables can be adjusted so that the value of expression (18) becomes the minimum. If this expression is used, a combination of optimum variables: N (number of samples), M (number of repeats of measurement and correction) and K (addition gain), can be determined according to the σ ratio of RRO and NRRO.

$$(\text{residual } RRO\sigma)^2 = (1-K)^{2M}\sigma_{RRO}^2 + K^2/N \sum_{i=1}^{M} (1-K)^{2(i-1)} \sigma_{NRRO}^2 \tag{18}$$

Then an algebraic solution of the optimum conditions to minimize the residual RRO is determined from expression (18). First the case when the number of repeats M is "1" is considered. In expression (18), if the value of the number of repeats M is "1", then expression (18) becomes the following expression (19).

$$(\text{residual}RRO\sigma)^2 = (1-K)^2\sigma_{RRO}^2 + (K^2/N)\sigma_{NRRO}^2 \tag{19}$$

If the ratio of the respective a of RRO and NRRO before correction is 'r' and is substituted in expression (19), then the standard deviation r [1] of the residual RRO, normalized using the ratio 'r', can be expressed as the following expression (20).

$$r^2 = \sigma_{RRO}^2/\sigma_{NRRO}^2$$

Variance of normalized residual RRO=$r[1]^2$=(1−K)$^2r^2+K^2/N$ (20)

In order to determine the addition gain K to minimize the residual RRO, the conditions, under which the value when expression (20) is differentiated with K becomes "0", are determined. In other words, if the differential value is "0", then the residual RRO becomes the minimum. Therefore the addition gain K, that minimizes the residual RRO, can be acquired by the following expression (21).

$$\frac{\partial}{\partial K} r[1]^2 = -2(1-K)r^2 + 2K/N = 0 \tag{21}$$
$$\rightarrow K = \frac{Nr^2}{Nr^2+1}$$

At this time the standard deviation r [1] of the normalized residual RRO (normalized residual RRO after first correction) of the expression (20) is acquired by the following expression (22) substituting expression (21) in expression (20).

$$r[1]^2 = \left(1 - \frac{Nr^2}{Nr^2+1}\right)^2 r^2 + \left(\frac{Nr^2}{Nr^2+1}\right)^2 \frac{1}{N} \tag{22}$$
$$= \frac{r^2}{(Nr^2+1)^2} + \frac{Nr^4}{(Nr^2+1)^2} = \frac{r^2}{Nr^2+1}$$

As a consequence, for the optimum gain K, the variance of the normalized residual RRO, the variance of the residual RRO, the ratio of the residual RRO to the original RRO, which indicates the positioning accuracy, and the RRO reduction ratio, the relational expressions shown in the following (23), can be derived. By this, if N (number of samples), σRRO (standard deviation of RRO) and σNRRO (standard deviation of NRRO) are given, then the gain K to minimize the residual RRO is uniquely determined.

Optimum gain: $K = \dfrac{Nr^2}{Nr^2+1}$ (23)

Variance of normalized residual RRO: $r[1]^2 = \dfrac{r^2}{Nr^2+1} = \dfrac{K}{N}$ Variance of residual RRO: $r[1]^2 \sigma_{NRRO}^2 = \dfrac{r^2}{NR^2+1} \sigma_{NRRO}^2$
$= \dfrac{K}{N} \sigma_{NRRO}^2$ Ratio of residual RRO to original RRO: $\sqrt{\dfrac{1}{Nr^2+1}} = \sqrt{\dfrac{K}{Nr^2}}$ RRO reduction rate: $1 - \sqrt{\dfrac{1}{Nr^2+1}} = 1 - \sqrt{\dfrac{K}{Nr^2}}$ The above expressions exist when the number of repeats M of measurement and correction is "1", and the optimum addition gain K [k] and the normalized residual RRO: r [M] when the number of repeats M is 2 or more are determined. From expression (21) and expression (22), the following expression (24) is acquired. Here K [1] and K [2] are gains with different values. In other words, each time one measurement and correction is repeated, the optimum addition gain K can be set for each time, changing the addition gain K value.

$K[M] = \dfrac{Nr^2}{MNr^2+1}$ (24)

$r[M]^2 = \dfrac{K[M]}{N} = \dfrac{r^2}{MNr^2+1}$

Therefore when the number of repeats M is an arbitrary number, the relational expressions shown in the following (25) are acquired, just like expressions (23).

Optimum gain at Mth repeat: $K[M] = \dfrac{Nr^2}{MNr^2+1}$ (25)

Variance of normalized RRO at Mth repeat:

$r[M]^2 = \dfrac{K[M]}{N} = \dfrac{r^2}{MNr^2+1}$

Variance of RRO at Mth repeat:

$r[M]^2 \sigma_{NRRO}^2 = \dfrac{K[M]}{N} \sigma_{NRRO}^2 = \dfrac{r^2}{MNr^2+1} \sigma_{NRRO}^2$ Ratio of residual RRO to original RRO:

$\sqrt{\dfrac{1}{MNr^2+1}} = \sqrt{\dfrac{K[M]}{Nr^2}}$

RRO reduction rate: $1 - \sqrt{\dfrac{1}{MNr^2+1}} = 1 - \sqrt{\dfrac{K[M]}{Nr^2}}$ With reference to FIG. 11 and FIG. 12, the optimum gain calculation processing is described according to FIG. 10.

(S10) Using the magnetic disk device with the configuration shown in FIG. 1, the magnetic disk 4 is rotated, and the magnetic head 3 is track-follow controlled by the control system shown in FIG. 7 according to the servo information of the magnetic disk 4, and RRO and NRRO are measured. For the measurement of RRO, the magnetic disk is divided into a plurality of zones in the radius direction, as shown in FIG. 11, and the magnetic head is positioned in a representative track of each target zone. And the positioning accuracy measurement block 24 in FIG. 7 measures PES (Positioning Error Signal (error 'e' in FIG. 7) in each sector of the representative track in all the target zones. The measurement block 24 calculates the average value of the plurality of tracks for each sector, and acquires the average value as RPE (Repeatable Position Error). As expressions (3) show, this RPE of each sector is multiplied by the transfer function (1+CP) so as to calculate the RRO of each sector. In the same way, for the measurement of NRRO, PES of one representative track of each sector is measured for a relatively long time, e.g. 512 rotations of the disk, as shown in FIG. 12, and the average value thereof is calculated as RPE. Then for each sector, RPE is subtracted from the measured PES, and NRPE of each sector is calculated. The power spectrum of this calculated NRPE is calculated by an FFT (Fast Fourier Transform), and is separated into each frequency. NRPE separated for each frequency is multiplied by the transfer function (1+CP) as shown in expressions (3), and the power spectrum of NRRO for each frequency is calculated.

(S12) Then the optimum value calculation block 25 in FIG. 7 calculates the standard deviation σrro of RRO from the determined RRO of each sector according to expression (14). In the same way, the standard deviation σnrro of NRRO is calculated from the determined NRRO of each sector according to expression (16).

(S14) The ratio 'r' of the standard deviation σ is calculated from the standard deviation σrro of RRO and the standard deviation σnrro of NRRO using expression (20), and the optimum gain K or K [M] is calculated using expression (21) or expression (24).

In this way, the evaluation function is determined with the residual RRO after correction as the evaluation target, and the gain to minimize the residual RRO, that is to minimize the RRO after correction, is theoretically determined from the evaluation function. Therefore the correction table creation gain can be determined without depending on experiment. Also the value of RRO after correction can be guaranteed, and the manufacturing time and device specifications can be determined.

RRO Correction Table Creation Method

FIG. 13 is a flow chart depicting the RRO correction table creation processing when M=1. Here it is assumed that the optimum gain K has been determined by the positioning accuracy measurement block 24 and the optimum value calculation block 25 in FIG. 7 in the processing in FIG. 10, and the RRO correction table 29 creation processing, by the RPE acquisition block 26 and the waveform calculation block 27 in FIG. 7 will be described.

(S20) First the RroTable correction value ProTable (q) of each sector q of the correction table 29 is initialized to "0". 'q' here takes a value 0–(Ns−1). In other words, the number of servo sectors in one rotation is Ns.

(S22) The position error PES of each sector k for all the N rotation of the magnetic disk 4, that is PES (k+i·Ns) is measured, and the average value RPE (k) of the position error PES of each sector k is calculated. In other words, here it is assumed that the pointer of the sector is 'k', the number of servo sectors in one rotation is Ns, and 'i' is the number of rotations (first cycle, second cycle, . . . , Nth cycle). Therefore in the expression in FIG. 13, the sum of the position error of each rotation of a same sector k, that is PES (k+i·Ns), is determined, and divided by the number of measurement rotations N so as to obtain the average.

(S24) Then DFT is performed for the RPE waveform that was observed first. If the number of servo sectors in one rotation is Ns, the RRO degree that must be considered at this time is 1 to (Ns/2−1) according to the sampling theorem. To perform DFT for the m degree of the RRO frequency, m order of coefficients of cos and sin are expressed as C(m) and S(m) respectively, and one rotation of the RPE waveform from sector No. 0 to No. (Ns−1) is multiplied by m order of the cos waveform and the sin waveform, and is added. In other words, expression (26) is calculated.

$$C(m) = \sum_{k=0}^{N_S-1} \{RPE(k) \cdot \cos(2\pi mk/N_S)\}$$

$$S(m) = \sum_{k=0}^{N_S-1} \{RPE(k) \cdot \sin(2\pi mk/N_S)\}$$

$$m = 1, 2, \ldots, (N_S/2 - 1)$$

(26)

(S26) Then to determine Rro (or Urro), the transfer function is multiplied for each RRO degree. The frequency characteristic to be multiplied (complex number value of the m order of the RRO frequency) is determined in advance as a (m)+jb (m). Specifically the complex number value of the m order of the frequency is determined by the transfer function shown in expression (5) or in expression (7). By multiplying these characteristics, the m order of components can be expressed by expression (27) with complex number values. That is, $C2(m)$ and $S2(m)$ are determined from C(m), S(m), a(m) and b(m).

$$C2(m)=C(m)a(m)-S(m)b(m)$$

$$S2(m)=C(m)b(m)+S(m)a(m)$$

$$m=1,2,\ldots,(N_s/2-1) \quad (27)$$

(S28) Then inverse DFT is performed and the waveform to be determined is acquired. The m order of computation is performed from the first order to the (Ns/2−1)th order. When the RroTable is generated, the qth RRO waveform: RRO (q) of the sector, is determined by the following expression (28) (the same expression is also used for generating the later mentioned URroTable).

$$RRO(q) = \sum_{m=1}^{N_S/2-1} \{C2(m)\cos(2\pi mq/N_S) + S2(m)\sin(2\pi mq/N_S)\} \cdot \frac{2}{N_S}$$

$$q = 0, 1, \ldots, (N_S - 1)$$

(28)

(S30) Finally the determined RRO (q) is multiplied by the above-mentioned optimum gain K and is stored in the RroTable (q) of the correction table 29, and processing ends.

Figure 14:
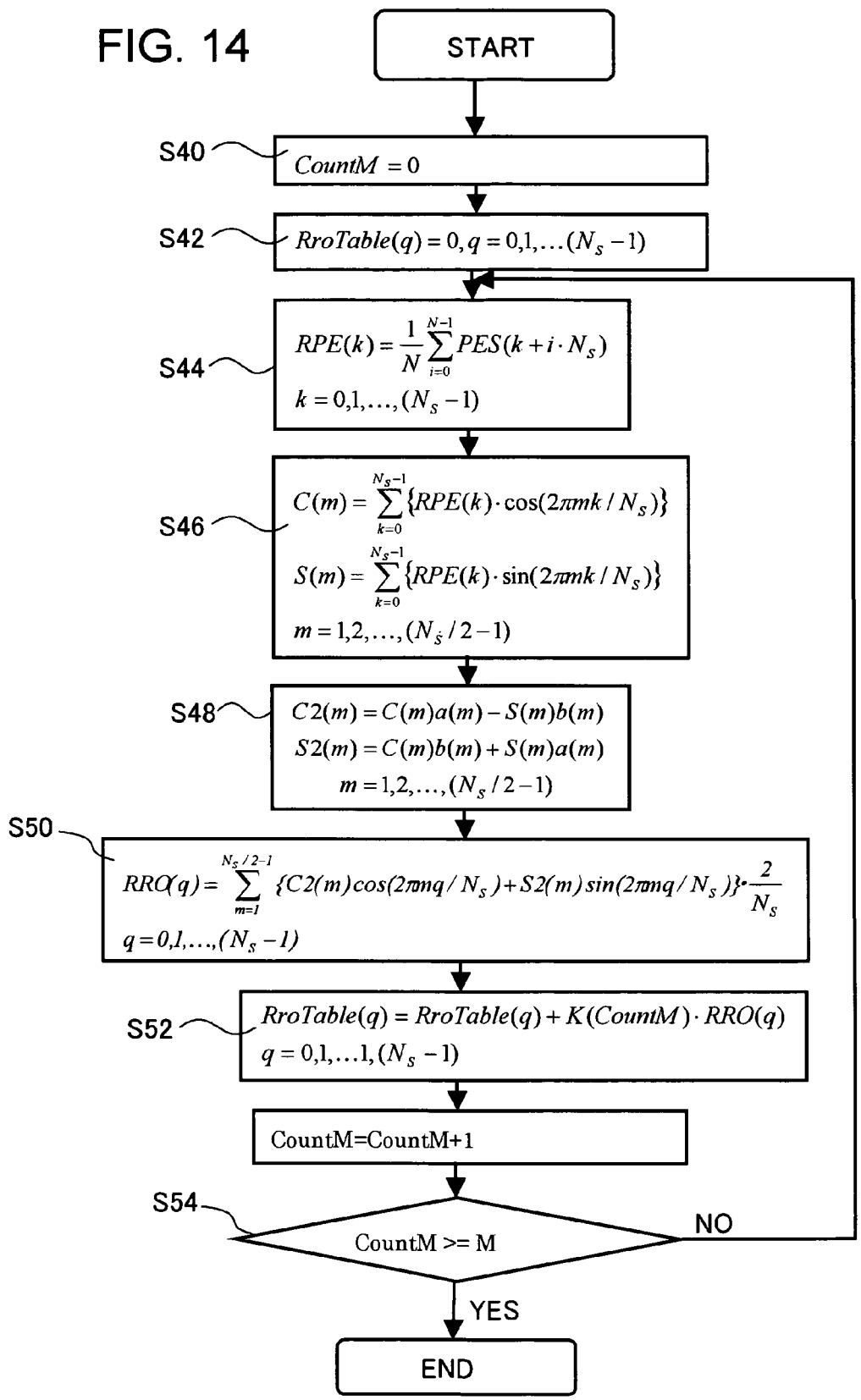
FIG. 14 is a flow chart depicting another RroTable correction processing in FIG. 7.

Now the case when the number of times of measurement and correction (repeats) M is 2 or more will be described. FIG. 14 is a flow chart depicting the RRO correction table creation processing when M is 2 or more. Here as well it is assumed that the optimum gain K (M) has been determined in the processing in FIG. 10 by the positioning accuracy measurement block 24 and the optimum value calculation block 25 in FIG. 7, and the RRO correction table 29 creation processing by the RPE acquisition block 26 and the waveform calculation block 27 in FIG. 7 will be described.

(S40) The measurement and correction count value Count M is initialized to "0".

(S42) First, just as in FIG. 13, the RRO correction value ProTable (q) of each sector q of the correction table 29 is initialed to "0". 'q' here is a value in a 0 to (Ns-1) range. In other words, the number of servo sectors in one rotation is Ns.

(S44) The position error PES of each sector k of all the N rotations of the magnetic disk 4, that is PES (k+i·Ns), is measured, and the average value RPE (k) of the position error PES of each sector k is calculated. In other words, here it is assumed that the pointer of the sector is k, the number of servo sectors in one rotation is Ns, and 'i' is the number of rotations (first cycle, second cycle, . . . , Nth cycle). Therefore in the expression in FIG. 14, the sum of the position error of each rotation of a same sector k, that is PES (k+i·Ns), is determined, and is divided by the number of measurement rotations N so as to obtain the average.

(S46) Then DFT is performed for the RPE waveform that was observed first. If the number of servo servers in one rotation is Ns, then the RRO degree is 1 to (Ns/2−1) according to the sampling theorem. To perform DFT for the m degree of the RRO frequency, m order of coefficients of cos and sin are expressed as C(m) and S(m) respectively, and one rotation of an RPE waveform from sector No. 0 to No. (Ns−1) is multiplied by m order of cos waveform and sin waveform, and added. In other words, the above expression (26) is calculated.

(S48) Then to determine Rro (or URro), the transfer function is multiplied for each RRO degree. The frequency characteristic to be multiplied (complex number value of the m order of the RRO frequency) is determined in advance as a (m)+jb (m). Specifically the complex number value of the m order of the frequency is determined by the transfer function shown in expression (5) or expression (7). By multiplying these characteristics, the m order of components can be expressed by the above-mentioned expression (27) with complex number values. That is $C2(m)$ and $S2(m)$ are determined from C(m), S(m), a(m) and b(m).

(S50) Then inverse DFT is performed, and the waveform to be determined is acquired. A m order of computation is performed from the first order to (Ns/2−1)th order. When the RroTable is generated, the qth RRO waveform: RRO (q) of the sector is determined by the above-mentioned expression (28) (the same expression is also used for generating the later mentioned URroTable).

(S52) Then the determined RRO (q) is multiplied by the above-mentioned optimum gain K (Count M), the result is added to the RroTable (q) of the correction table 29, and the added value is stored. And the measurement and correction count value Count M is incremented "1".

(S54) It is judged whether the measurement and correction count value Count M is "M" or more. If the count value Count M does not exceed "M", processing returns to step S44. If the count value Count M is "M" or more, M times of measurement and correction have been completed, so the correction table creation processing ends.

Figure 15:
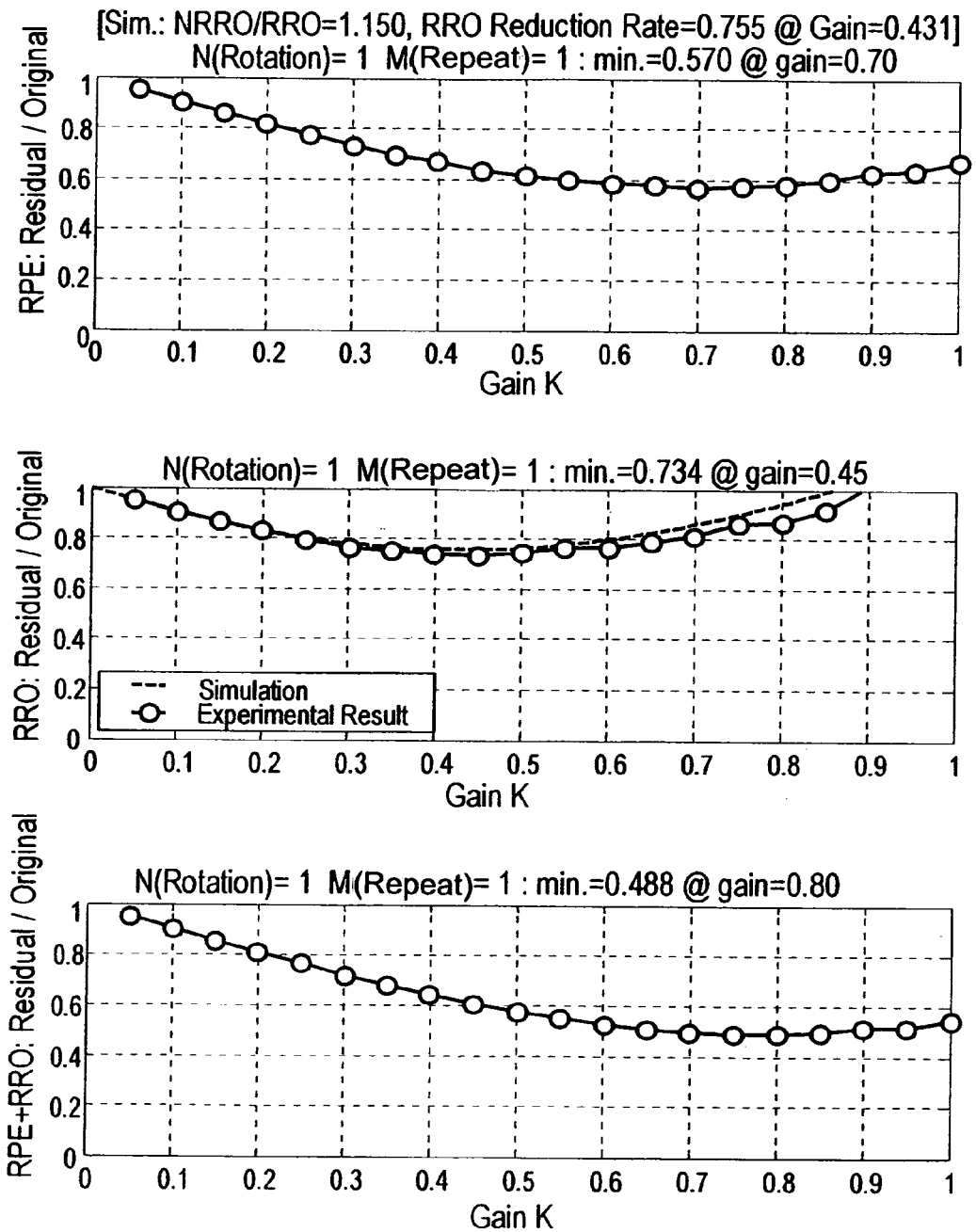
FIG. 15 are graphs depicting the first embodiment using the RroTable in FIG. 7.
Figure 16:
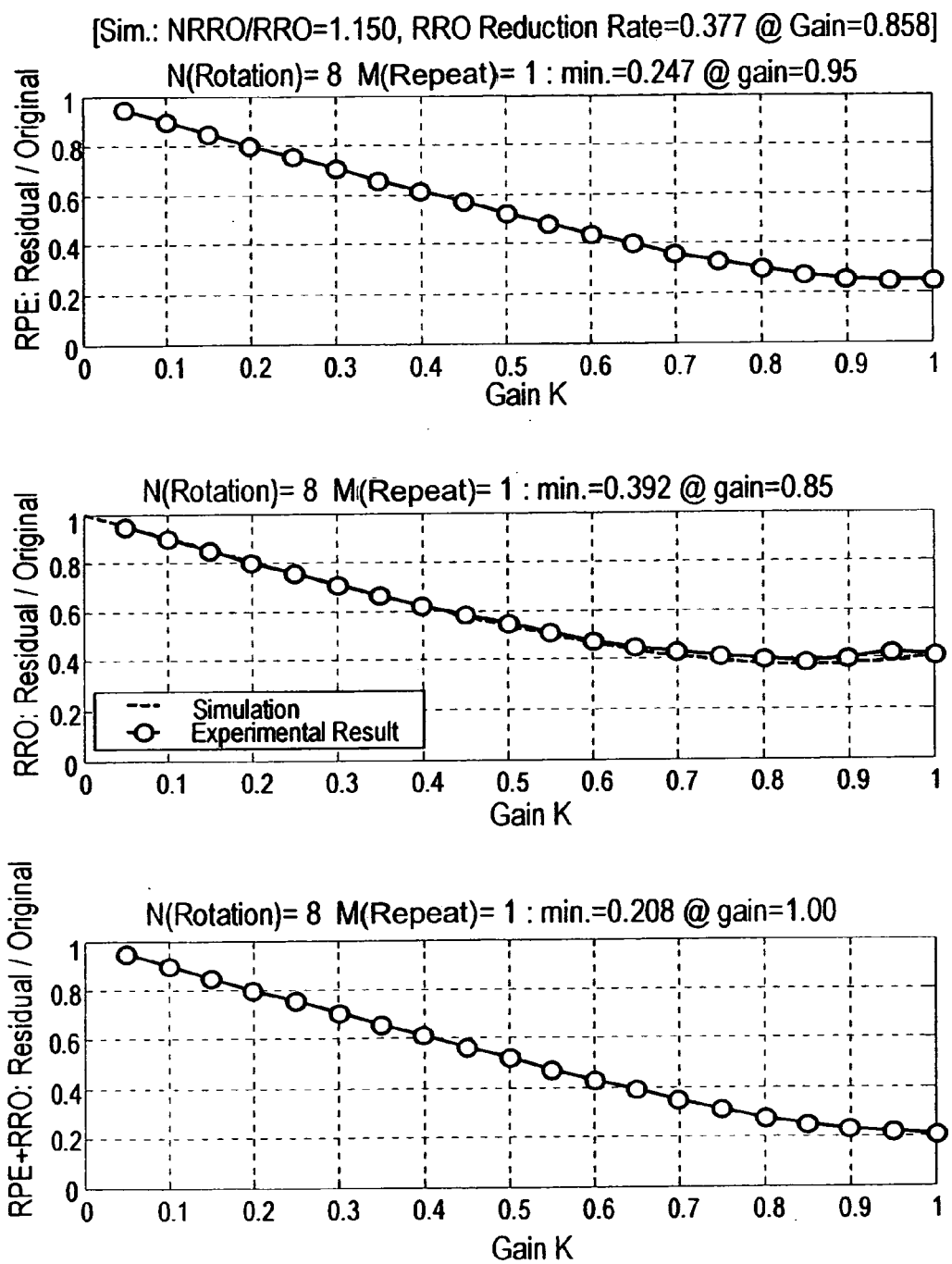
FIG. 16 are graphs depicting the second embodiment using the RroTable in FIG. 7.

Now examples will be described. FIG. 15 and FIG. 16 show the comparison of the measurement result of the respective residual rate of RPE, RRO, and RPE+RRO, and the simulation of the residual rate of RRO when the abscissa is the addition gain K and when the addition gain is changed. FIG. 15 shows the experiment result (circles) and the simulation result (dotted line) when the number of rotations for averaging N=1 and the number of repeats M=1, and the top graph is the experiment result of the residual rate of RPE (residual RPE/original RPE), the middle graph is the experiment result and the simulation result of the residual rate of RRO (residual RRO/original RRO), and the bottom graph is the experiment result of the residual rate of RPE and RRO.

The actual disk device in FIG. 1 is used for the experiment, and the correction table 29 is created by the control system in FIG. 7 with each addition gain K shown on the abscissa, and while correcting the position error 'e' using the correction table 29 as shown in FIG. 7, the actuator 1 is controlled, and the observing position 'y' is observed, and the residual RPE, residual RRO and residual RPE+RRO are determined. For the simulation, on the other hand, the RRO residual rate is calculated by expression (23), using each addition gain K shown on the abscissa.

FIG. 16 shows the experiment result (circles) and the simulation result (dotted line) when the number of rotations for averaging N=8 and the number of repeats M=1, and the top graph is the experiment result of the RPE residual rate (residual RPE/original RPE), the middle graph is the experiment result and the simulation result of the RRO residual rate (residual RRO/original RRO), and the bottom graph is the experiment result of the residual rate of RPE+RRO. The experiment and the simulation are the same as FIG. 15.

As FIG. 15 and FIG. 16 show, it was confirmed by experiment that the addition gain with which the RRO residual rate is the minimum is roughly the same for both the experiment result (circles) and the simulation result (dotted line), in other words, experiment confirmed that the theoretical expression (23) is correct.

Figure 17:
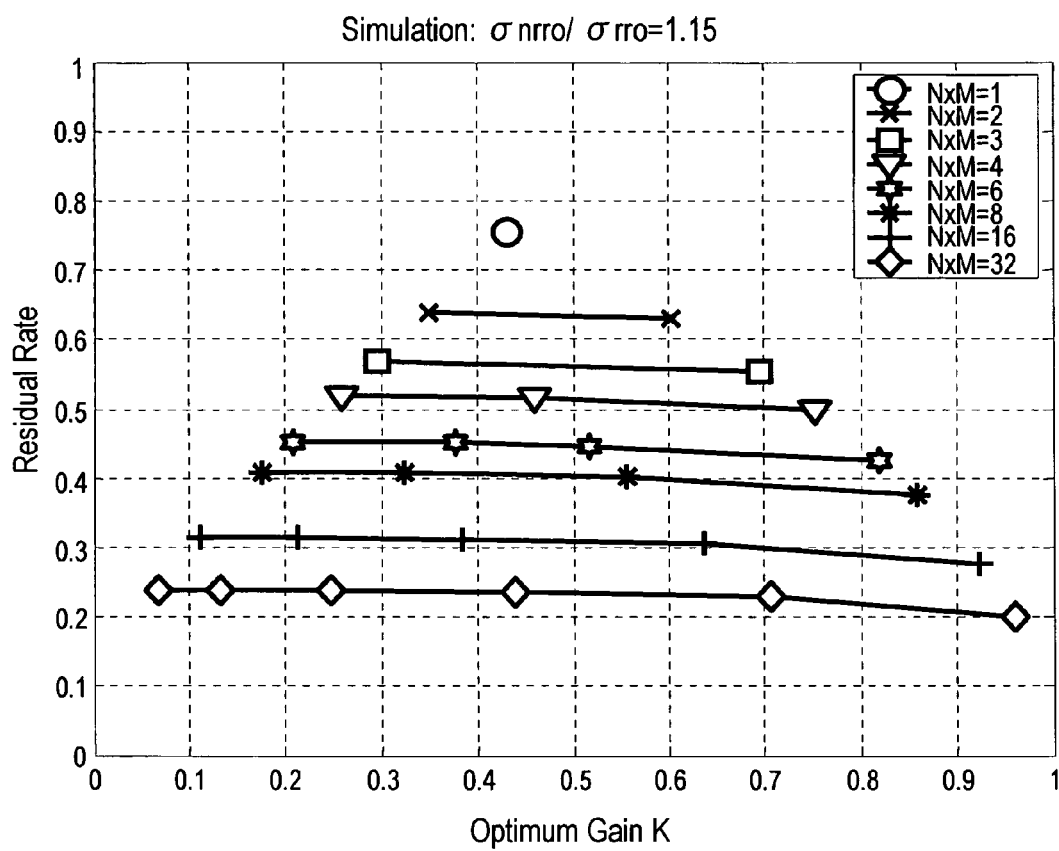
FIG. 17 are graphs depicting the third embodiment using the RroTable in FIG. 7.
Figure 18:
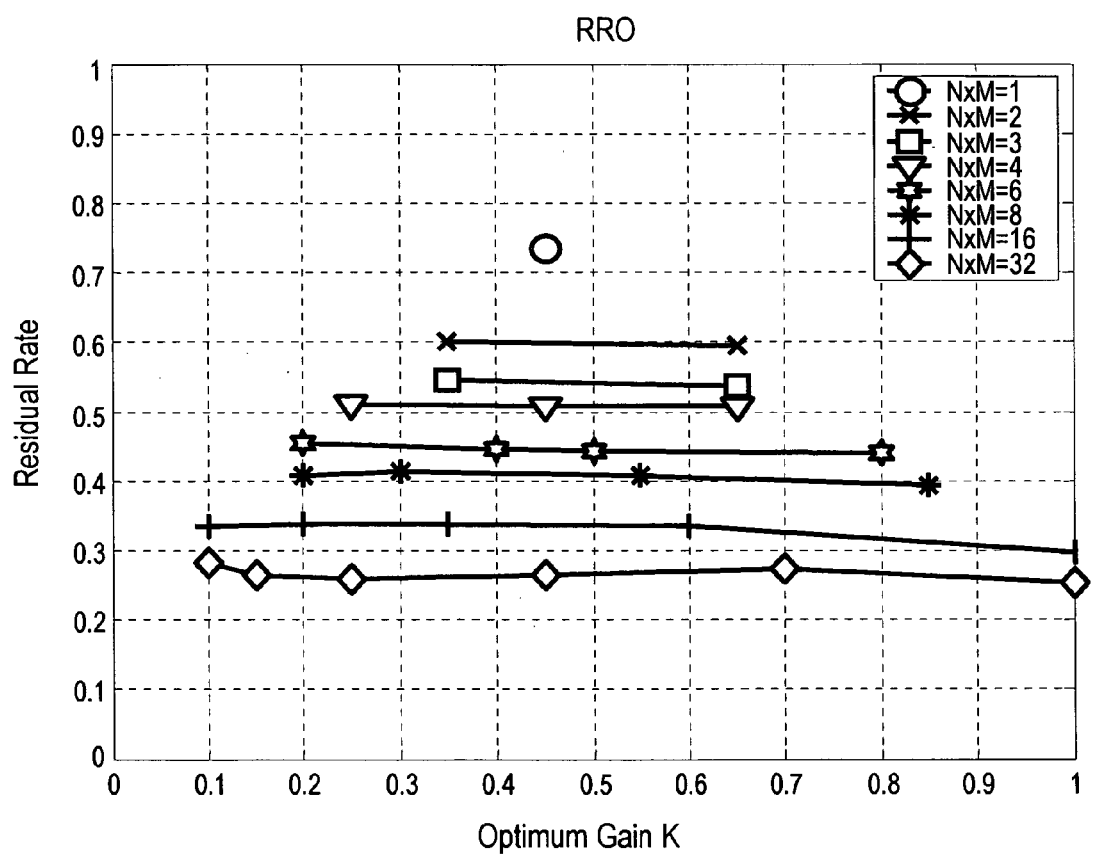
FIG. 18 are graphs depicting the fourth embodiment using the RroTable in FIG. 7.

FIG. 17 and FIG. 18 are graphs depicting the comparison of the RRO residual rate between the simulation result and the experiment result when the optimum gains under different conditions (number of rotations for averaging N×number of repeats M) are set. In FIG. 17 and FIG. 18, the abscissa is the addition gain, and the dots of the RRO residual rate, under conditions where the average number of rotations for averaging N×number of repeats M are the same, are connected by lines. FIG. 18 is a relational diagram of the RRO residual rate at the optimum gain actually measured, and just like FIG. 15 and FIG. 16, the gain that minimizes the RRO residual rate is determined by experiment.

FIG. 17 is a relational diagram of the simulation result of the RRO residual rate with the calculated optimum gain. This is the result when the optimum addition gain K at each number of rotations for averaging N×number of repeats M is calculated according to expression (24), and the RRO residual rate is simulated according to expression (25). In FIG. 17, calculation was performed under the conditions of σnrro/σrro=1.15.

The characteristic of the RRO residual rate in FIG. 17 and the characteristic of the RRO residual rate in FIG. 18 are extremely similar. In other words, the experiment confirmed that the theoretical expression (24) is correct. In this way, the evaluation function is determined using the residual RRO after correction as the evaluation target, and using the evaluation function, the gain K and K (Count M), which minimizes the residual RRO, that is which minimizes the RRO after correction, are determined by FIG. 10, and a correction table is created according to FIG. 13 and FIG. 14. Therefore the correction table creation gain, which is the optimum for the creation time and specifications of the device, is determined without depending on experiment, and by this, the correction table can be created. Also the value of RRO after correction can be guaranteed, and the manufacturing time and device specifications can be determined.

Another RRO Correction Table Creation Method

Figure 19:
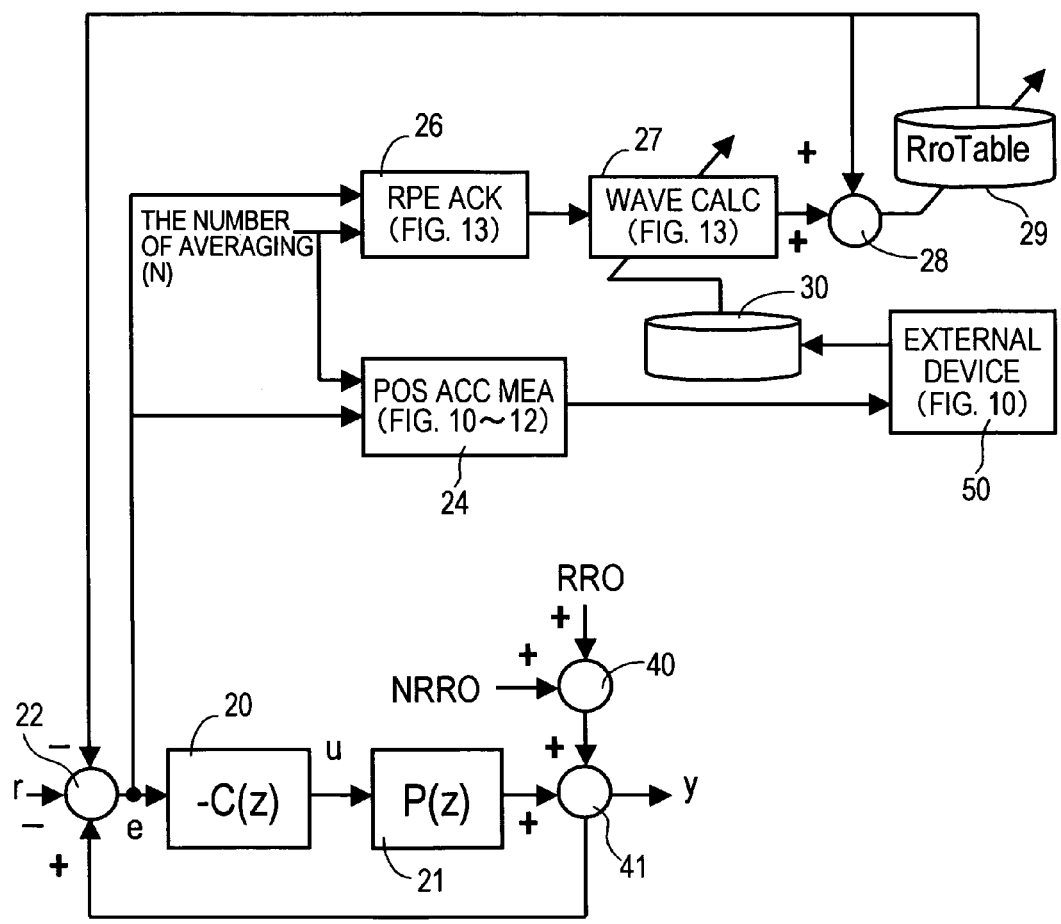
FIG. 19 is a block diagram depicting a servo control system having the RRO correction function according to another embodiment of the present invention.

FIG. 19 is a block diagram depicting the RRO correction table creation system according to the second embodiment of the present invention. In FIG. 19, composing elements the same as FIG. 7 are denoted with the same reference numerals, and the difference from FIG. 7 is that the optimum gain calculation processing 25 (FIG. 10) is executed by an external device (e.g. personal computer) 50 connected to the disk device, and the result is set in the gain table 30 in the disk device.

If this configuration is used, the addition gain is calculated using the external device 50, so the load of the MCU 14 in the disk device can be decreased, and the addition gain can be calculated at high-speed.

Figure 20:
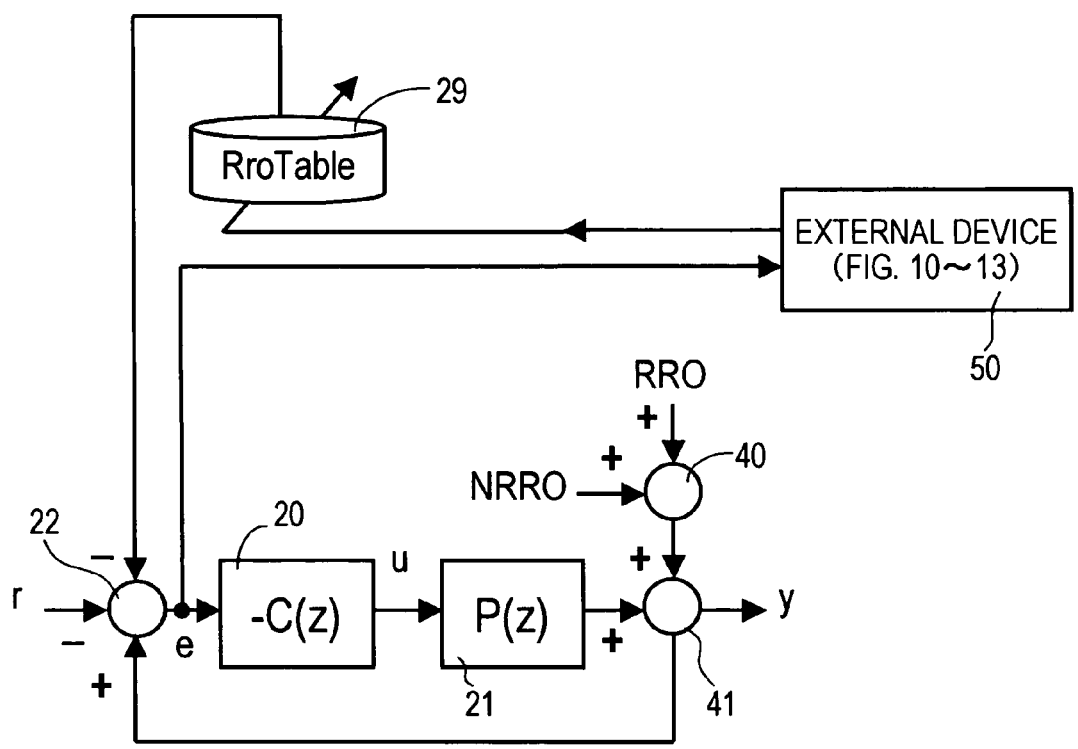
FIG. 20 is a block diagram depicting a servo control system having the RRO correction function according to still another embodiment of the present invention.

FIG. 20 is a block diagram depicting the RRO correction table creation system according to the third embodiment of the present invention. In FIG. 20, composing elements the same as FIG. 7 are denoted with the same reference numerals, and the difference from FIG. 7 is that the positioning accuracy measurement processing 24, the optimum gain calculation processing 25 (FIG. 10–FIG. 12), the RPE acquisition processing 26 (FIG. 13), and the waveform calculation processing 27 (FIG. 13) are executed by an external device (e.g. personal computer) 50 connected to the disk device, and the result is set in the RRO correction table 29 in the disk device.

When this configuration is used, the table values of the RRO correction table 29 are calculated, so the load of the MCU 14 of the disk device can be decreased further, and the table values can be calculated at high-speed. Also the correction table creation processing program is unnecessary in the disk device after shipment of the disk device, so the time required for loading this program onto the disk device can be eliminated.

For a plurality of disk devices in a same lot, a correction table 29 of a representative disk device may be created in the configuration in FIG. 19 or FIG. 20, and copied to other disk devices. This can decrease further the manufacturing time.

URRO Correction Table Creation Method

The above mentioned various expressions are on the ProTable. The issue regarding noise, however, can be discussed in the same way as for the current waveforms: URroTable, as well. In other words, RroTable can be converted into URroTable according to the later mentioned relational expression. The current waveform URroTable is generated so that the locus of the actuator matches with RRO.

Figure 21:
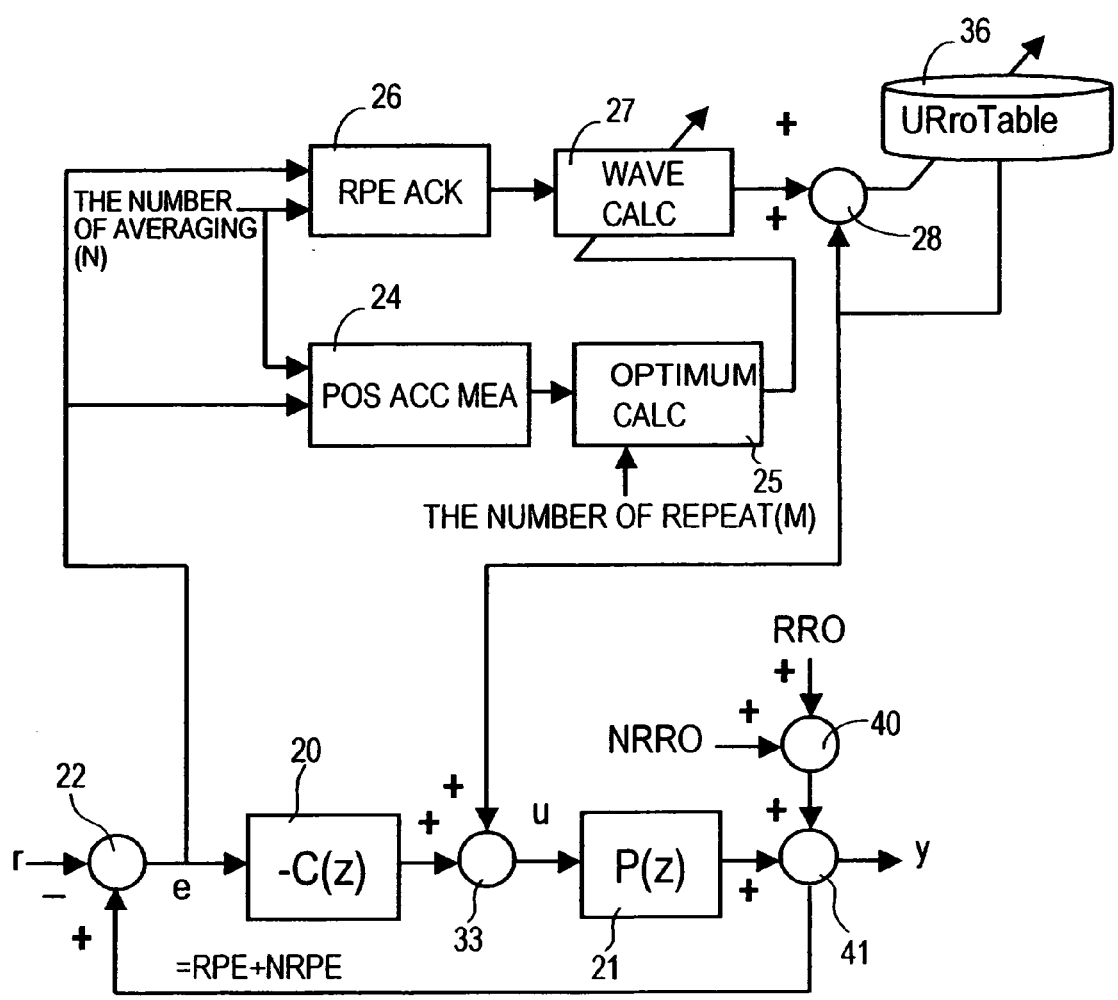
FIG. 21 is a block diagram depicting a servo system having the URRO correction function according to an embodiment of the present invention.

FIG. 21 is a block diagram depicting the case when the optimum calculation and the URro correction table creation are performed for a single disk device unit, where the composing elements the same as in FIG. 6 and FIG. 7 are denoted with the same reference numerals. In other words, the computation block 22 determines the error 'e' between the target position 'r' and the current (observing) position 'y', the controller 20 performs control computation and calculates the control amount, the addition block 30 adds the URro correction values of the URro correction table 36, and drives the VCM 1, that is the plant 21. For the position of the plant 21, servo signals from the magnetic head 3 are demodulated and the current position 'y' is acquired. The difference between this current position 'y' and the target position 'r' is the position error 'e'. As external disturbances to be applied to this control system, components synchronizing with rotation of the spindle motor 5 and the components not synchronizing therewith are indicated as RRO, NRRO and RPE and NRPE.

As described in FIG. 13, the RPE acquisition block 26 acquires RPE from the position error 'e' for each sector. The positioning accuracy measurement block 24 measures the positioning accuracy from the position error 'e', as described in FIG. 10 to FIG. 12. The optimum gain calculation block 25 calculates the optimum gain with the number of repeats M, as described in FIG. 10. The waveform calculation block 27 multiplies the RPE, which was acquired by the RPE acquisition block 26, by the optimum gain, and calculates the RPO waveform, as described in FIG. 13. The URRO table 36 stores the URRO waveform. The addition block 28 adds the URRO waveform for the number of repeats, and updates the table 36, as described in FIG. 13.

After creating the URRO table 36, the computation block 33 adds the URroTable value in the correction table 36 to the control amount of the controller 20, and generates the control amount 'u'. By this, URRO correction is performed on the output of the controller 20.

Figure 22:
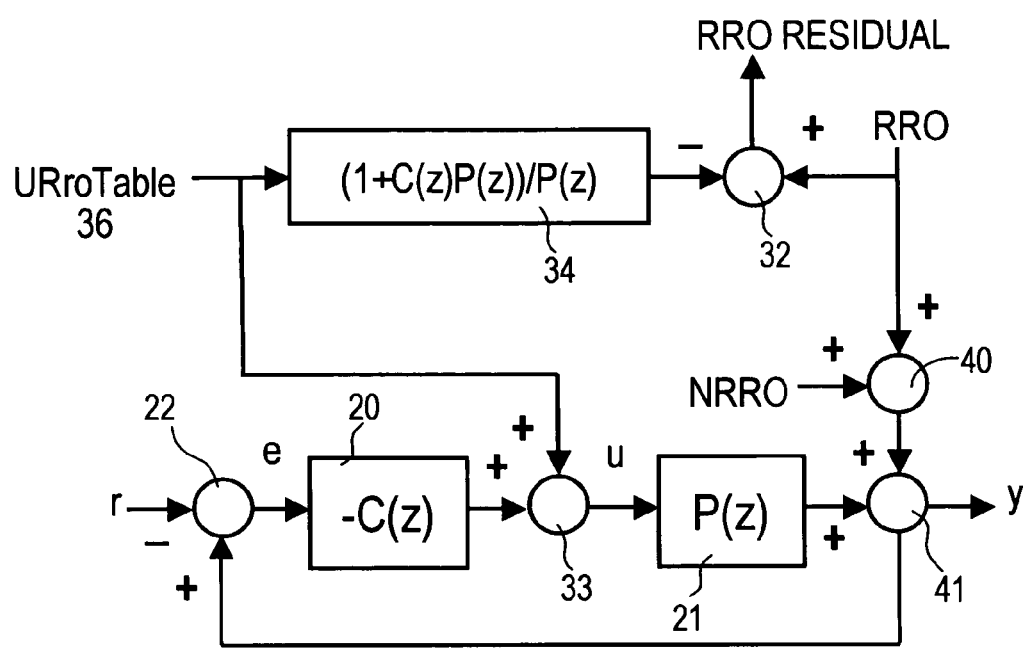
FIG. 22 is a diagram depicting the evaluation function of the URRO correction in FIG. 21.

FIG. 22 is a diagram depicting the URroTable value and the residual RRO. According to the above-mentioned expression (7), a URroTable value is determined for RPE through the inverse characteristic of the sensitivity function $(1+C(z) \cdot P(z))$ and the inverse characteristic of the plant $(1/P(z))$. Therefore the residual RRO is the actual RRO from which the value acquired by the block 34 through $((1+C(z) \cdot P(z))/P(z))$ as the URRO correction value of the URroTable 36 is subtracted.

According to expression (5), the RroTable value is determined for RPE through the inverse characteristic of the sensitivity function $(1+C(z) \cdot P(z))$, so the URroTable value is acquired by the following expression (29)

$$\text{URroTable} = (-1/P(Z)) \cdot \text{RroTable} \quad (29)$$

In other words, the evaluation function is the same as expression (18) for the case of RRO, but by the waveform calculation block 27 converting the RroTable value into the URroTable value according to the relational expression of expression (29), the URro correction table 36 is acquired.

Figure 23:
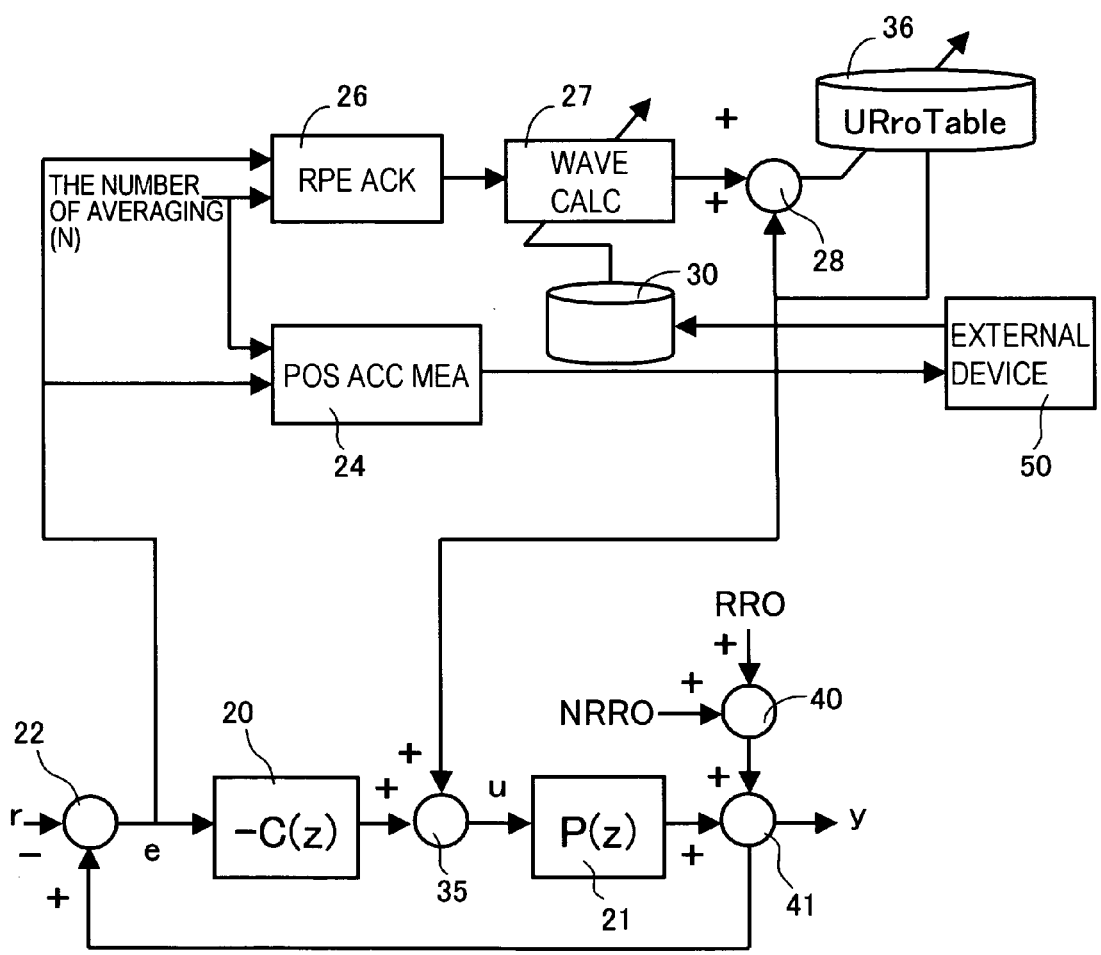
FIG. 23 is a block diagram depicting a servo control system having the URRO correction function according to another embodiment of the present invention.

FIG. 23 is a block diagram depicting the URRO correction table creation system according to the second embodiment of the present invention. In FIG. 23, composing elements the same as FIG. 7 and FIG. 21 are denoted with the same reference numerals, and the difference from FIG. 21 is that the optimum gain calculation processing 25 (FIG. 21) is executed by an external device (e.g. personal computer) 50 connected to the disk device, and the result is set in the gain table 30 in the disk device. When this configuration is used, the addition gain is calculated using the external device 50, so the load of the MCU 14 of the disk device is decreased, and addition gain can be calculated at high-speed.

Figure 24:
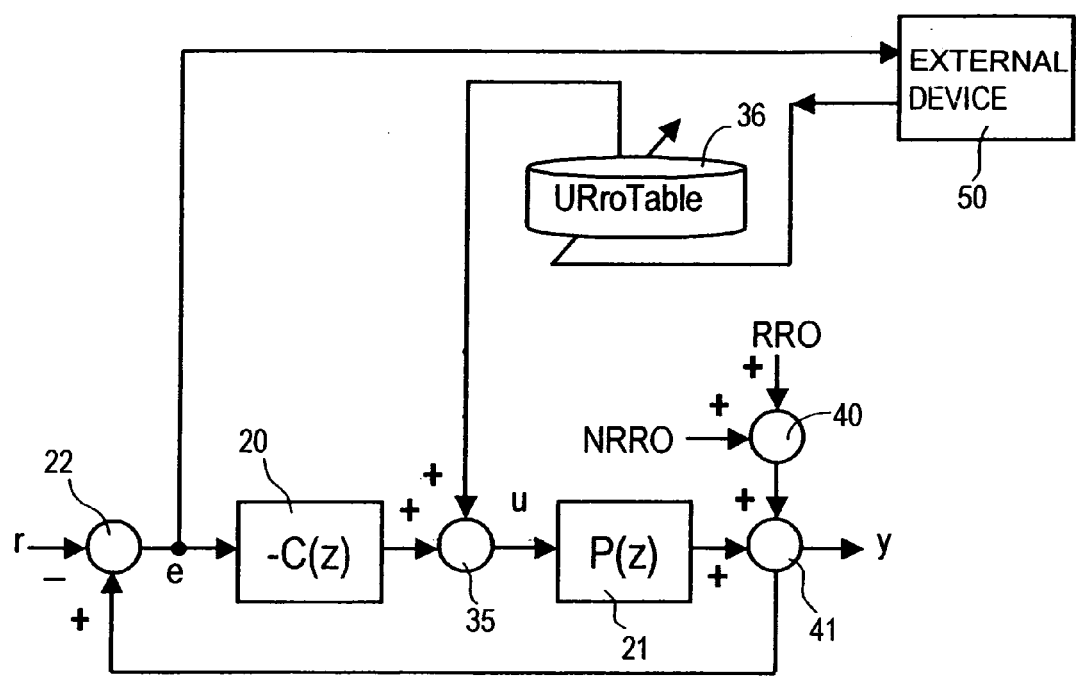
FIG. 24 is a block diagram depicting a servo control system having the URRO correction function according to still another embodiment of the present invention.

FIG. 24 is a block diagram depicting the URRO correction table creation system according to the third embodiment of the present invention. In FIG. 24, the same composing elements as FIG. 7 and FIG. 21 are denoted with the same reference numerals, and the difference from FIG. 21 is that the positioning accuracy measurement processing 24, the optimum gain calculation processing 25 (FIG. 10–FIG. 12), the RPE acquisition processing 26 (FIG. 13) and the waveform calculation processing 27 (FIG. 13) are executed by an external device (e.g. personal computer) 50 connected to the disk device, and the result is set in the URRO correction table 36 in the disk device.

When this configuration is used, the table values of the URRO correction table 36 are calculated using the external device 50, so the load of the MCU 14 of the disk device is decreased further, and the table values can be calculated at high-speed. Also the correction table creation processing program is unnecessary in the disk device after shipment of the disk device, so the time required for loading this program onto the disk device can be eliminated.

For a plurality of disk devices in a same lot, a correction table 36 of a representative disk device may be created in the configuration in FIG. 23 or FIG. 24, and copied to other disk devices. This can further decrease the manufacturing time.

Another RRO Correction Table Creation Method Considering Frequency Characteristics The above mentioned embodiment is a method of multiplying the determined-estimated RRO waveform by an optimum gain K and adding the result to RroTable. In other words, a uniform gain K is multiplied to all the frequency areas without considering the frequency characteristics of RRO and NRRO. However in an actual disk device, the frequency characteristic is different between RRO and NRRO. In other words, the ratio of RRO and NRRO is different depending on the frequency.

Figure 25:
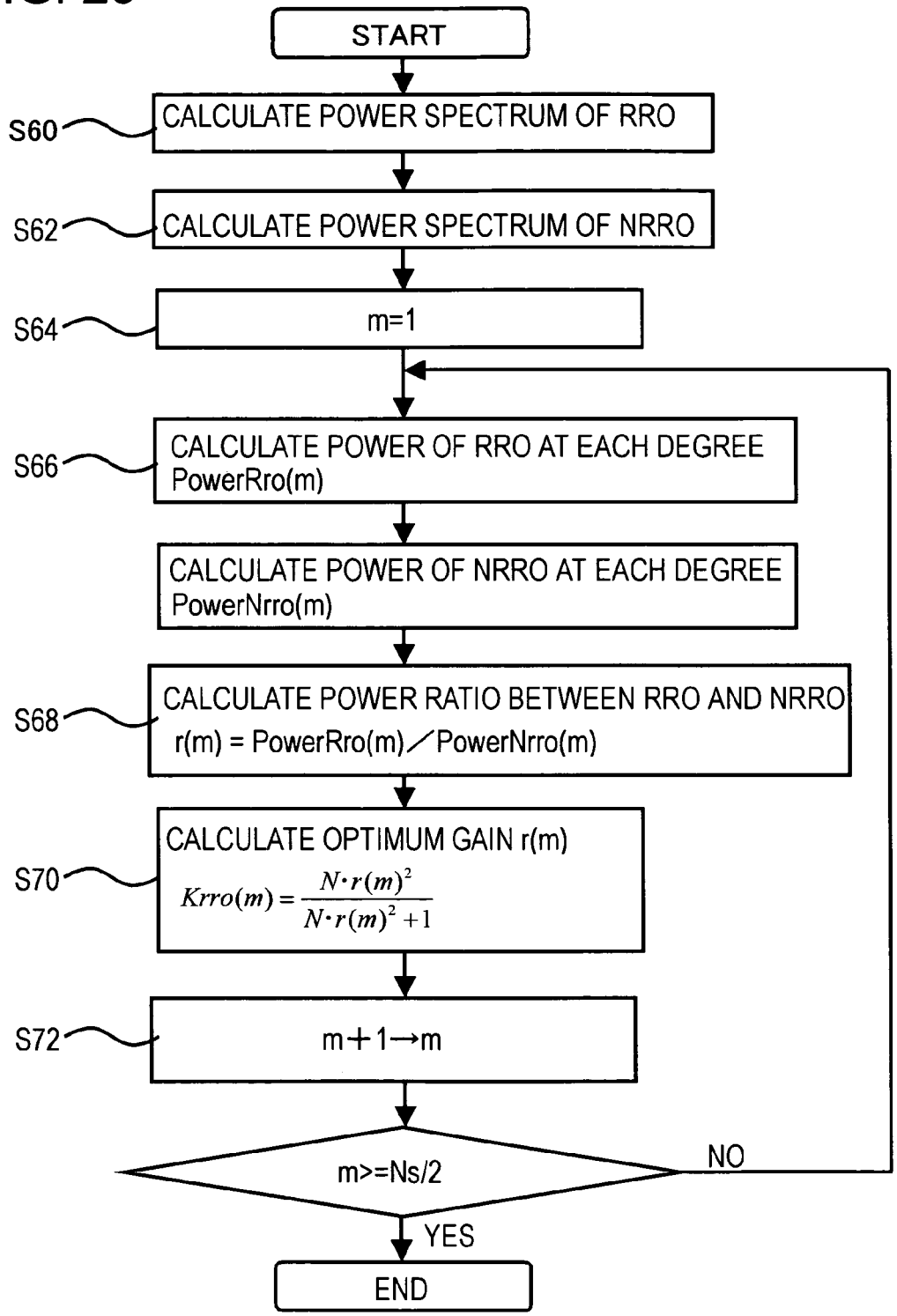
FIG. 25 is a flow chart depicting the addition gain measurement processing for each RRO degree in FIG. 7.

Therefore the $\sigma$ of RRO and the $\sigma$ of NRRO are determined for each degree of RRO, and the optimum gain K can be determined from that ratio according to the above mentioned expression (21) or (24). FIG. 25 is a flow chart depicting the optimum gain calculation processing of the second embodiment of the present invention. In this description, it is assumed that the degree of the RRO is m, and m=1 to Ns/2 according to the Nyquist theorem.

(S60) First just like step S10 in FIG. 10, the power spectrum of the RRO is determined. The power spectrum of RRO targets a plurality of tracks in a zone. RRO is determined not for such a small number of tracks as "2" and "4", but for several tens or several hundreds of tracks. The RRO waveform may be determined by multiplying RPE by the inverse characteristic of the sensitivity function. Or a waveform which does not follow-up RRO may be generated in each track taking sufficient time. After determining the RRO of each track in this way, all the RRO waveforms are lined up in a row and the power spectrum is determined.

(S62) Then the power spectrum of NRRO is determined. Just like FIG. 12, the position error 'e' is observed by an FFT analyzer, and the power spectrum of RPE+NRPE is determined, then RPE is subtracted from the result to determined NRPE. And the result is multiplied by the inverse characteristic of the sensitivity function. Or the locus RroTable where RRO is ignored may be generated taking sufficient time, and the power spectrum of NRPE may be determined after suppressing RPE in the position error 'e' to almost zero.

(S64) Then the RRO degree m is initialized to "1".

(S66) Then the power spectrums of RRO and NRRO are multiplied by the frequency characteristic of DFT computation. In DFT computation, sin and cos are multiplied as shown in expression (26). The target degree m is determined, and a signal is supplied-at every predetermined frequency interval in the frequency area to be observed, that is 0 Hz to (sampling frequency/2), and the power spectrum of RRO PowerRro (m) and the power spectrum of NRRO PowerNrro (m), which are the output characteristics of DFT, are determined. These become the frequency characteristics of the detection characteristics of DFT computation.

Figure 26:
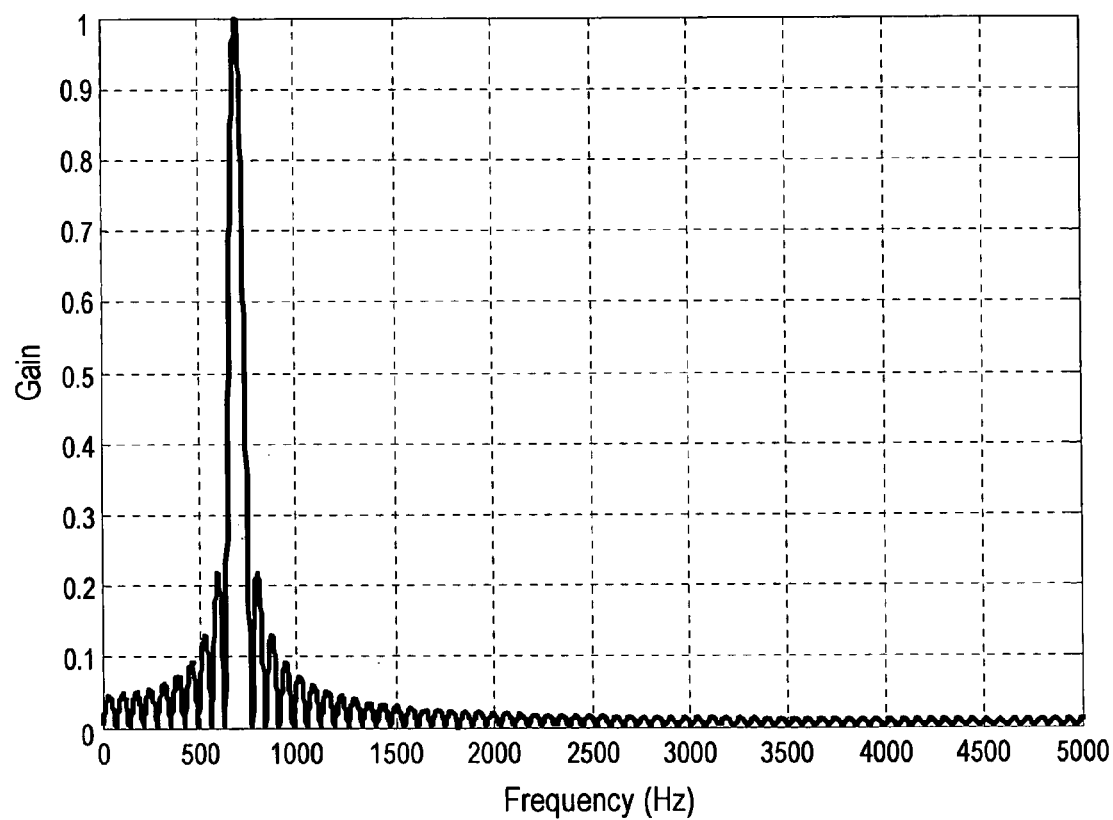
FIG. 26 is a frequency characteristic diagram of FFT for measuring the addition gain in FIG. 25.
Figure 27:
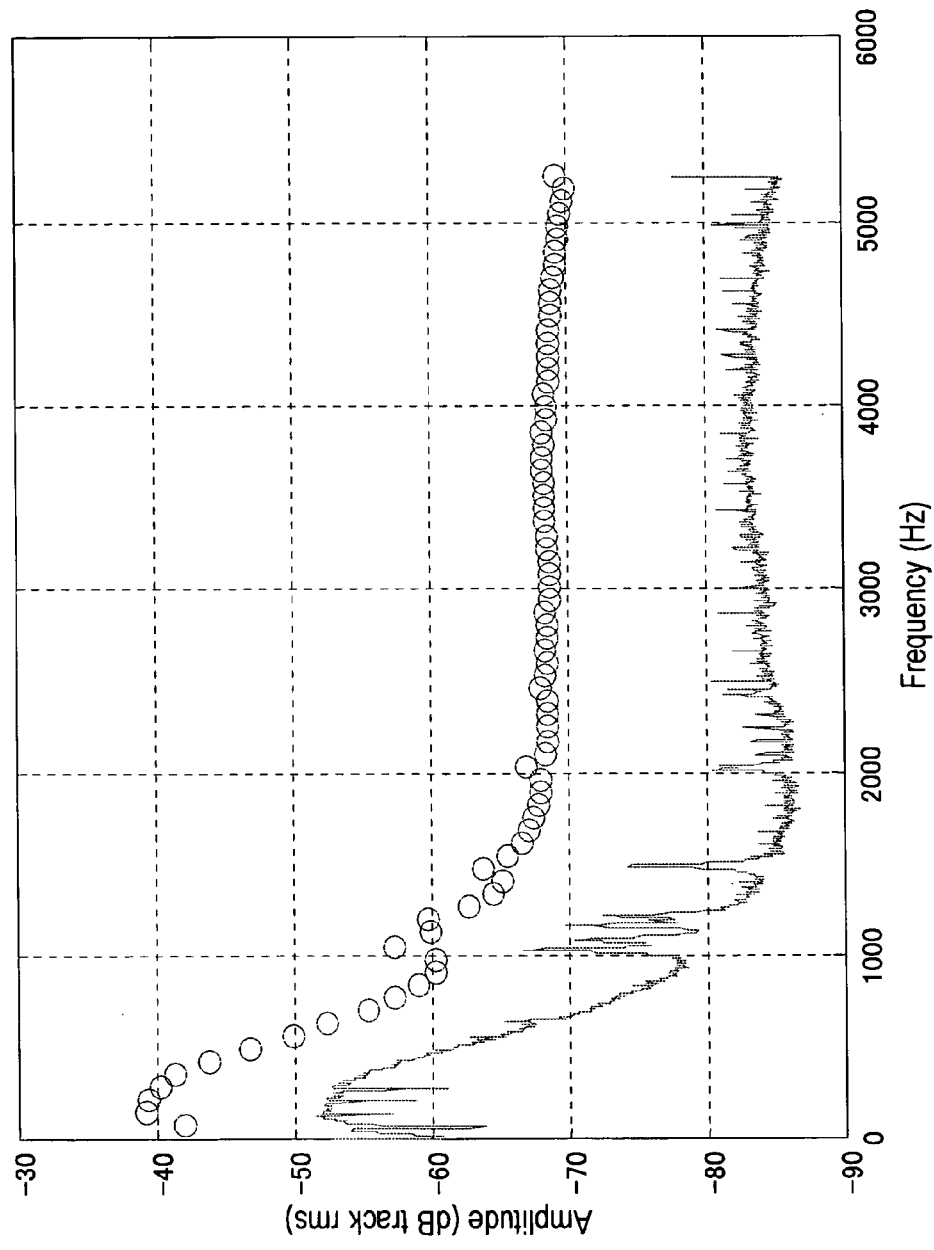
FIG. 27 is a graph depicting the NRRO measurement processing in FIG. 25.
Figure 28:
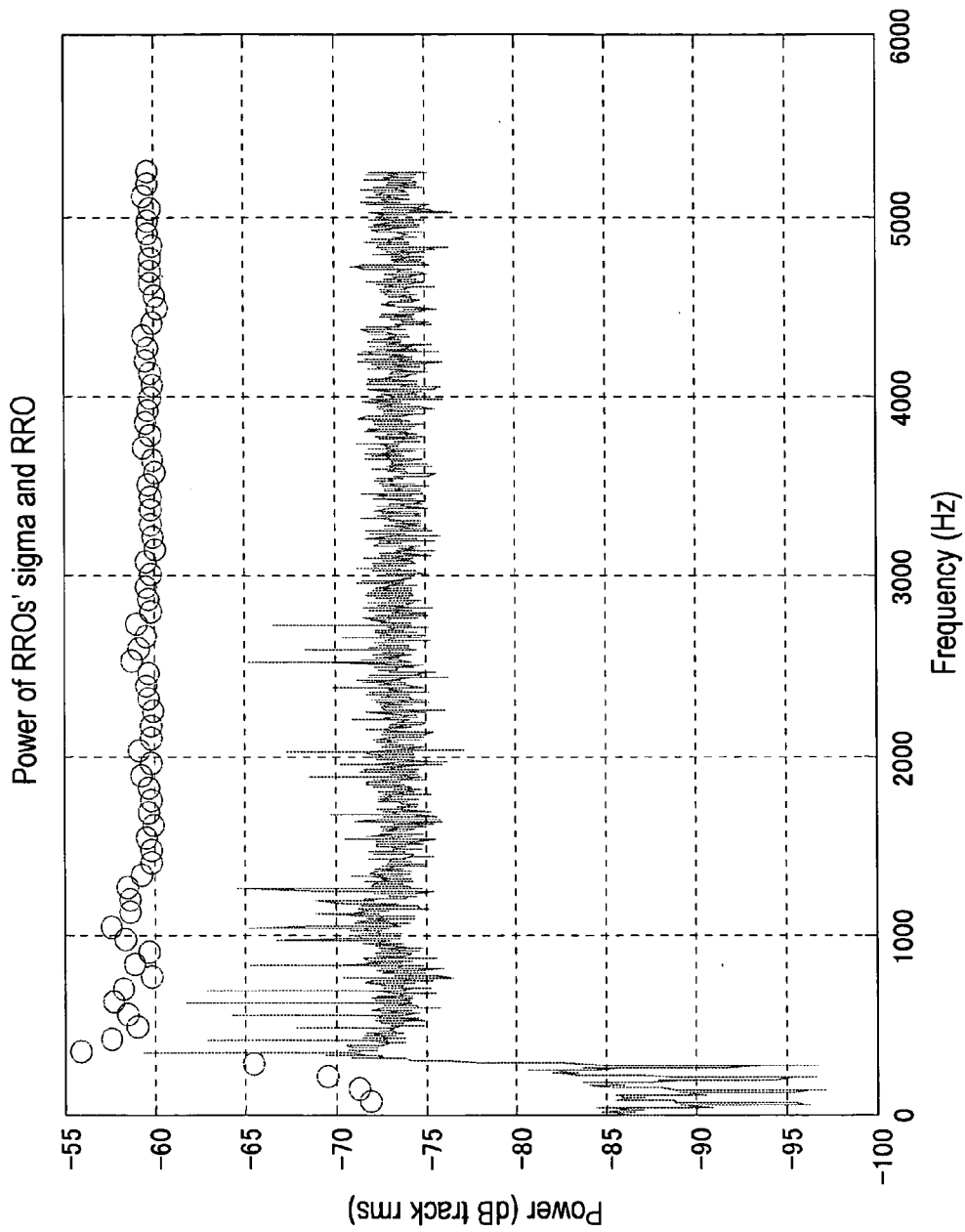
FIG. 28 is a graph depicting the RRO measurement processing in FIG. 25.
Figure 29:
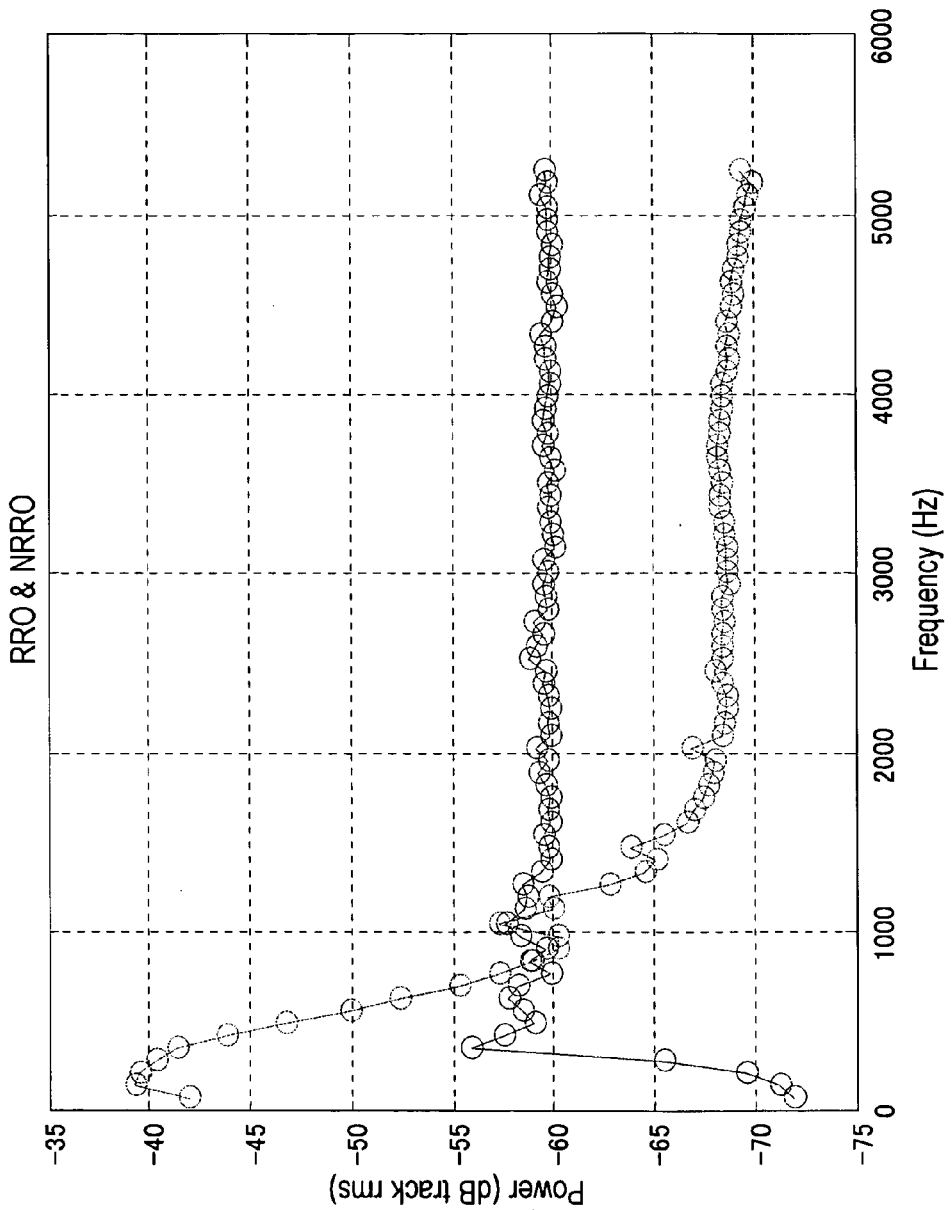
FIG. 29 is a graph depicting the RRO and NRRO in FIG. 27 and FIG. 28.

FIG. 26 shows an example of the frequency characteristics of DFT computation. In FIG. 27, the power spectrum of NRRO that follows up the frequency characteristics in FIG. 26 is shown by a solid line, and the power spectrum of NRRO for each RRO degree is shown by circles. In FIG. 28, the power spectrum of RRO is shown by a solid line, and the power spectrum of RRO for each RRO degree is shown by circles. In FIG. 29, the RRO and NRRO power spectrums for each RRO degree in FIG. 27 and FIG. 28 are overlaid in a same graph. In this example, the power spectrum follows up the first–fourth degree RRO. In this way, the power spectrum of NRRO and the power spectrum of RRO are determined for each RRO degree.

(S68) Comparing these two spectrums, the ratio r (m) of the a of RRO and the a of NRRO is determined for each RRO degree.

Figure 30:
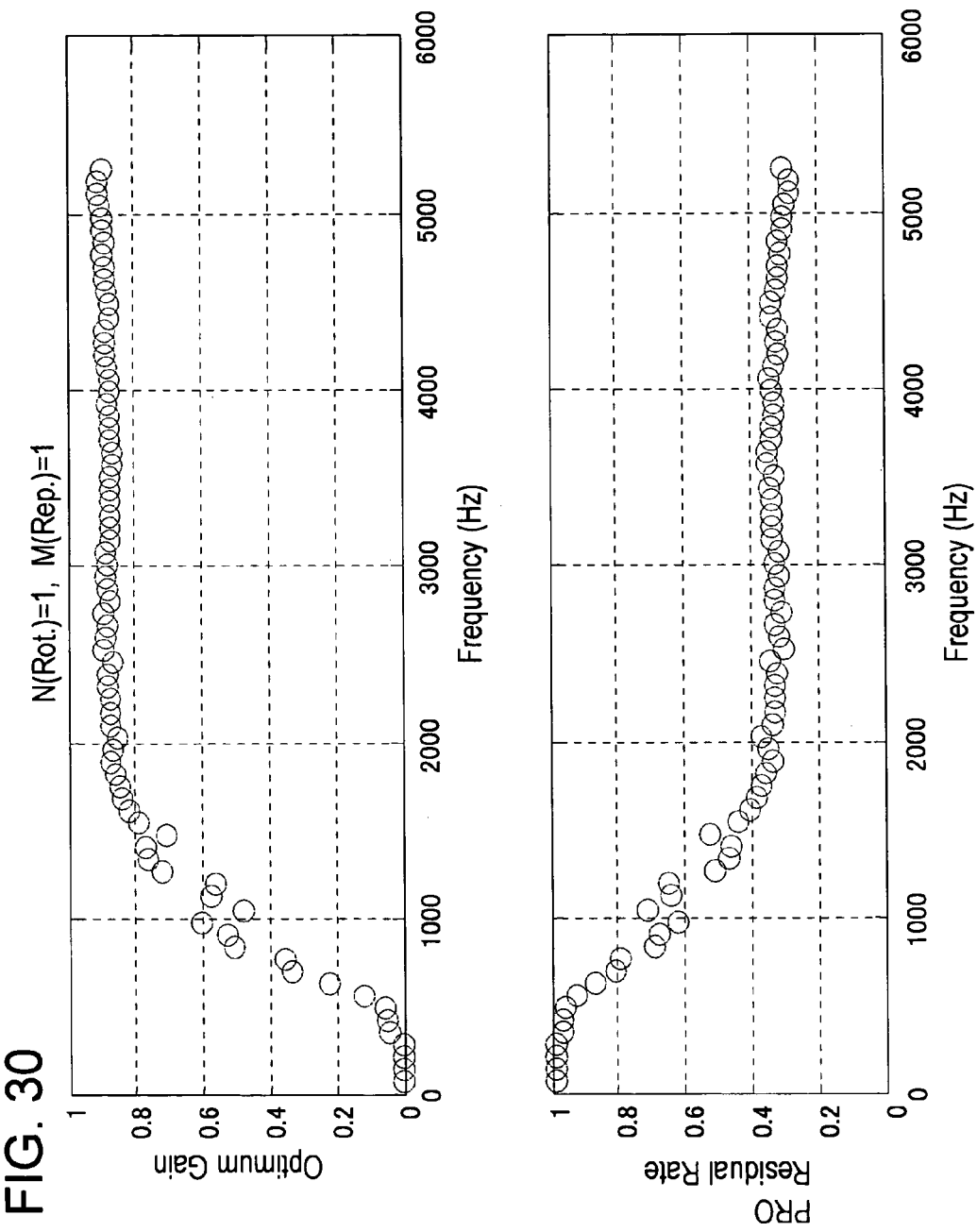
FIG. 30 is a graph depicting the optimum gain and residual RRO in FIG. 25.

(S70) Applying this ratio r (m) to the above mentioned optimum condition express (21) or (24), the optimum gain Krro (m) or Krro (M, m) of each RRO degree is calculated. FIG. 30 is a graph depicting the optimum gain characteristic with respect to each RRO degree. In this example, the number of rotations for averaging N=1, and the number of repeats M=1. As the bottom graph in FIG. 30 shows, the RRO residual rate after RRO correction for each RRO degree can also be determined. From this residual rate and original RRO power spectrum, the residual rates of RRO before and after correction for all frequencies can be determined.

(S72) As mentioned above, the RRO degree m is incremented "1", and it is judged whether the RRO degree m is an observable Nyquist frequency (Ns/2) or more. If the RRO degree m is not more than (Ns/2), processing returns to step S66, and the optimum gain Krro (m) or Krro (M, m) of each RRO degree, described in FIG. 27 to FIG. 30, is calculated. If the RRO degree m is an observable Nyquist frequency (Ns/2) or more, processing ends.

As described above, the gain for each RRO degree can be determined. This gain can be applied to the conventional method of calculating Rro or URro using DFT and inverse DFT. For example, the expression (28) in FIG. 13 is transferred to the following expression (30) considering the RRO degree.

$$RRO(q) = \sum_{m=1}^{N_S/2-1} \{C2(m)\cos(2\pi mq/N_S) + S2(m)\sin(2\pi mq/N_S)\} \cdot Krro(m) \quad (30)$$

In this case, RroTable (q) is calculated regarding gain K in step 30 as "1" in FIG. 13.

Figure 31:
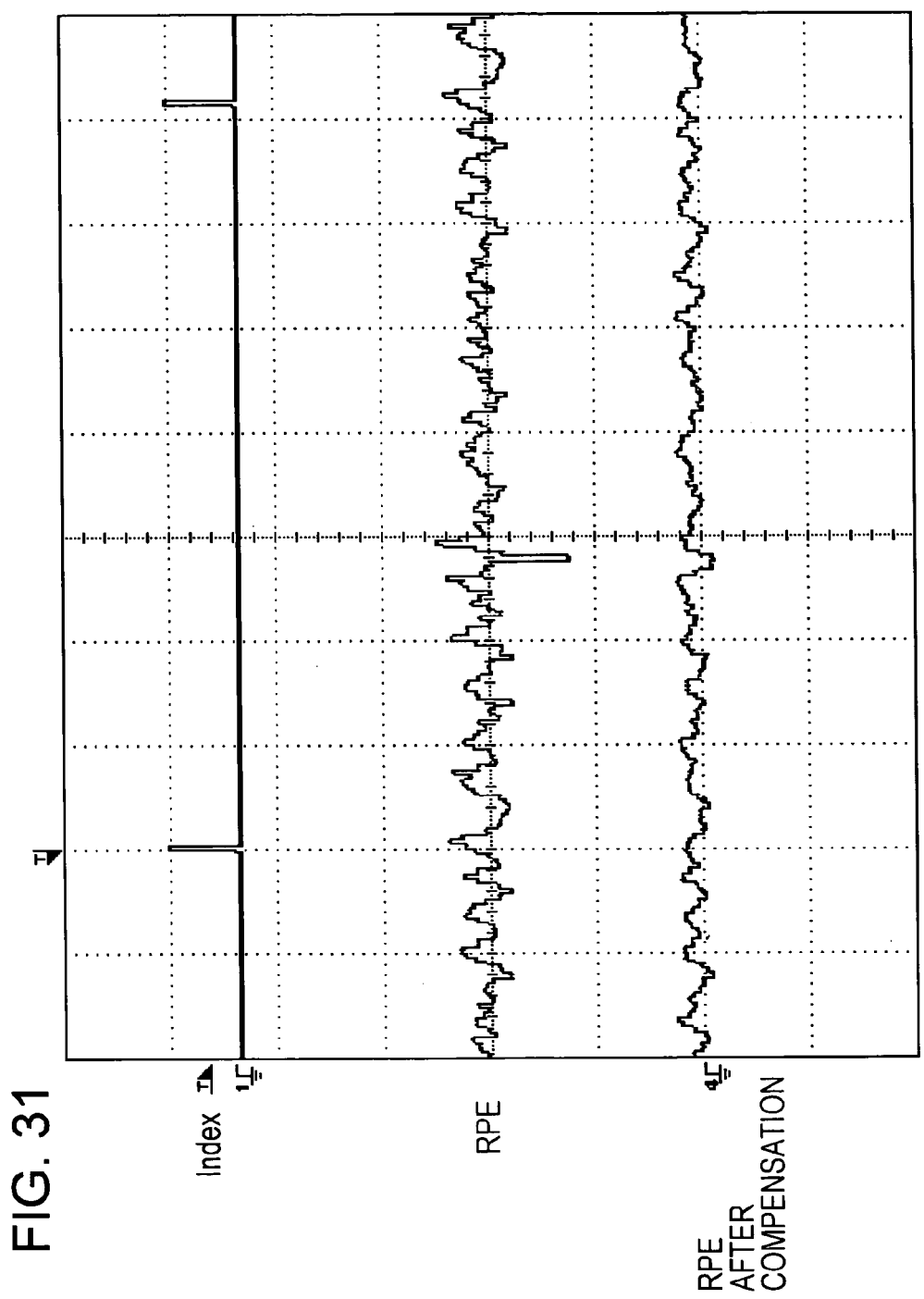
FIG. 31 is a diagram depicting the RPE correction operation with the optimum gain in FIG. 25.

Now examples will be described. FIG. 31 is an RPE waveform diagram before and after RRO correction in the disk device in FIG. 1. For the RRO correction method, the addition gain Krro (m) is changed for each of the above mentioned frequencies. In FIG. 31, the index signal, the RPE waveform before correction, and the RPE waveform after correction are shown sequentially from the top. Here the number of rotations for averaging N=1 and the number of repeats M=1. In this example, a jump in RPE waveforms is observed at around the center. However this is effectively removed after RRO correction.

FIG. 32 is a table showing a comparison of a method of setting a uniform addition gain for all the frequencies and a method of changing the addition gain for each RRO degree. The rate (residual rate) after correction/before correction is determined for three values: RPE, RRO and RPE+RRO. For the conditions, the number of repeats M=1, and six types of rotations for averaging N: "1", "2", "3", "4", "6" and "8" are used.

In the case of the method of setting a uniform addition gain for all the frequencies, the residual rate to be the minimum is determined while changing the addition gain K, as shown in FIG. 15 and FIG. 16. For example, in the case of N=1 and M=1 in FIG. 15, the residual rate of RPE is the minimum value=0.57 at K=0.70, the residual rate of RRO is the minimum value=0.734 at K=0.45, and the residual rage of RPE+RRO is the minimum value=0.488 at K=0.80.

In the same way, in the case of N=8 and M=1 in FIG. 16, the residual rate of RPE is the minimum value=0.247 at K=0.95, the residual rate of RRO is the minimum value=0.392 at K=0.85, and the residual rate of RPE+RRO is the minimum value=0.208 at K=1.00. In other words, the optimum gain at which the residual rate becomes the minimum is completely different in RPE, RRO and RPE+RRO.

In the case of the method of changing the addition gain for each RRO degree, on the other hand, values are measured under the same conditions for all of RPE, RRO, and RPE+RRO. As the values of the residual rate in FIG. 32 show, the residual rate is smaller in the method of changing the addition gain for each RRO degree than in the method of setting a uniform addition gain for all the frequencies.

Figure 33:
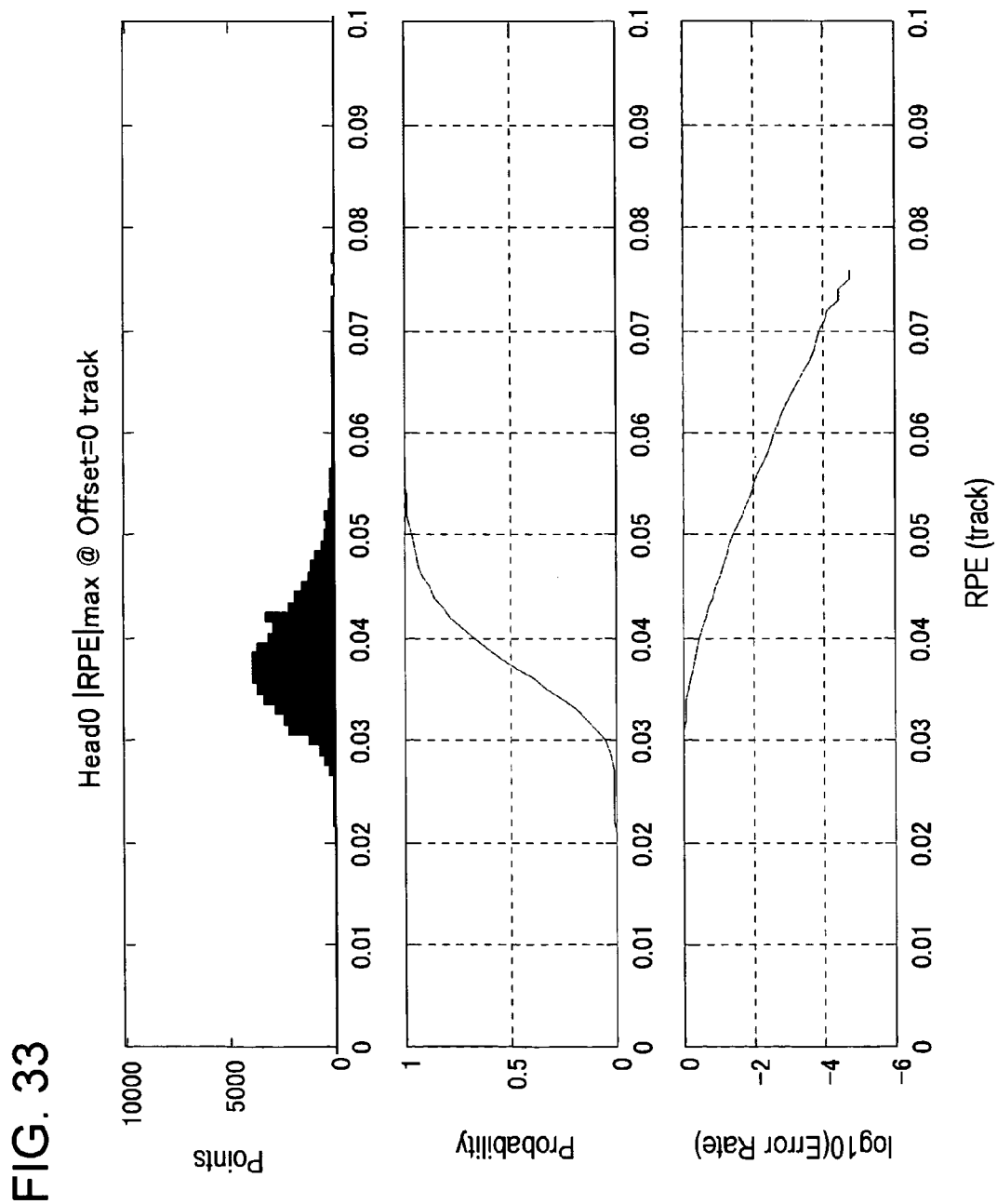
FIG. 33 is a graph depicting RPE before correction in FIG. 25.
Figure 34:
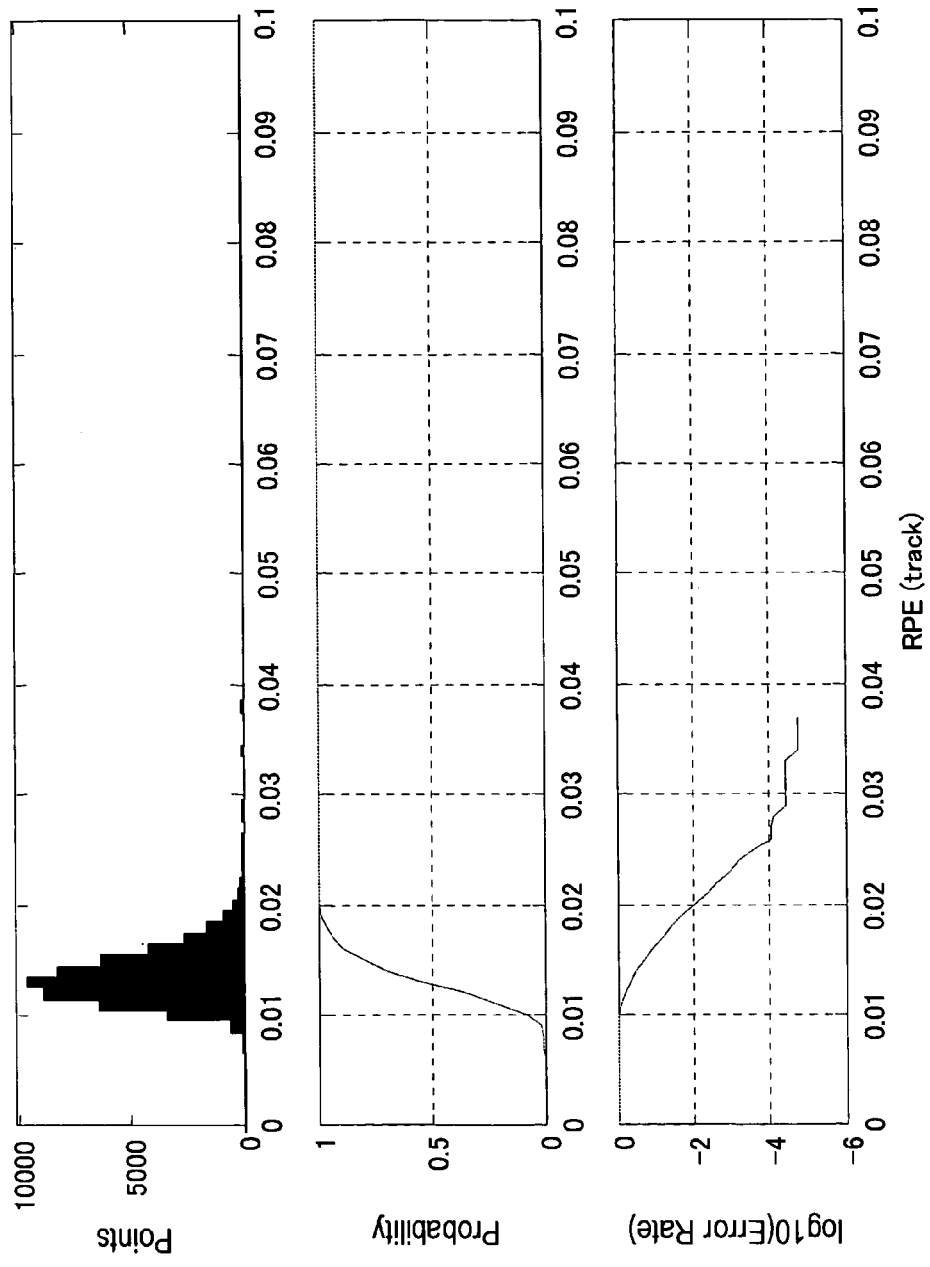
FIG. 34 is a graph depicting RPE after correction in FIG. 25.

Then the effect of RRO correction on the entire surface of the disk is determined. FIG. 33 shows the result before RRO correction, and FIG. 34 shows the result after RRO correction. In this example, RRO correction conditions are that the addition gain is optimized for each RRO degree, the number of rotations for averaging N=3 and the number of repeats M=1. Also the addition gain is optimized at the outermost track on one side of the disk, and the result is applied to the entire face of the disk. RPE of each track before correction and after correction is determined in the number of track units, averaging 32 rotations. Using the maximum value of the absolute value thereof as the representative value of the track, this value is determined for all the tracks. The top graph in FIG. 33 and FIG. 34 are the number of points (number of tracks) of each RPE indicated as histograms. The middle graph shows the probability distribution to indicate the established value of each RPE, and the bottom graph shows the log10 (1–probability value of middle graph)=error rate.

In the case when RRO correction in FIG. 34 is performed, it is shown that the RPE value and the error rate dramatically increased in general compared with the status before RRO correction in FIG. 33. In this way, even with a very small number of measurement rotations, such as 3, RRO correction can be effectively implemented.

Another RRO Correction Table Creation Method Considering Correlation Between Tracks The above-mentioned method is based on the assumption that no correlation exists between the tracks of a disk. However the correlation of RRO between tracks may increase in some cases. For example, when a disk is mechanically distorted, some improvement is required in addition to a method of determining the Rro correction value at one point or in each zone on the disk face. With the foregoing in view, an embodiment to support such a status will be described. In other words, a RroTable value is created in each track.

Figure 35:
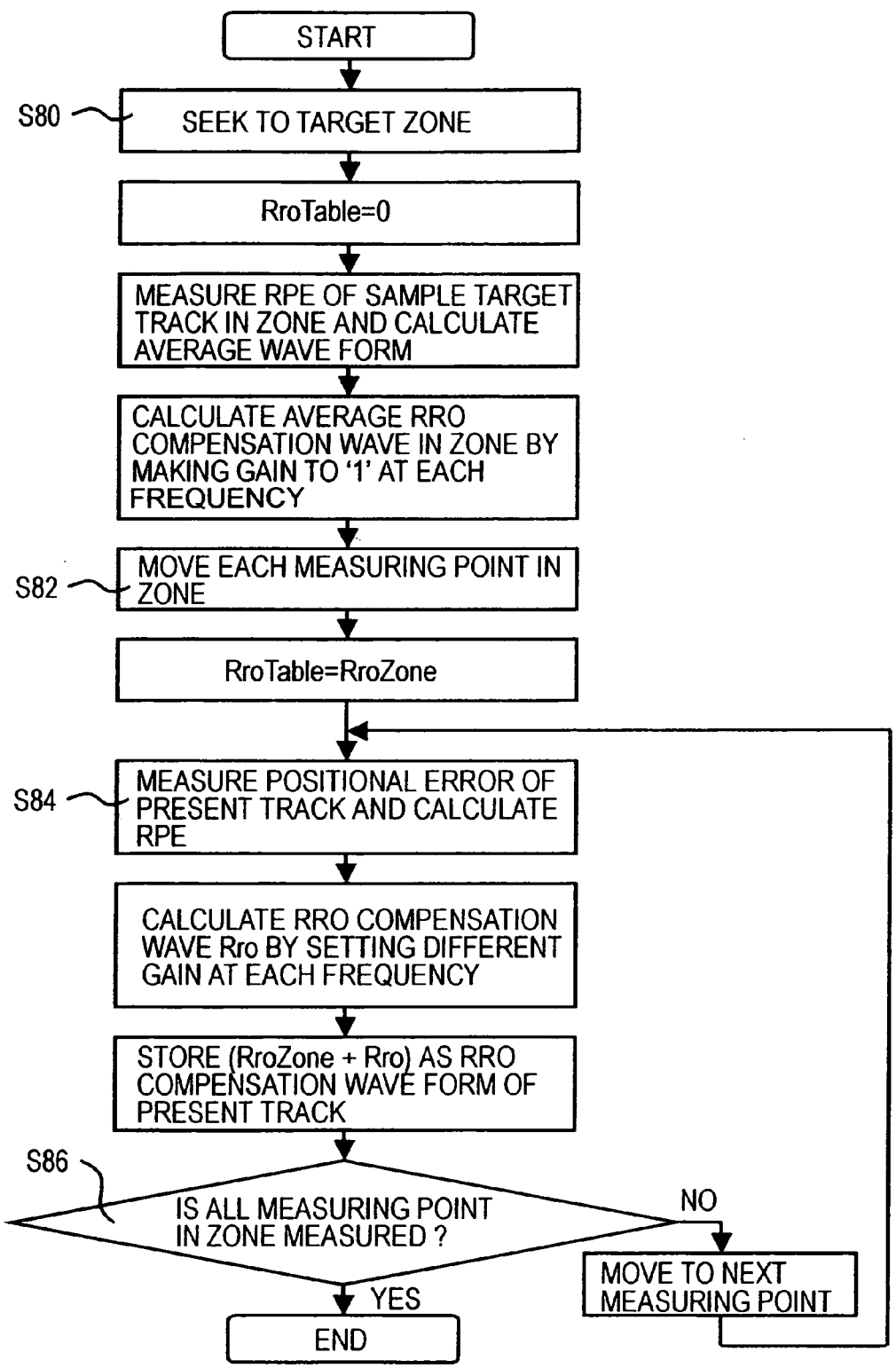
FIG. 35 is a flow chart depicting RroTable creation processing when the track correction shown in FIG. 7 exists.
Figure 36:
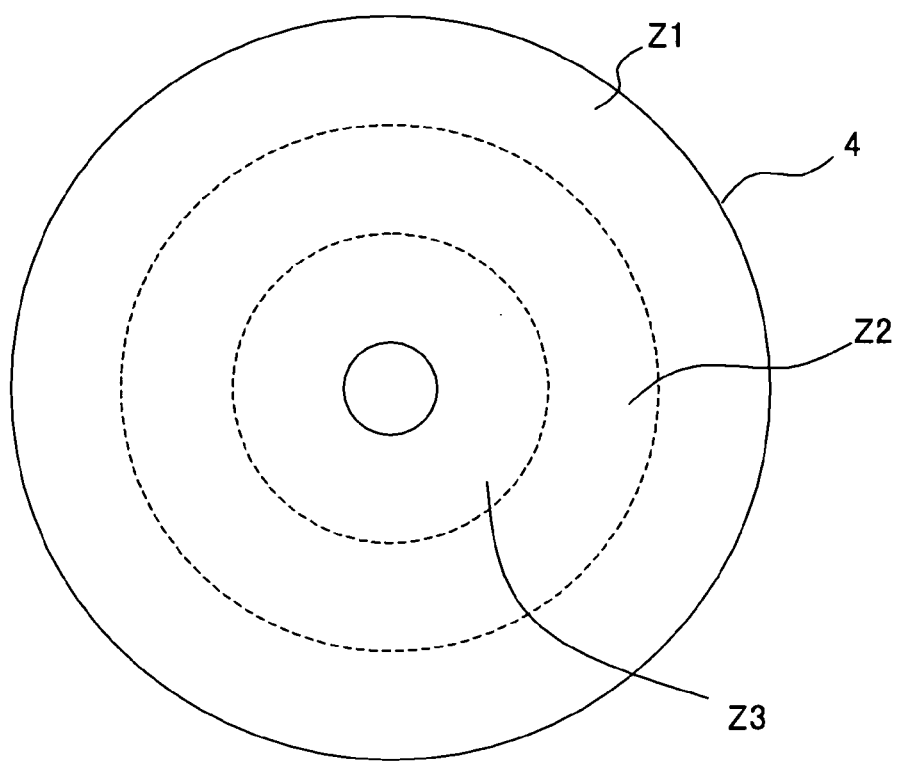
FIG. 36 is a diagram depicting the zone division in FIG. 35.

FIG. 35 is a flow chart depicting RRO correction table creation processing considering the correlation between tracks, and FIG. 36 and FIG. 37 describe the processing flow.

(S80) As FIG. 36 shows, the disk 4 with the same head is divided into a plurality of zones Z1, Z2 and Z3. First a common RRO correction value is created within the zone. In other words, the target head is moved to the target zone of the disk 4, and the RroTable value is initialized to "0". An average RPE waveform of the sampling target track within the zone is determined, and the zone average RRO correction waveform RroZone is calculated, setting an addition gain uniform for all frequencies as "1".

(S82) Then the head is positioned to a measurement point (e.g. each track) within the zone using this RroZone as an initial value, and the RroZone value is stored in the RroTable 29 as shown in FIG. 37.

(S84) The position error 'e' of the current track after moving is measured for a specified number of rotations N, and RPE is calculated, as mentioned above. And different addition gains are set for each frequency, as described in FIG. 25, and the RRO correction waveform Rro (q) is calculated by expression (30). And as FIG. 37 shows, the Rro correction value of the current track is stored in the RroTable 29. In the case of an example where the magnetic head 3 has an MR head as the read element, in addition to a write element, and a rotary actuator is used, the position of the write element and read element for the track are different. Therefore in RroTable 29 in FIG. 37, the RRO value of the read element is measured and stored as RRO (R), independently from the RRO value of the write element, which is RRO (W).

(S86) Then it is judged whether all the measurement points within the zone have been measured. If all the measurement points within the zone have not been measured, the head is moved to the next measurement point, and processing returns to step S84. If all the measurement points within the zone have been measured, creation of RroTable in the zone ends.

This is repeated for the number of divided zones shown in FIG. 36, and the RroTable 29 in FIG. 37 is created. In this way, the disk 4 with a same head is divided into a plurality of zones, and a common RRO correction value in the zone is calculated first, and the zone average RRO correction waveform RroZone is calculated with setting an addition gain uniform for all the frequencies as "1". Then using this RroZone as the initial value, the head is moved to a measurement point in the zone (e.g. each track), and measurement is performed for a specified number of rotations N, RPE is calculated, and a different addition gain is set depending on the frequency, and the RRO correction waveform Rro (q) is measured by expression (30).

Therefore when the correlation of RRO between tracks is high, such as the case when the disk is mechanically distorted, an Rro correction value of the measurement point in each track can be measured, and an accurate RRO correction is possible, even in such a status.

Servo Track Writing Method Using RRO Correction Table

Now an embodiment of using the correction table created as above will be described. The first embodiment is for manufacturing the disk device described in FIG. 8. The disk where servo signals are externally recorded is installed in the disk device, and a correction table for all the tracks is generated for each read and write position. Or a plurality of tracks may constitute a zone and common components within the zone may be corrected.

Figure 38:
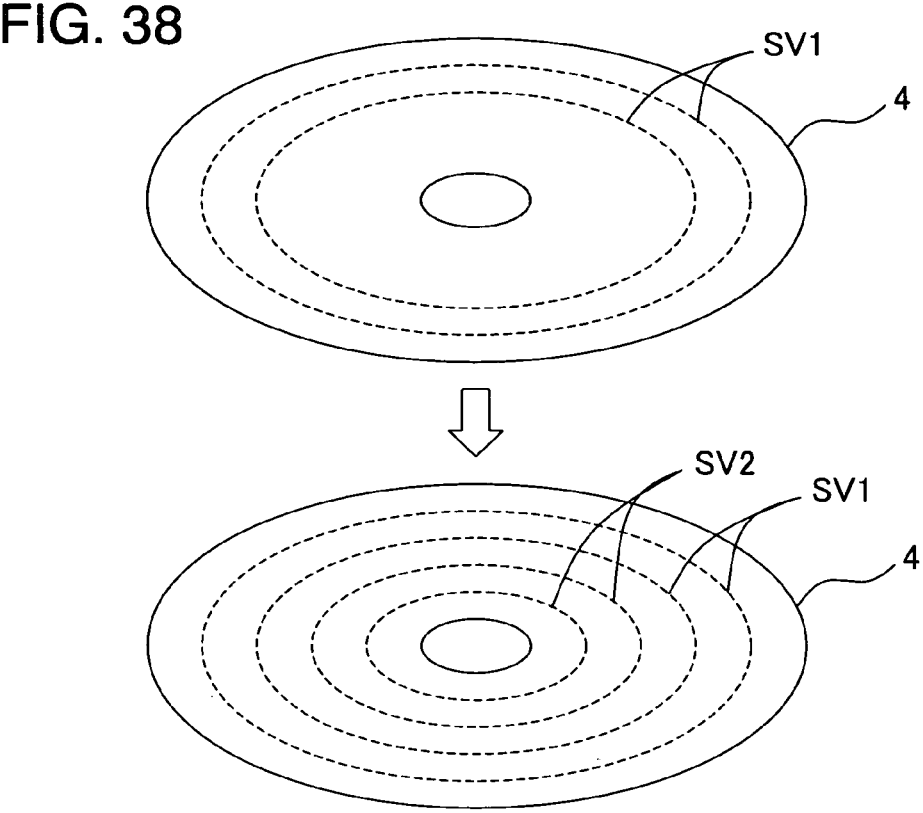
FIG. 38 is a diagram depicting the servo track writing method using the RRO correction table in FIG. 7.

The second embodiment is used when servo signals are recorded in the disk device. FIG. 38 is a diagram describing this. A servo signal recording method is a self-servo writing method. As FIG. 38 shows, several tracks of servo signal SV1 are recorded with a predetermined feeding width at the edges (outer track in this case) of the disk 4. Then based on these servo signals SV1, the servo signals SV2 are recorded in an area where the servo signals are not recorded on the disk 4.

When the servo signals SV1 are recorded at the edge of the disk 4 (outer track in this case), the RRO correction value is measured, and using this RRO correction value, the servo signals SV2 are recorded in an area where the servo signals are not recorded on the disk 4, based on the servo signals SV1. And the RRO correction value is measured for all the tracks, and the RroTable 29 is created.

Figure 39:
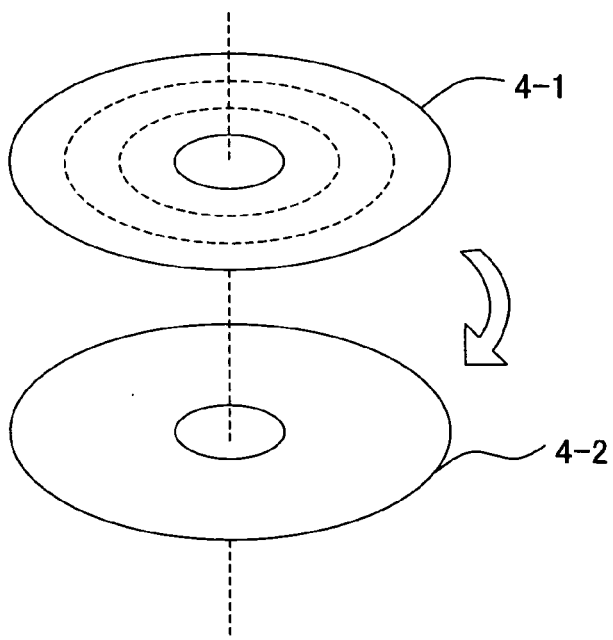
FIG. 39 is another diagram depicting the servo track writing method using the RRO correction table in FIG. 7.

The third embodiment is used for a servo signal recording method called copy STW or rewrite STW. FIG. 39 is a diagram depicting the servo track writing method. As FIG. 39 shows, servo signals are recorded on the entire face of at least one side of the disk 4-1 in advance, and the disk 4-1 where servo signals are recorded and a disk 4-2 where servo signals are not recorded are installed on the disk device.

And while positioning control is performed using the servo signals on one side of the disk 4-1, the RRO correction value is measured, and using this RRO correction value, servo signals are recorded on the face where servo signals have not yet been recorded (rear side of the disk 4-1 and the disk 4-2). And RroTable 29 is created by measuring the RRO correction values of all the tracks. In this case, servo signals may also be rewritten on the side of the disk 4-1 where the servo signals have been recorded from the beginning, using the RRO correction value, and the original servo signals may be deleted later.

Figure 40:
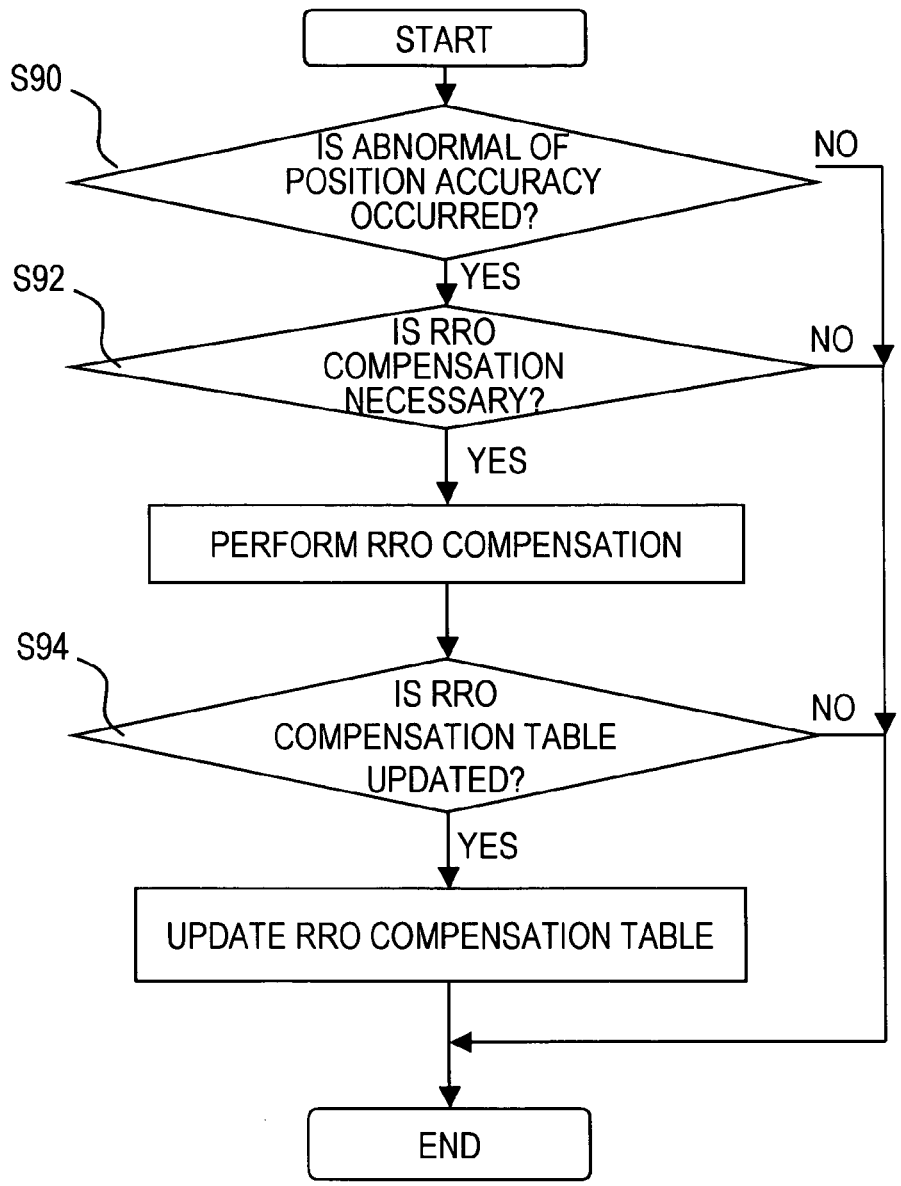
FIG. 40 is a flow chart depicting the servo track rewriting method using the RRO correction table in FIG. 7.

The fourth embodiment is to be used after shipping the disk device. When the servo signals reach a status which is different from that during manufacturing, such as the case of an eccentricity due to mechanical deformation or loss of servo signals due to a media scratch, the fourth embodiment is used to generate signals that follow-up or do not follow-up RRO. This makes a highly accurate correction possible with a small number of times of rotation. FIG. 40 is a flow chart depicting this correction table rewriting method.

(S90) The MCU 14 of the disk device judges whether a positioning accuracy abnormality occurred. For example, when the head cannot be positioned at the target track center (position error is more than off track standard value) even after positioning control using the above-mentioned RRO correction table 29, a retry is performed. If the head cannot be positioned at the target track center even after several times of retry, it is judged that the positioning accuracy is abnormal.

(S92) If it is judged as a positioning accuracy abnormality, it is then judged whether recovery is possible by RRO correction. For example, if the head detection capability is dropped, recovery is not possible even if RRO correction is performed. If it is judged that recovery is possible by RRO correction, the MCU 14 measures the RRO correction values, as mentioned above.

(S94) Then it is judged whether rewriting of the RRO correction table 29 is effective by comparing the RRO correction value measurement result and the correction values of the current RRO correction table 29. For example, if the RRO correction value measurement result and the correction values of the current RRO correction table 29 are not very different, positioning accuracy does not improve even if the correction table 29 is rewritten, so processing ends. If the RRO correction value measurement result and the correction values of the current RRO correction table 29 are different, positioning accuracy improves by rewriting the correction table 29. So the correction table 29 is rewritten, and processing ends.

In this way, when the servo signals reach a status which is different from that during manufacturing, such as the case when an eccentricity is generated due to mechanical deformation or the servo signals are lost due to a media scratch, the servo signals can be rewritten to be signals that follow-up or that do not follow-up RRO, which can contribute to improving the positioning accuracy.

Other Embodiments

Figure 41:
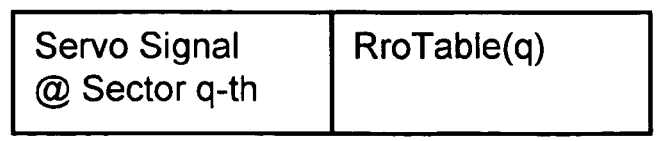
FIG. 41 is a diagram depicting the storage location of the RRO correction table in FIG. 7.
Figure 42:
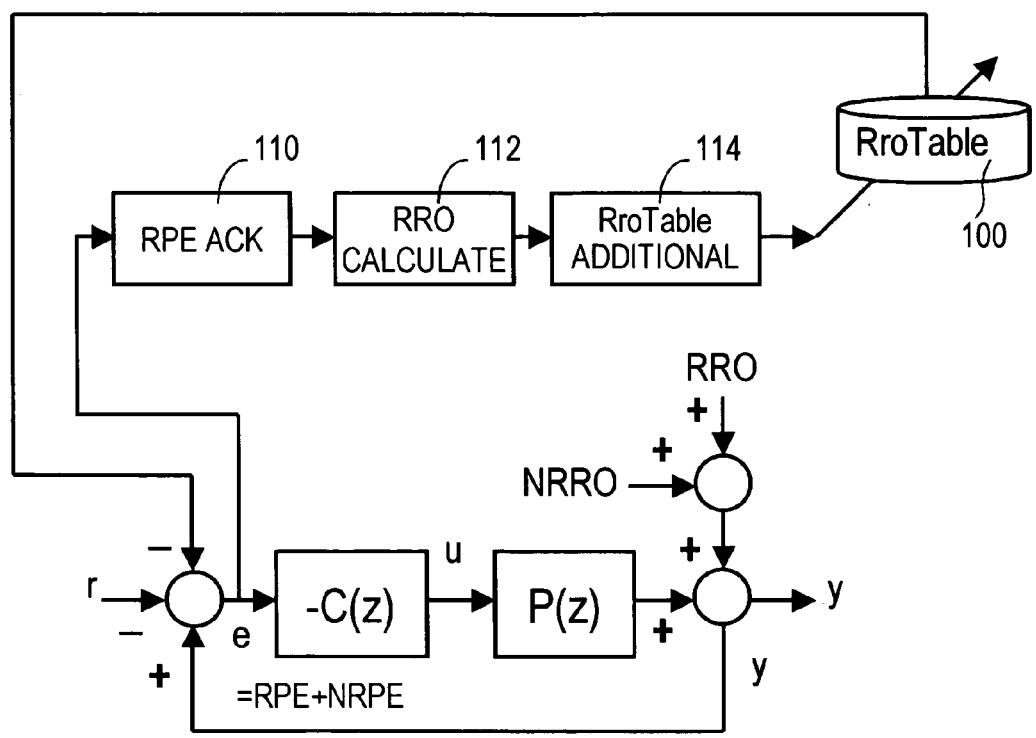
FIG. 42 is a block diagram depicting the servo control system using a conventional RRO correction table.
Figure 43:
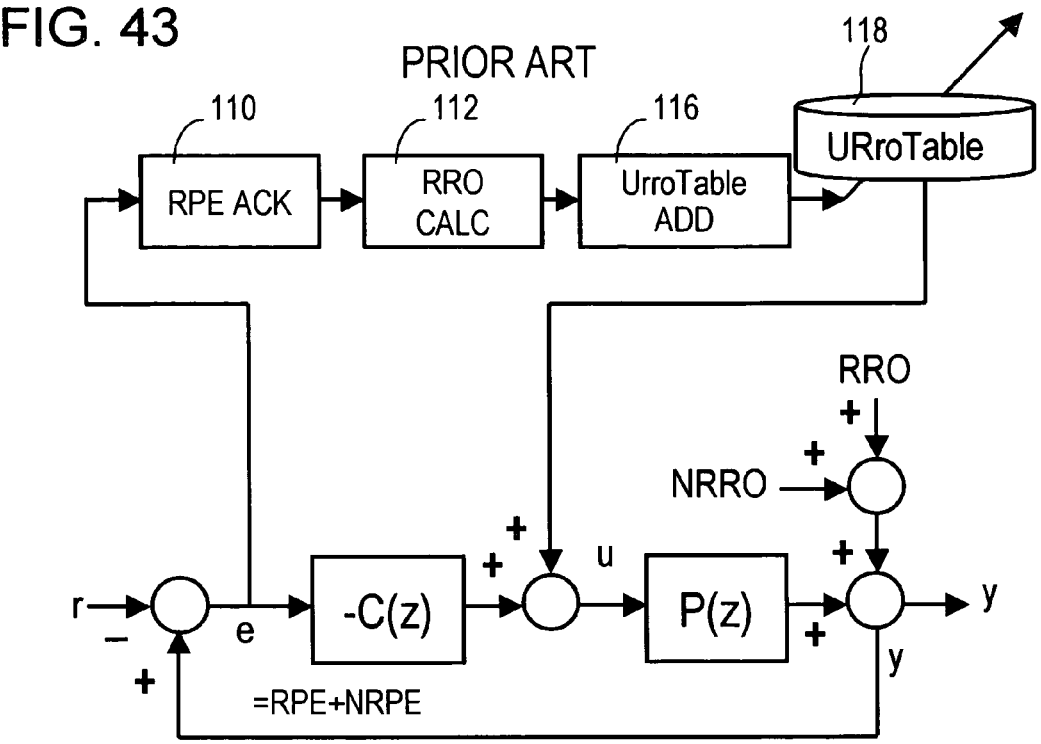
FIG. 43 is a block diagram depicting the servo control system using a conventional URRO correction table.
Figure 44:
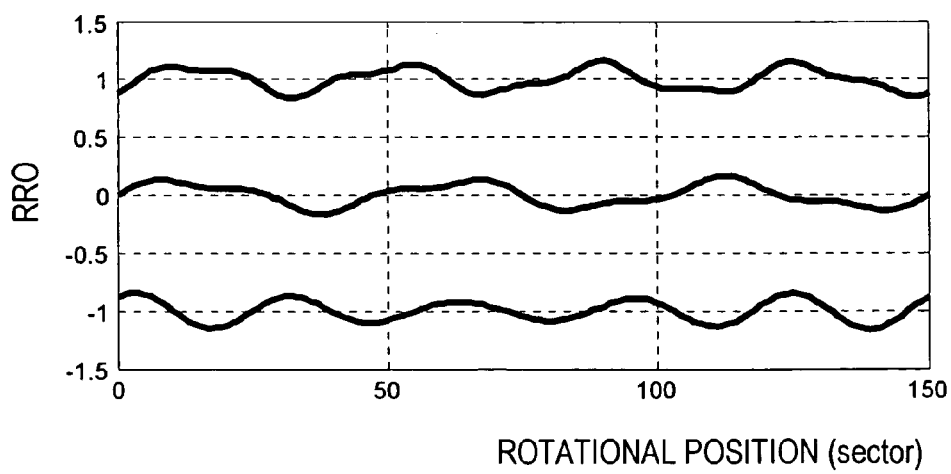
FIG. 44 is a graph depicting the track fluctuation according to a conventional RRO correction table.
Figure 45:
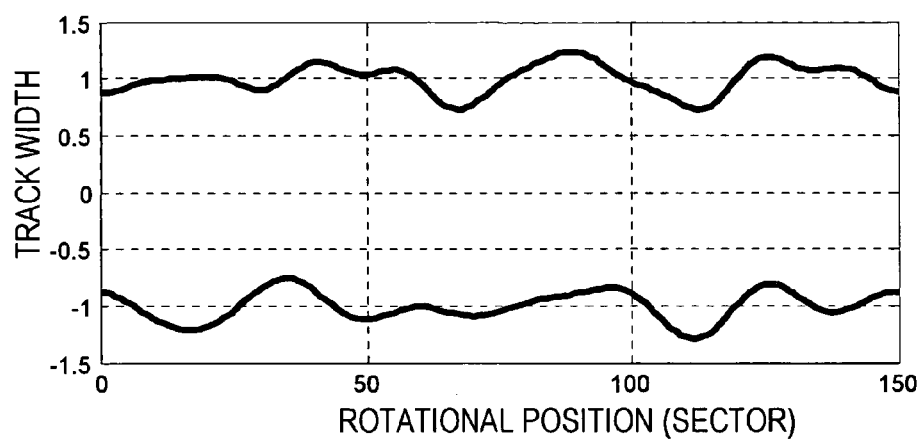
FIG. 45 is an enlarged view of the adjacent tracks in FIG. 44.

There are some possible locations where the above correction data (table) can be recorded. As FIG. 41 shows, the correction data RroTable (q) may be added at the end of the servo signals in each sector. Or correction data may be recorded in a dedicated area on the disk 4 medium that is not used for recording/regenerating data. Also the correction data may be recorded in a non-volatile memory on an electronic circuit of the disk device in advance.

Of these three recording locations, the first or the second method is effective when all the individual tracks are corrected. If only the track of which the positional fluctuation is large is corrected, that is the correction data volume is small, then the third method (non-volatile memory) may be used.

The above method is effective when the disk of the disk device is fixed. That is, the case when the media is not replaceable. Even in the case when the disk is fixed in a magnetic disk device, such as a magnetic transfer and patterned media, if servo signals on the media are formed using a common die, a common RRO, which is determined depending on the die creation accuracy, can be measured and the disk can be used as media.

The disk device was described as a magnetic disk device, but the present invention can be applied to other disk media, such as an optical disk device and magneto-optical disk device. In the same way, RRO was used for description of the embodiments in FIG. 25 to FIG. 41, and the present invention can also be applied to the URRO described in FIG. 21 to FIG. 24. The present invention was described using the embodiments, but various modifications are possible for the present invention within the scope of the essential character of the present invention, which shall not be excluded from the scope of the present invention.

Since an adjusted gain, based on the ratio of the magnitude between the components synchronizing rotation of the disk and the components not synchronizing rotation of the disk in the position signals, is used, a gain to minimize RRO after correction can be theoretically determined using an expression for determining RRO after correction. Therefore gain can be determined without depending on experiment, and the value of RRO after correction can be guaranteed, and the manufacturing time and device specifications can be determined. Therefore a disk device which requires rotation synchronization correction can be manufactured in a shorter time, and disk devices suitable for mass production can be implemented at low cost.

What is claimed is:

1. A correction table creation method for head position control for creating correction values for correcting components synchronizing rotation of a disk of a disk device that controls a position of a head for at least reading information of the disk using position signals of said disk, comprising steps of:

measuring position error components synchronizing the rotation of said disk from an average waveform of said position signals for a plural number of rotations of said disk;

correcting said measured position error components using an adjusted gain based on a ratio of the magnitude between components synchronizing rotation of said disk and components not synchronizing rotation of said disk in said position signals and said number of rotations; and storing said corrected position error components in the correction table.

2. The correction table creation method for head position control according to claim 1, wherein said correction step further comprises a step of correcting said measured position error components using an adjusted gain based on the number of measurement rotations for averaging said position signals, the number of repeats of said correction, and the ratio of the magnitude between components synchronizing rotation of said disk and components not synchronizing rotation of said disk in said position signals.

3. The correction table creation method for head position control according to claim 1, further comprising:

a step of measuring the normal distribution of components synchronizing rotation of said disk and the normal distribution of components not synchronizing rotation of said disk in said position signals; and a step of calculating said adjusted gain based on the ratio between the normal distribution of said synchronizing components and the normal distribution of said not synchronizing components.

4. The correction table creation method for head position control according to claim 1, wherein said correction step further comprises a step of correcting said measured position error components for each repeat using a gain for each repeat, that is an adjusted gain based on the number of measurement rotations for averaging said position signals, the number of repeats of said correction, and the ratio of the magnitude between the components synchronizing rotation of said disk and the components not synchronizing rotation of said disk in said position signals.

5. The correction table creation method for head position control according to claim 1, wherein said correction step further comprises a step of correcting said measured position error components using adjusted gains for each frequency that is multiple of the rotation frequency of said disk, said gains are acquired by determining the ratios of the magnitude between the components synchronizing rotation of said disk and the components not synchronizing rotation of said disk in said position signals for each said frequency.

6. The correction table creation method according to claim 1, wherein said correction step comprises:

a step of executing a DFT (Digital Fourier Transformation) of said measured position error components;

a step of multiplying said DFT results by a transfer function of a position control system;

a step of executing an inverse DFT of said multiplied results; and a step of multiplying said inverse DFT results by said adjusted gain.

7. A correction table creation method for head position control for creating correction values for correcting components synchronizing rotation of a disk of a disk device that controls a position of a head for at least reading information of the disk using position signals of said disk, comprising steps of:

measuring position error components synchronizing the rotation of said disk from an average waveform of said position signals;

correcting said measured position error components using an adjusted gain based on the number of measurement rotations for averaging said position signals, the number of repeats of said correction, and a ratio of the magnitude between the components synchronizing rotation of said disk and components not synchronizing rotation of said disk in said position signals; and storing said corrected position error components in the correction table, wherein in said storage step, the residual RRO σ, that is a normal distribution of components synchronizing rotation of a disk corrected by the correction value stored in said correction table, follows the following expression (18), where the normal distribution of components synchronizing rotation of said disk is σ RRO, the normal distribution of components not synchronizing rotation of said disk is σ NRRO, said number of measurement rotations is N, said number of repeats is M, and said gain is K, $$(residual RRO\ \sigma)^2 = (1-K)^{2M}\sigma_{RRO}^2 + K^2/N \sum_{i=1}^{M}(1-K)^{2(i-1)}\sigma_{NRRO}^2 \quad (18)$$

8. A disk device, comprising:

a head for at least reading information of a disk;

an actuator for moving said head to a desired position on said disk;

a correction table for storing correction signals acquired by measuring position error components synchronizing rotation of said disk from an average waveform of position signals from said head for a plural number of rotations of said disk and correcting said measured position error components using an adjusted gain based on a ratio of the magnitude between the components synchronizing rotation of said disk and the components not synchronizing rotation of said disk in said position signals and said number of rotations; and a control unit for calculating an error between a target position and a current position based on the position signals from said head and controlling said head position based on said position error and said correction signals.

9. The disk device according to claim 8, wherein said correction table stores said correction signals by correcting said measured position error components using an adjusted gain based on the number of measurement rotations for averaging said position signals, the number of repeats of said correction, and the ratio of the magnitude between the components synchronizing rotation of said disk and the components not synchronizing rotation of said disk in said position signals.

10. The disk device according to claim 8, wherein said control unit measures the normal distribution of components synchronizing rotation of said disk and the normal distribution of components not synchronizing rotation of said disk in said position signals, and calculates said adjusted gain based on the ratio between the normal distribution of said synchronizing components and the normal distribution of said not synchronizing components.

11. The disk device according to claim 8, wherein said correction table stores said correction signals acquired by correcting said measured position error components for each repeat using a gain for each repeat, that is adjusted based on the number of measurement rotations for averaging said position signals, the number of repeats of said correction, and the ratio of the magnitude between the components synchronizing rotation of said disk and the components not synchronizing rotation of said disk in said position signals.

12. The disk device according to claim 8, wherein said correction table stores said correction signals acquired by correcting said measured position error components using adjusted gains for each freciuency that is a multiple of the rotation frequency of said disk, said gains are acquired by determining the ratio of the magnitude between the components synchronizing rotation of said disk and the components not synchronizing rotation of said disk in said position signals for each said frequency.

13. The disk device according to claim 8, wherein said control unit subtracts said correction signal from said position error and generates said head position control signal from said subtracted position error.

14. The disk device according to claim 8, wherein said control unit subtracts said correction signal from said head position control signal acquired from said position error so as to control said head position.

15. A disk device comprising:

a head for at least reading information of a disk;

an actuator for moving said head to a desired position on said disk;

a correction table for storing correction signals acquired by measuring a position error components synchronizing rotation of said disk from an average waveform of position signals from said head for a plural number of rotations of said disk and correcting said measured position error components using an adjusted gain based on a ratio of the magnitude between the components synchronizing rotation of said disk and the components not synchronizing rotation of said disk in said position signals and said number of rotation; and a control unit for calculating an error between a target position and a current position based on the position signals from said head and controlling said head position based on said position error and said correction signals;

wherein the residual RRO σ, that is a normal distribution of components synchronizing rotation of a disk corrected by the correction value stored in said correction table, follows the following expression (18), where the normal distribution of components synchronizing rotation of said disk is σ RRO, the normal distribution of components not synchronizing rotation of said disk is a σ NRRO, said number of measurement rotations is N, said number of repeats is M, and said gain is K, $$(residual RRO\ \sigma)^2 = (1-K)^{2M}\sigma_{RRO}^2 + K^2/N \sum_{i=1}^{M}(1-K)^{2(i-1)}\sigma_{NRRO}^2 \quad (18)$$

16. A head position control device for controlling a position of a head for at least reading information of a disk using signals acquired by correcting the position signals of said disk by components synchronizing rotation of said disk, comprising:

a correction table for storing correction signals acquired by measuring position error components synchronizing rotation of said disk from an average waveform of said position signals for a plural number of rotations of said disk and correcting said measured position error components using an adjusted gain based on the ratio of the magnitude between components synchronizing rotation of said disk and components not synchronizing rotation of said disk in said position signals and said number of rotations; and a controller for calculating an error between a target position and a current position based on the position signal from said head; reading correction signals from said correction table and controlling said head position based on said position error and said correction signals.

17. The head position control device according to claim 16, wherein said correction table stores said correction signals acquired by correcting said measured position error components using a gain, that is adjusted based on the number of measurement rotations for averaging said position signals, the number of repeats of said correction, and the ratio of the magnitude between components synchronizing rotation of said disk and the components not synchronizing rotation of said disk in said position signals.

18. The head position control device according to claim 16, said controller measures the normal distribution of components synchronizing rotation of said disk and the normal distribution of components not synchronizing rotation of said disk in said position signals, and calculates said adjustment gain based on the ratio between the normal distribution of said synchronizing components and the normal distribution of said not synchronizing components.

19. The head position control device according to claim 18, wherein said controller executes a DFT (Digital Fourier Transformation) of said measured position error components, multiplies said DFT results by a transfer function of a position control system, executes an inverse DFT of said multiplied result and multiplies said inverse DFT results by said adjusted gain.

20. The head position control device according to claim 16, wherein said controller reads said correction signal from the correction table acquired by correcting said measured position error components for each of said repeats using a gain for each repeat, that is adjusted based on the number of measurement rotations for averaging said position signals, the number of repeats of said correction, and the ratio of the magnitude between the components synchronizing rotation of said disk and the components not synchronizing rotation of said disk in said position signals.

21. The head position control device according to claim 16, wherein said controller reads said correction signals from the correction table acquired by correcting said measured position error components, using adjusted gains for each frequency that is a multiple of the rotation frequency of the disk, wherein said gains are acquired by determining the ratios of the magnitude between the components synchronizing rotation of said disk and the components not synchronizing rotation of said disk in said position signals for each frequency.

22. The head position control device according to claim 16, wherein said controller subtracts said correction signal from said position error and generates said head position control signal from said subtracted position error.

23. The head position control device according to claim 16, wherein said controller subtracts said correction signal from said head position control signal acquired from said position error so as to control said head position.

24. A head position control device for controlling a position of a head for at least reading information of a disk using signals acquired by correcting the position signals of said disk by components synchronizing rotation of said disk, comprising:

a correction table for sorting correction signals acquired by measuring position error components synchronizing rotation of said disk from an average waveform of said position signals for a plural number of rotations of said disk and correcting said measured position error components using an adjusted gain based on the ratio of the magnitude between components synchronizing rotation of said disk and components not synchronizing rotation of said disk in said position signals and said number of rotations; and a controller for calculating an error between a target position and a current position based on the position signal from said head, reading correction signals from said correction table and controlling said head position based on said position error and said correction signals, wherein the residual RRO σ, that is a normal distribution of components synchronizing rotation of a disk corrected by the correction value stored in said correction table, follows the following expression (18), where the normal distribution of components synchronizing rotation of said disk is σ RRO, the normal distribution of components not synchronizing rotation of said disk is σ NRRO, said number of measurement rotations is N, said number of repeats is M, and said gain is K, $$(residualRRO\ \sigma)^2 = (1-K)^{2M}\sigma_{RRO}^2 + K^2/N \sum_{i=1}^{M}(1-K)^{2(i-1)}\sigma_{NRRO}^2 \quad (18)$$

25. A correction table creation method for head position control for creating values for correcting components synchronizing rotation of a disk of a disk device that controls a position of a head for at least reading information of the disk using position signals of said disk, comprising steps of:

measuring position error components synchronizing the rotation of said disk from an average waveform of said position signals in plural divided zones of a single disk surface;

correcting said measured position error components using a single adjusted gain;

storing said corrected position error components of each of said zones in the correction table;

measuring position error components synchronizing the rotation of said disk from an average waveform of said position signals in each track in said divided zone;

correcting said measured position error components of said each track using adjusted gains for each frequency that is a multiple of the rotation frequency of said disk, and said adjusted gains are based on ratios of the magnitude between components synchronizing rotation of said disk and components not synchronizing rotation of said disk in said position signals for each said frequency; and storing said corrected position error components of each said track in the correction table.

26. A head position control device for controlling a position of a head for at least reading information of a disk using signals acquired by correcting the position signals of said disk by components synchronizing rotation of said disk, comprising:

a correction table for storing a first correction signal of each zone acquired by measuring position error components synchronizing the rotation of said disk from an average waveform of said position signals in plural divided zones of a single disk surface and correcting said measured position error components using a single adjusted gain, and a second correction signal of each track by measuring position error components synchronizing the rotation of said disk from an average waveform of said position signals in each track in said divided zone and correcting said measured position error components of said each track using adjusted gains for each frequency that is a multiple of the rotation frequency of said disk, and said adjusted gains are based on ratios of the magnitude between components synchronizing rotation of said disk and components not synchronizing rotation of said disk in said position signals for each said frequency; and a controller for calculating an error between a target position and a current position based on the position signal from said head, reading said first and second correction signals from said correction table and controlling said head position based on said position error and said first and second correction signals.

27. A head position control device for moving a head for at least reading information of a disk to a desired position on said disk by using an actuator, comprising:

a correction table for storing correction signals acquired by measuring a position error components synchronizing rotation of said disk from an average waveform of position signals from said head and correcting said measured position error components using an adjusted gain based on a ratio of the magnitude between the components synchronizing rotation of said disk and the components not synchronizing rotation of said disk in said position signals; and a control unit for calculating an error between a target position and a current position based on the position signals from said head and controlling said head position based on said position error and said correction signals, wherein said control unit measures said position error components synchronizing rotation of said disk from said average waveform of position signals from said head and corrects said measured position error components using said adjusted gain, judges whether or not to rewrite said correction table according to said corrected position errors and said correction signals in said correction table, and rewrites said correction table to said corrected position errors when judging to perform said rewrite.

28. A head position control method for moving a head for at least reading information of a disk to a desired position on said disk by using an actuator, comprising:

a step of measuring position error components synchronizing rotation of said disk from an average waveform of position signals from said head;

a step of correcting said measured position error components using an adjusted gain based on a ratio of the magnitude between the components synchronizing rotation of said disk and the components not synchronizing rotation of said disk in said position signals;

a step of calculating an error between a target position and a current position based on the position signals from said head;

a step of controlling said head position based on said position error and said correction signals;

a step of re-measuring said position error components synchronizing rotation of said disk from said average waveform of position signals from said head;

a step of correcting said measured position error components using said adjusted gain;

a step of judging whether or not to rewrite said correction table according to said corrected position errors and said correction signals in said correction table; and rewriting said correction table to said corrected position errors when judging to perform said rewrite.

* * * * *

UNITED STATES PATENT AND TRADEMARK OFFICE
CERTIFICATE OF CORRECTION

PATENT NO. : 7,193,808 B2
APPLICATION NO. : 11/023182
DATED : March 20, 2007
INVENTOR(S) : Kazuhiko Takaishi It is certified that error appears in the above-identified patent and that said Letters Patent is hereby corrected as shown below:

Title Page, Item (57)
<u>In the Abstract</u>:

Line 1, delete "system control" and insert -- system controls --.

<u>In the claims</u>:

Col. 31, line 20, delete "$\sigma_{NRRO}$" and insert -- $\sigma_{NRRO}^2$ --.

Col. 32, line 46, delete "a".

Column 32, line 53, delete "$(residual\ RRO\sigma)^2 = (1-K)^{2M}\sigma^2_{RRO} + K^2/N \sum_{i=1}^{M} (1-K)^{2(i-1)}\sigma^2_{NRRO}$" and insert -- $(residual\ RRO\sigma)^2 = (1-K)^{2M}\sigma_{RRO}^2 + K^2/N \sum_{i=1}^{M} (1-K)^{2(i-1)}\sigma_{NRRO}^2$ --.

Col. 34, line 26, delete "$(residual\ RRO\sigma)^2 = (1-K)^{2M}\sigma^2_{RRO} + K^2/N \sum_{i=1}^{M} (1-K)^{2(i-1)}\sigma^2_{NRRO}$" and insert -- $(residual\ RRO\sigma)^2 = (1-K)^{2M}\sigma_{RRO}^2 + K^2/N \sum_{i=1}^{M} (1-K)^{2(i-1)}\sigma_{NRRO}^2$ --.

Signed and Sealed this

Tenth Day of July, 2007

JON W. DUDAS
*Director of the United States Patent and Trademark Office*